United States Patent
Takayama

(10) Patent No.: US 7,209,308 B2
(45) Date of Patent: Apr. 24, 2007

(54) COMMUNICATION APPARATUS COMMUNICATING WITH RECORDING MEDIUM MEMORY AND RECORDING MEDIUM DRIVE APPARATUS

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 146 days.

(21) Appl. No.: 10/415,308

(22) PCT Filed: Aug. 28, 2002

(86) PCT No.: PCT/JP02/08679

§ 371 (c)(1), (2), (4) Date: Apr. 28, 2003

(87) PCT Pub. No.: WO03/021595

PCT Pub. Date: Mar. 13, 2003

(65) Prior Publication Data

US 2003/0235000 A1    Dec. 25, 2003

(51) Int. Cl.
G11B 19/02    (2006.01)
G11B 15/08    (2006.01)

(52) U.S. Cl. .......................................... 360/69; 360/71
(58) Field of Classification Search ................. 360/69, 360/132, 71, 93, 75
See application file for complete search history.

(56) References Cited

U.S. PATENT DOCUMENTS

| | | | | |
|---|---|---|---|---|
| 4,644,425 A | * | 2/1987 | Tamaki | 360/69 |
| 4,979,057 A | * | 12/1990 | Matsumoto et al. | 360/71 |
| 5,903,407 A | * | 5/1999 | Tsai | 360/72.1 |
| 6,034,828 A | * | 3/2000 | Hamanaka et al. | 360/15 |
| 6,045,041 A | * | 4/2000 | Tanaka et al. | 235/383 |
| 6,201,474 B1 | * | 3/2001 | Brady et al. | 340/572.8 |
| 6,570,728 B2 | * | 5/2003 | Iizuka et al. | 360/69 |
| 6,947,237 B2 | * | 9/2005 | Christie, Jr. | 360/60 |
| 2002/0167753 A1 | * | 11/2002 | Basham et al. | 360/77.12 |
| 2003/0043506 A1 | * | 3/2003 | Iizuka et al. | 360/132 |

FOREIGN PATENT DOCUMENTS

| | | |
|---|---|---|
| JP | 6-215543 | 8/1994 |
| JP | 9-127961 | 5/1997 |
| JP | 11-341404 | 12/1999 |
| JP | 2000-82277 | 3/2000 |
| JP | 2001-135023 | 5/2001 |
| JP | 2002-222395 | 8/2002 |
| WO | WO 00/38188 | 6/2000 |

* cited by examiner

Primary Examiner—Andrew L. Sniezek
(74) Attorney, Agent, or Firm—Frommer Lawrence & Haug LLP; William S. Frommer; Thomas F. Presson

(57) ABSTRACT

A system using a tape cassette (1) with a memory (4) as a recording medium is provided. In the memory (4) provided in the tape cassette (1) used in the system, there is formed a storage area where instruction/object information in which an instruction to be executed by a required device is stated in addition to a storage area where management information for managing recording to or playback from the tape cassette (1) is stated. At an information processor (10, 40 or 50), instruction/object information is acquired from the memory (4) and processed to provide a control corresponding to the content of the instruction/object information. A device to make some action on the tape cassette (1) can thus have a higher operability and extensibility.

6 Claims, 42 Drawing Sheets

| | |
|---|---|
| manufacture part checksum | 1 byte |
| mic type | 1 byte |
| mic manufacture date | 4 bytes |
| mic manufacture line name | 8 bytes |
| mic manufacture plant name | 8 bytes |
| mic manufacturer name | 8 bytes |
| mic name | 8 bytes |
| cassette manufactured date | 4 bytes |
| cassette manufacturer line name | 8 bytes |
| cassette manufacturer plant name | 8 bytes |
| cassette manufacturer name | 8 bytes |
| cassette name | 8 bytes |
| oem customer name | 8 bytes |
| physical tape characteristic ID | 2 bytes |
| maximum clock frequency | 2 bytes |
| block size | 1 byte |
| mic capacity | 1 byte |
| write protect top address | 2 bytes |
| write protect count | 2 bytes |
| reserved | 1 byte |
| application ID | 1 byte |
| offset | 2 bytes |

MANUFACTURE PART (spans the full table)

FIG.8

| Cartridge Serial Number | Total 32 bytes (ASCII Code) | |
|---|---|---|
| | Cartridge Serial Number High | 16bytes |
| | Cartridge Serial Number Low | 16bytes |
| Cartridge Serial Number CRC | | Total 16bytes |
| | Manufacture ID | 1byte |
| | Secondary ID | 1byte |
| | Cartridge Serial Number Checksum | 1byte |
| | Cartridge Serial Number CRC | 2bytes |
| | Reserved | 11bytes |
| Scratch pad memory | | Total 16 bytes |
| | Scratch Pad memory checksum | 1byte |
| | Session ID | 1byte |
| | Reserved | 14bytes |

FIG.10

| MANUFACTURER'S ID | | Manufactures Name |
|---|---|---|
| ASCII | HEX Value | |
| S | 53h | XYZ Corporation |
| Other | | Reserved |

FIG.11A

| SECONDARY ID | | Description |
|---|---|---|
| ASCII | HEX Value | |
| 1 | 31h | 15m AIT cassette that serial number is smaller than or equal to a number of 6 figures |
| 2 | 32h | 70m middle length of AIT cassette that serial number is smaller than or equal to a number of 6 figures |
| 3 | 33h | 170m standard length of AIT cassette that serial number is smaller than or equal to a number of 6 figures |
| 4 | 34h | 230m standard length of AIT cassette that serial number is smaller than or equal to a number of 6 figures |
| W | 57h | 230m AIT cassette that serial number is greater than or equal to a number of 7 figures |
| X | 58h | 170m AIT cassette that serial number is greater than or equal to a number of 7 figures |
| Y | 59h | 70m middle length of AIT cassette that serial number is greater than or equal to a number of 7 figures |
| Z | 5Ah | 15m short length of AIT cassette that serial number is greater than or equal to a number of 7 figures |

FIG.11B

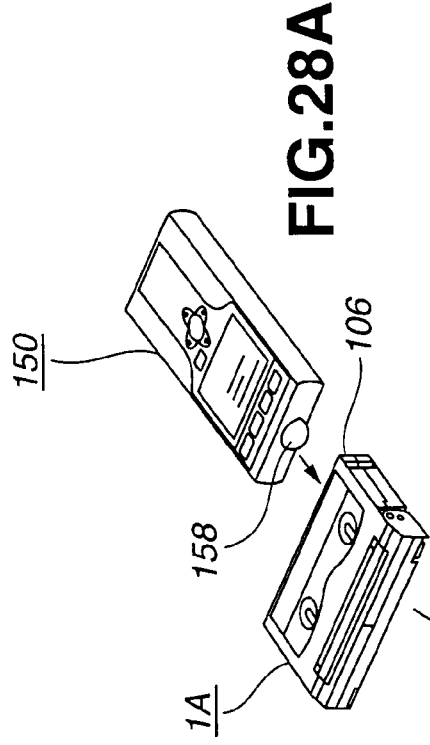
FIG.28A
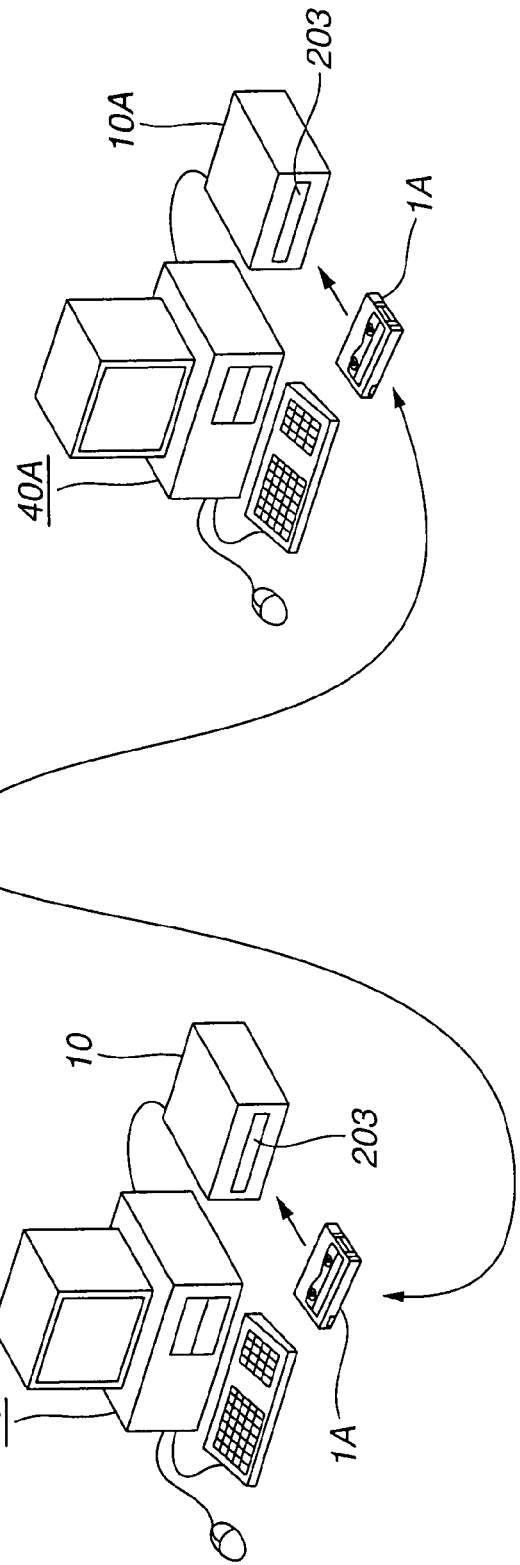
FIG.28C
FIG.28B

```
Responsibility=0(Host)
Data Type Number=1
Data Type Format=1
SWITCH{
    CASE:NOW_LOADING{
        IF SENSE_EJECT_BUTTON_THEN PUT_MESSAGE {EJECT_BUTTON_REQUESTED}
    }
    CASE:AFTER_LOADING{
        REWIND
        IF GET_MESSAGE="EJECT_BUTTON_REQUESTED"THEN{
            PUT_MESSAGE { FULL_RESTORE " C:¥ My Document "}
            GENERATE_CHECK_CONDITION(99)
        } ELSE
            PUT_MESSAGE {FULL_BACKUP " C:¥ My Document "}
            GENERATE_CHECK_CONDITION(99)
        }
    }
    CASE:BEFORE_EJECT{
    }
}
```

FIG.32

```
Responsibility=1(Drive)
Data Type Number=1
Data Type Format=1

SWITCH{
    CASE:AFTER_LOADING{
        IF GET_CARTRIDGE_SERIAL_NUMBER=20000000000000000000000000034621 THEN{
            IF GET_DRIVE_TYPE=SONY-E-CINEMA THEN EXIT
        } ELSE {
            REWIND
            EJECT
            EXIT
        }
    }
    CASE:BEFORE_EJECT{
        PUT_MESSAGE{
            THE CARTRIDGE IS UNUSABLE IN THIS SYSTEM.
        }
        GENERATE_CHECK_CONDITION(99)
    }
}
```

FIG.34

| Byte | Bit 7 | 6 | 5 | 4 | 3 | 2 | 1 | 0 |
|---|---|---|---|---|---|---|---|---|
| 0 | | | | OPCODE(8Dh) | | | | |
| 1 | | | | Reserved(0) | | | | |
| 2 | MSB | | | Reserved for SMC-2 devices(0) | | | | |
| 3 | | | | Reserved for SMC-2 devices(0) | | | | LSB |
| 4 | | | | VOLUME NUMBER | | | | |
| 5 | | | | Reserved(0) | | | | |
| 6 | | | | PARTITION NUMBER | | | | |
| 7 | | | | Reserved(0) | | | | |
| 8 | | | | Reserved(0) | | | | |
| 9 | MSB | | | | | | | |
| 10 | | | | PARAMETER LIST LENGTH | | | | |
| 11 | | | | | | | | |
| 12 | | | | | | | | |
| 13 | | | | | | | | LSB |
| 14 | | | | Reserved(0) | | | | |
| 15 | | | | CONTROL | | | | |

FIG. 35

| Byte | Bit 7 | 6 | 5 | 4 | 3 | 2 | 1 | 0 |
|---|---|---|---|---|---|---|---|---|
| 0 | OPCODE(8Ch) ||||||||
| 1 | Reserved(0) ||||| SERVICE ACTION |||
| 2 | MSB ||||||||
| 3 | | Reserved for SMC-2 devices(0) ||||||| LSB |
| 4 | | Reserved for SMC-2 devices(0) |||||||
| 5 | VOLUME NUMBER ||||||||
| 6 | Reserved(0) ||||||||
| 7 | PARTITION NUMBER ||||||||
| 8 | MSB ||||||||
| 9 | | FIRST ATTRIBUTE ID ||||||| LSB |
| 10 | MSB ||||||||
| 11 | | ||||||||
| 12 | | ALLOCATION LENGTH |||||||
| 13 | | ||||||| LSB |
| 14 | Reserved(0) ||||||||
| 15 | CONTROL ||||||||

FIG.36

| Byte | Bit | | | | | | | |
|---|---|---|---|---|---|---|---|---|
| | 7 | 6 | 5 | 4 | 3 | 2 | 1 | 0 |
| 0 | MSB | | | ATTRIBUTE ID | | | | |
| 1 | | | | | | | | LSB |
| 2 | READ ONLY | | RESERVED(0) | | | | FORMAT | |
| 3 | MSB | | | ATTRIBUTE LENGTH(n-4) | | | | |
| 4 | | | | | | | | LSB |
| 5 : n | MSB | | | ATTRIBUTE VALUE | | | | LSB |

FIG.37

| Attribute Identifiers | Description |
|---|---|
| 0000h-03FFh | Device Common Attributes |
| 0400h-07FFh | Medium Common Attributes |
| 0800h-0BFFh | Host Common Attributes |
| 0C00h-0FFFh | Device Vendor Unique Attributes |
| 1000h-13FFh | Medium Vendor Unique Attributes |
| 1400h-17FFh | Host Vendor Unique Attributes |
| 1800h-FFFFh | Reserved |

FIG.38

| ID | Attribute Name | #Bytes | Format |
|---|---|---|---|
| 0400h | MEDIUM MANUFACTURER | 8 | ASCII |
| 0401h | MEDIUM SERIAL NUMBER | 32 | ASCII |
| 0402h | Reserved for SSC | | |
| 0403h | Reserved for SSC | | |
| 0404h | Reserved for SSC | | |
| 0405h | Reserved for SSC | | |
| 0406h | MEDIUM MANUFACTURE DATE | 8 | ASCII |
| 0407h | MAM CAPACITY | 8 | Binary |
| 0408h | MEDIUM TYPE | 1 | Binary |
| 0409h | MEDIUM TYPE INFORMATION | 2 | Binary |
| 040Ah-07FFh | Reserved | | |

FIG.39

| MEDIUM TYPE | Meaning | MEDIUM TYPE INFORMATION |
|---|---|---|
| 00h | Data medium | Reserved |
| 01h | Cleaning medium | Maximum number of cleaning cycles permitted |
| 02h-7Fh | Reserved | Reserved |
| 80h | Write-once medium | Reserved |
| 81h-FFh | Reserved | Reserved |

FIG.40A

| MEDIUM TYPE | Meaning | MEDIUM TYPE INFORMATION |
|---|---|---|
| 91h | INSTRUCTION/OBJECT INFORMATION ON Data medium IS STORED | FULL INSTRUCTION/ OBJECT INFORMATION BYTE LENGTH |
| 92h | INSTRUCTION/OBJECT INFORMATION Cleaning medium IS STORED | FULL INSTRUCTION/ OBJECT INFORMATION BYTE LENGTH |

FIG.40B

| ID | Attribute Name | #Bytes | Format |
|---|---|---|---|
| 0800h | APPLICATION VENDOR | 8 | ASCII |
| 0801h | APPLICATION NAME | 32 | ASCII |
| 0802h | APPLICATION VERSION | 8 | ASCII |
| 0803h | USER MEDIUM TEXT LABEL | 160 | Text |
| 0804h | DATE & TIME LAST WRITTEN | 12 | ASCII |
| 0805h | TEXT LOCALISATION IDENTIFIER | 1 | Binary |
| 0806h | BARCODE | 32 | ASCII |
| 0807h | OWNING HOST TEXTUAL NAME | 80 | Text |
| 0808h | MEDIA POOL | 160 | Text |
| 0809h | PARTITION USER TEXT LABEL | 16 | ASCII |
| 080Ah | LOAD/UNLOAD AT PARTITION | 1 | Binary |
| 080Bh-BFFh | Reserved | | |

FIG.41A

| ID | Attribute Name | #Bytes | Format |
|---|---|---|---|
| 080Bh | Instruction for the cartridge | 2048 | Binary |
| 080Ch | Request for the host | 2048 | Binary |

FIG.41B

| Byte Position | Number of Byte | Definition |
|---|---|---|
| 1 | 2 | Size of valid data out of 2048 bytes. If set to ZERO then no data. |
| 3 | 1 | Responsbility.<br>0=Host shall process the Instruction/Object.<br>1=Drive shall process the Instruction/Object. |
| 4 | 1 | Data Type Number.<br>0=Vendor Unique<br>1=Standard Instructions that are defined in this document.<br>2=XML Object.<br>Other settings are prohibited. |
| 5 | 1 | Data Type Format.<br>0=Vendor Unique<br>1=ASCII Text<br>2=By the Standard Instructions compiler rules that are defined in this document<br>Other settings are prohibited. |
| 6<br>.<br>.<br>.<br>.<br>2048 | h | Instructions or Object. |

FIG.42

COMMUNICATION APPARATUS COMMUNICATING WITH RECORDING MEDIUM MEMORY AND RECORDING MEDIUM DRIVE APPARATUS

TECHNICAL FIELD

The present invention relates to a recording medium having a memory, a communication device for communicating with the memory of the recording medium, a recording medium drive unit for the recording medium with the memory, and an information processing apparatus capable of making a control based on information stored in the memory of the recording medium.

BACKGROUND ART

As a tape drive unit capable of writing data to a magnetic tape and reading data recorded on the magnetic tape, there is known a so-called tape streamer drive. The tape streamer drive is used in many applications such as back-up of data recorded on a recording medium such as a hard disc provided in a computer body or the like because a magnetic tape provided in a tape cassette has an extremely large recording capacity, that depends upon the length of the magnetic tape, such as tens to hundreds gigabytes. Also, the tape streamer drive is very suitable for storage of large-size data such as image data or the like.

For appropriate data recording to or reproduction from the magnetic tape in the tape cassette in a data storage system including the above-mentioned tape streamer drive and tape cassette, there are required various types of information on positions on the magnetic tape and a magnetic-tape use history are required as management information or the like for use by the tape streamer drive to manage the data recording and reproducing operations, etc.

To this end, an area for such management information is provided at the top of a magnetic tape or at the top of each of partitions formed on a magnetic tape. In the tape streamer drive, the area of the magnetic tape where management information is recorded is accessed and necessary management information is read from there before data is recorded to or reproduced from the magnetic tape, and operations are managed based on the management information for subsequent data recording or reproduction to be done appropriately.

After completion of the data recording or reproduction, the tape streamer drive accesses the management information area to rewrite the management information having to be changed due to the data recording or reproduction, the management information is thus rewritten for a next recording or reproduction. Thereafter, the tape cassette is unloaded or ejected from the tape streamer drive.

For data recording or reproduction to be done based on the management information as above, the tape streamer drive has to access the management information area at the top of the magnetic tape or each partition on the magnetic tape at the start of the data recording or reproduction to write or read the management data, and also access the management information area at the end of the data recording or reproduction to write or read the management information. That is, the tape cassette cannot be loaded or unloaded in any middle position on the magnetic tape where it is considered the data recording or reproduction has ended.

In the tape streamer drive, since the magnetic tape has to physically be fed for access to the management information area, access, made at the end of the data recording or reproduction, to the management information area at the top of the magnetic tape or at the top of each partition on the magnetic tape will take a long time. Especially, when the data recording or reproduction has ended in a rather far position on the magnetic tape from the management information area, the magnetic tape has to be fed over a correspondingly increased length and hence for an extra long time to access that area.

In the data storage system that uses a tape cassette as a recording medium, the time taken until one data recording or reproduction is complete, that is, a time after the management information area is accessed at the time of magnetic tape loading until that area is accessed again at the time of magnetic tape unloading, will be relatively long. The time required for such a series of access operations should desirably be as short as possible.

To this end, it has been proposed to provide a nonvolatile memory, for example, inside the tape cassette and store management information in the nonvolatile memory. In a tape streamer drive designed for use with such a tape cassette, an interface for data write to or read from the nonvolatile memory is provided to make it possible to read or write, from or to the nonvolatile memory, management information on the data recording to and reproduction from the magnetic tape. Thus, it is made unnecessary to rewind the magnetic tape to the tape top, for example, at each time of loading or unloading the tape cassette. That is, even with the magnetic tape being in a middle position, the tape cassette can be loaded or unloaded.

In the meantime, there is available a system compatible with the aforementioned tape cassette. It is a data storage system to back up data for a host computer. The data storage system normally includes a tape streamer drive capable of data recording to or reproducing from a tape cassette, and a host computer connected by a predetermined data interface to the tape streamer drive. For example, information stored in a hard disc of the host computer when recording it to the magnetic tape in the tape cassette is backed up according to a backup application software program started up in the host computer. Namely, according to the backup application software program, the host computer transfers the information stored in the hard disc to the tape streamer drive. Also, under the control of the host computer, the tape streamer drive drives the tape cassette loaded therein and writes the data transferred from the host computer's hard disc to the magnetic tape in the tape cassette according to the backup application software program. Thus, the information is backed up.

In this backup operation in the data storage system, by way of example, how to operate the tape cassette as a recording medium is all managed by a host system, namely, the host computer. In other words, the tape cassette itself cannot give the host system any designation of an intended operation corresponding to its own application or the like.

When the tape cassette is provided with a memory having management information stored therein, for example, the aforementioned data storage system can manage the data recording and reproduction by reading or writing the management information stored in the memory. Since the recording and playback based on the management information can be done on condition that a host system manages update of such management information or the like, the tape cassette is only operated according to the management information.

In the current data storage system in which the tape cassette is only operated according to a system operation, the tape cassette or tape streamer driver, subordinate to a host computer, for example, cannot control any system operation correspondingly to an intended use of the tape cassette and the like.

A system, using a tape cassette and constructed so that the tape cassette, tape streamer drive or the like can positively control the operation of a host system, will be more highly extensible and controllable.

DISCLOSURE OF THE INVENTION

Accordingly, the present invention has an object to overcome the above-mentioned drawbacks of the related art by providing a recording medium having a memory, a communication device for communicating with the memory of the recording medium, a recording medium drive unit for the recording medium with the memory, a recording medium housing device, and an information processing apparatus capable of making a control based on information stored in the memory of the recording medium.

The above object can be attained by providing a communication device for communicating with a memory means provided in a recording medium, the device including according to the present invention:

a communication means capable of communicating with the memory means provided in the recording medium and having at least a management information storage area where there is stored management information used to manage recording to, or reproduction from, the recoding medium; and a control means for making a control to write, by the communication means, instruction/object information in which there is stated an instruction to be carried out by a predetermined device to an instruction/object information storage area provided in the memory means.

Also the above object can be attained by providing a recording medium drive unit capable of having loaded therein a recording medium with a memory means having at least a management information storage area where there is stored management information used to manage recording to, or reproduction from, the recording medium and which can record or reproduce data to or from the recording medium, the apparatus including the present invention:

a communication means capable of communicating with the memory means; and a control means for making a control to write, by the communication means, instruction/object information in which there is stated a procedure to be carried out by a predetermined device to an instruction/object information storage area of the memory means.

Also the above object can be attained by providing a recording medium housing device including according to the present invention:

a housing means capable of housing a plurality of recording media each having a management information storage area where there is stored management information used to manage recording to, or reproduction from, the recording medium;

a recording medium carrying means having a mechanism capable of holding and carrying a recording medium to house or remove the recording medium into or from the housing means;

a communication means capable of communicating with the memory means provided in each recording means being carried by the recording medium carrying means; and a control means for making a control to write, by the communication means, instruction/object information in which there is stated an instruction to be carried out by a predetermined device to an instruction/object information storage area of the memory means.

Also the above object can be attained by providing an information processing apparatus including according to the present invention:

a communication means capable of communicating with a memory means provided in a recording medium and having at least a management information storage area where there is stored management information used to manage recording to, or reproduction from, the recording means and an instruction/object information storage area where there is stored instruction/object information in which there is stated an instruction to be carried out by a predetermined device; and a control means capable of causing the communication means to make communicating with the memory means and read the instruction/object information from the memory means and making a predetermined control according to the instruction stated in the read instruction/object information.

Also the above object can be attained by providing another information processing apparatus including according to the present invention:

a memory information reading means capable of communicating with a memory means provided in a recording medium and having at least a management information storage area where there is stored management information used to manage recording to or reproduction from the recording means and an instruction/object information storage area where there is stored instruction/object information in which there is stated an instruction to be carried out by a predetermined device and thus reading information from at least the memory means;

a communication means;

an information acquisition means for acquiring, via the communication means, the instruction/object information read by the memory information reading means from the memory means and in which there is stated the instruction to be carried out by the predetermined device; and a control means capable of making a predetermined control according to the instruction stated in the instruction/object information acquired by the information acquisition means.

Also the above object can be attained by providing a recording medium including according to the present invention:

a memory means having at least a management information storage area where there is stored management information used to manage recording to, or reproduction from, a recording means and an instruction/object information storage area where there is stored instruction/object information in which there is stated an instruction to be carried out by a predetermined device.

According to the present invention, the memory provided in the recording medium can store the management information used to manage recording to, or reproduction from, the recording medium as well as the instruction/object information in which there is stated the instruction to be carried output by the predetermined device. The instruction/object information is written to the memory by the communication device, recording medium drive unit and recording medium housing device, each provided with the communication means capable of communicating with the memory.

The information processing apparatus according to the present invention acquires the instruction/object information directly from the memory or uses the instruction/object information acquired from any other information reader having read the instruction/object information from the memory to make a predetermined control according to the content of the instruction/object information. That is, according to the present invention, an operation to be done by the system to a recording medium is designated by the instruction/object information. In other words, the entire system operation can be controlled by a subordinate system such as the recording medium.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 8 explains a manufacture part of the remote memory chip.

FIG. 10 explains a cartridge serial number of the remote memory chip and a scratch pad memory.

FIG. 11A explains a manufacturer identifier in the remote memory chip, and FIG. 11B explains a secondary identifier.

FIGS. 28A, 28B and 28C are perspective views showing the mode of using an instruction/object information in a second example of the system operation.

FIG. 32 explains an example content of the instruction/object information used in the first example system operation.

FIG. 34 explains an example content of the instruction/object information used in the second example of the system operation.

FIG. 35 explains the data structure of a WRITE ATTRIBUTE command.

FIG. 36 explains the data structure of a READ ATTRIBUTE command.

FIG. 37 explains the structure of an ATTRIBUTE data.

FIG. 38 explains the defined content of an ATTRIBUTE ID.

FIG. 39 explains the defined content of the ATTRIBUTE ID belonging to Medium Common Attributes.

FIGS. 40A and 40B explain the defined content of MEDIUM TYPE.

FIGS. 41A and 41B explain the defined content of the ATTRIBUTE ID belonging to Host Common Attributes.

FIG. 42 explains the structure of the ATTRIBUTE data as an instruction for the cartridge.

BEST MODE FOR CARRYING OUT THE INVENTION

Figure 1A:
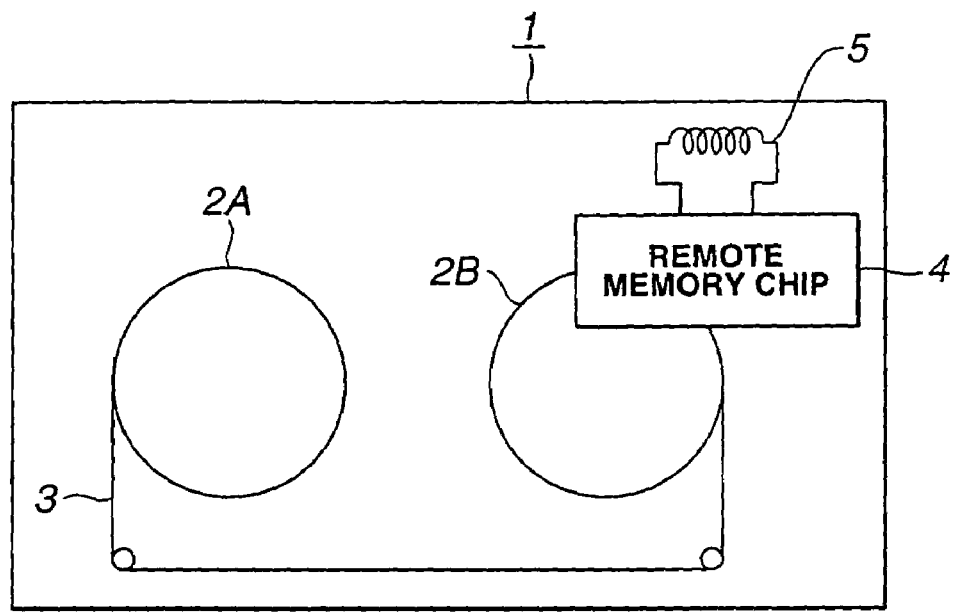
FIG. 1A is a schematic plan view of an example of the internal structure of a tape cassette used in the present invention.

The embodiments of the present invention will be described herebelow with reference to the accompanying drawings.

The present invention will be described concerning a data storage system using a tape cassette having a nonvolatile memory provided therein as a recording medium and including a tape drive unit capable of recording or reproducing digital data to or from the tape cassette with the memory, namely, a tape steamer drive, a library unit capable of housing a plurality of tape cassettes and loading a selected one of the tape cassettes into the tape streamer drive, a data write/read unit as an external communication device, host computer, etc.

The present invention will be described in the following order:
1. Tape cassette construction
2. Remote memory chip construction and communication method
3. MIC data structure
4. Tape streamer drive construction
5. Host computer construction
6. Library unit construction
7. Data write/read unit
8. Example application of instruction/object information (first example)
   8.1 Operation overview
   8.2 Host interface format
   8.3 Processing operations
9. Example application of instruction/object information (second example)
   9.1 Operation overview
   9.2 Processing operations
10. Example application of instruction/object information (third example)
11. Other example applications of instruction/object information 1. Tape Cassette Construction First, the tape cassette used in the tape streamer drive according to the present invention will be explained with reference to FIGS. 1 and 2.

FIG. 1A schematically shows the internal structure of the tape cassette provided in the remote memory chip. As shown, a pair of reels 2A and 2B is provided inside the tape cassette 1, and a magnetic tape 3 of 8 mm in width is extended between and over the reels 2A and 2B. The tape cassette 1 has provided therein a remote memory chip 4 incorporating a nonvolatile memory and a control circuitry etc. for the nonvolatile memory. The remote memory chip 4 is provided for radio data communicating with a remote memory interface 30 in a tape streamer drive which will be described in detail later, and an antenna 5 is provided for the purpose of the radio transmission. The remote memory chip 4 stores manufacture information and serial number information on each tape cassette, tape thickness and length, material, recorded-data use history for each partition, user information, etc.

Note that in the present invention, various kinds of information stored in the remote memory chip 4 are collectively called "management information" because they are used mainly for management of the data recording to, or reproduction from, the magnetic tape 3.

The tape streamer drive using the tape cassette having provided inside the housing thereof the nonvolatile memory having management information stored therein is provided with an interface for write to or read from the nonvolatile memory. Thus, the tape streamer drive can efficiently record or reproduce data to or from the magnetic tape by reading or writing management information on the data recording to, or reproduction from, the magnetic tape to or from the nonvolatile memory. For example, the magnetic tape has not to be rewound to the top thereof at the time of loading or unloading the tape cassette, that is, the tape cassette can be loaded or unloaded even with the magnetic tape staying in the middle position. Also, data can be edited by rewriting the management information in the nonvolatile memory. Further, more partitions can be set on the magnetic tape more easily and managed more appropriately.

Figure 1B:
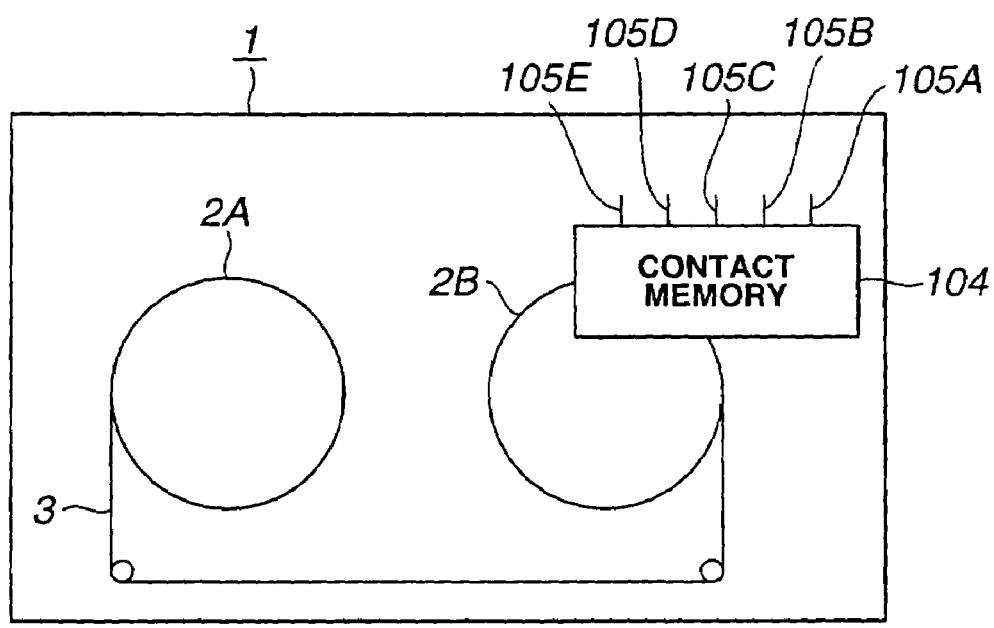
FIG. 1B is a schematic plan view explaining another example of the internal structure of the tape cassette used in the present invention.

FIG. 1B is a schematic plan view of a tape cassette 1 having a contact memory 104, for example, a nonvolatile memory, provided therein. As shown, in the tape cassette 1, the contact memory 104 has five terminals 105A, 105B, 105C, 105D and 105E led out from the module thereof and which are used as a power terminal, data input terminal, clock input terminal, grounding terminal and auxiliary terminal, respectively. The contact memory 104 stores similar management information to those stored in the remote memory chip 4.

The tape cassette 1 used in the present invention can also store, as information for storage into the remote memory chip 4 or contact memory 104, "instruction/object information" in which there are stated procedures to be carried out by a tape streamer drive 10, host computer 40 and the like. Since the instruction/object information can be used to given an instruction to the tape streamer drive 10 or a host system such as the host computer 40 to positively control the system operation, it is different in meaning from the aforementioned management information.

The nonvolatile memory provided in the tape cassette as in the above description will also be called "MIC (memory in cassette)". As seen from the above explanation, the MIC in this embodiment includes the remote memory chip 4 and contact memory 104. Therefore, the remote memory chip 4 or contact memory 104 will also be referred to simply as "MIC" hereunder unless it is specially necessary to differentiate them.

Figure 2:
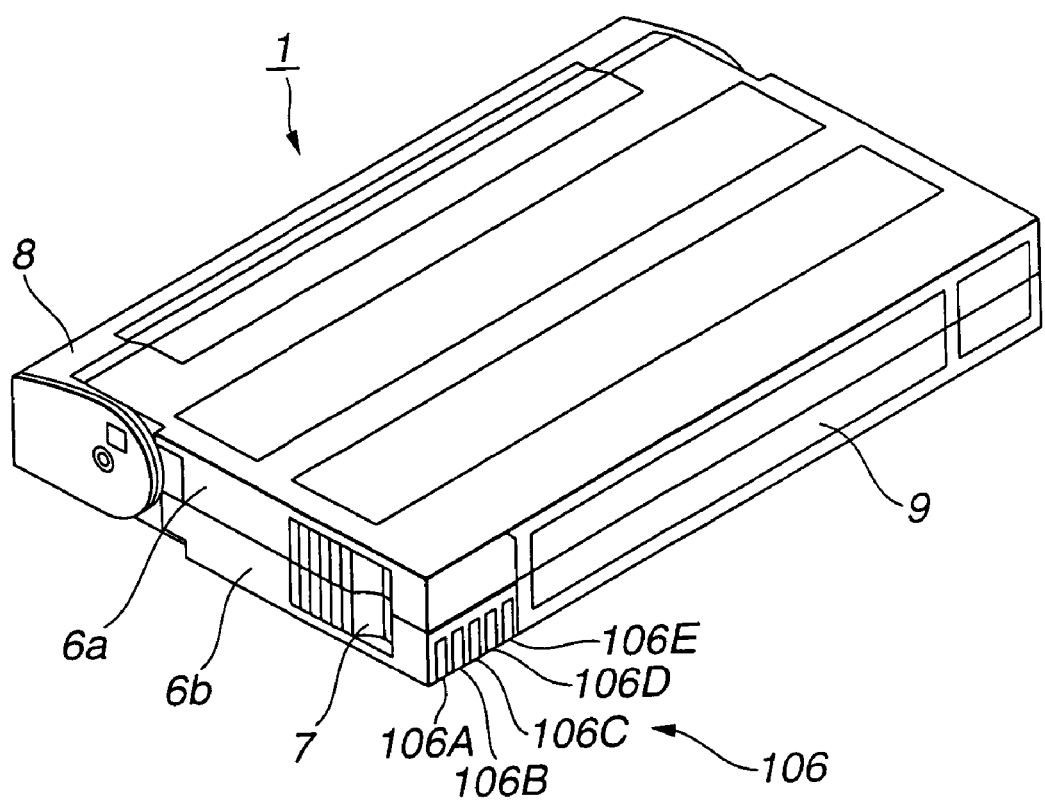
FIG. 2 is a perspective view of the tape cassette used in the present invention.

FIG. 2 shows the appearance of the tape cassette 1 shown in FIGS. 1A and 1B. As shown, the tape cassette 1 has a housing formed from an upper case 6a, lower case 6b and a guard panel 8. Namely, The tape cassette 1 is basically similar in construction to a tape cassette used in the ordinary 8-mm VTR (video tape recorder).

The tape cassette 1 has a label-attached surface 9 at the rear thereof near which a terminal block 106 is provided. The terminal block 106 corresponds to a portion of the tape cassette 1 incorporating the contact memory 104 as shown in FIG. 1B, where electrodes are provided, and has five terminal pins 106A to 106E provided thereon. These terminal pins are connected to the terminals 105A to 105E, respectively, shown in FIG. 1B. That is, the tape cassette 1 having the contact memory 104 is put into physical contact at the terminal pins 106A, 106B, 106C, 106D and 106E with the terminals 105A, 105B, 105C, 105D and 105E, respectively, and thus transmits and receives data signals etc. to and from the tape streamer drive.

On the other hand, the tape cassette 1 shown in FIG. 1A incorporates the remove memory chip 4 of the noncontact type and thus needs no terminals pins. However, the tape cassette 1 appears as shown in FIG. 2. That is to say, the tape cassette 1 shown in FIG. 1A has also a dummy terminal block 106 so that it can be loaded into a tape drive or the like with an interchangeability with the tape cassette 1 shown in FIG. 1B.

Note that there is well known a tape cassette provided with a noncontact remote memory chip (not shown) formed like a label. The tape cassette has attached in place on the housing thereof a label in which a remote memory chip is formed. When the tape cassette 1 having the remote memory chip provided therein is loaded in the tape streamer drive 10, communications can be made between the remote memory chip and a memory communication unit provided in the tape streamer chip 10.

As shown in FIG. 2, a concavity is formed on each of opposite lateral sides of the cassette housing. When a library unit 50 which will be described in detail later is carried, for example, the tape cassette is held at the concavity 7.

2. Remote Memory Chip Construction and Communication Method

Figure 3:
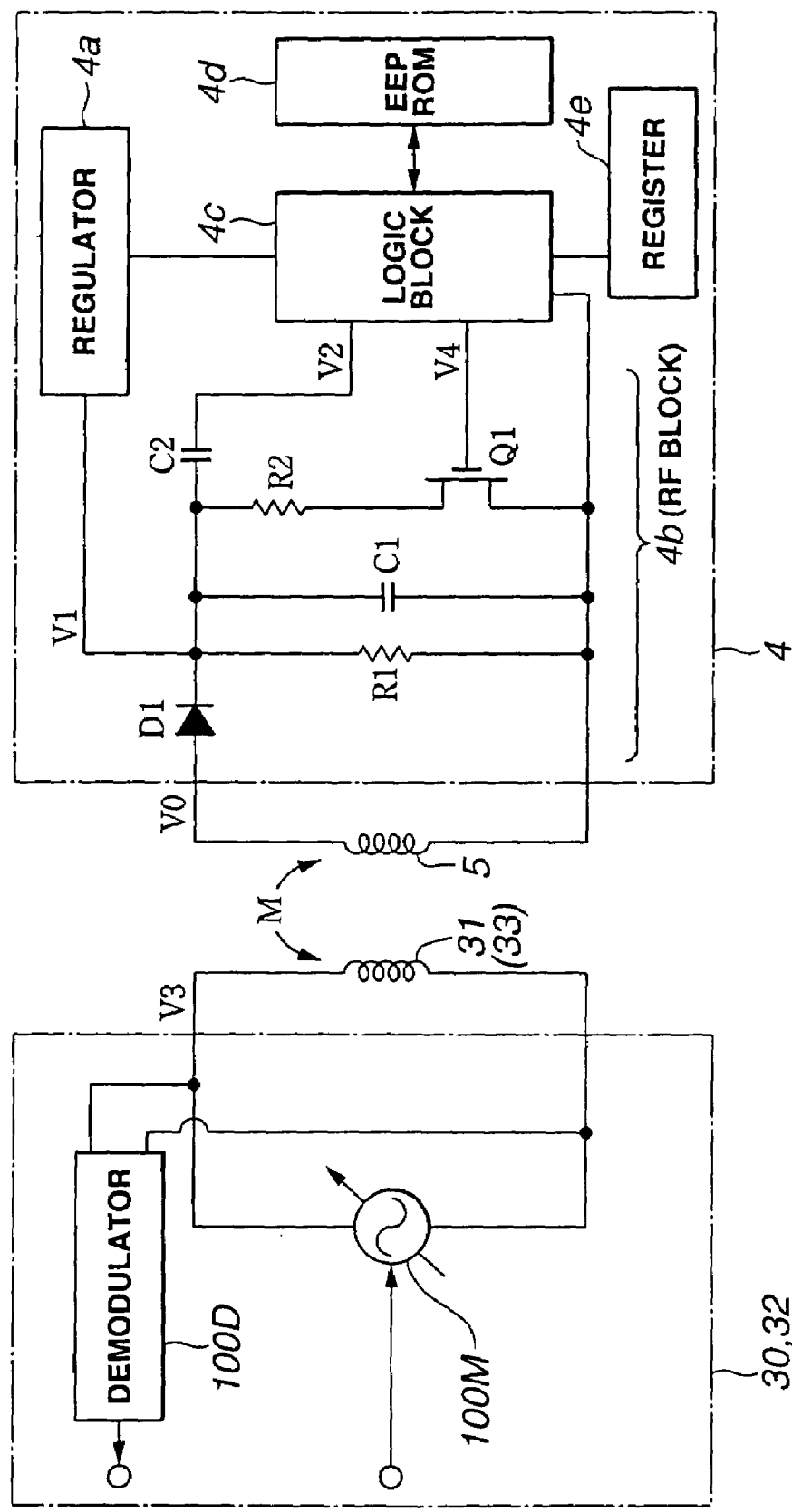
FIG. 3 is a circuit diagram illustrating and explaining the construction of a remote memory chip housed in the tape cassette used in the present invention and a communication method adopted in the present invention.

FIG. 3 shows the constructions of the remote memory chip 4 provided in the tape cassette 1 and remote memory interface 30 (32) provided in the tape streamer drive and library unit 50 to make communicating with the remote memory chip 4. It should be noted that FIG. 3 illustrates the remote memory interface 30 (32) in the form of a schematic block diagram intended for explanation of the communication method. The construction will be described in detail later as that of the remote memory interface 32 with reference to FIG. 21.

As shown in FIG. 3, the remote memory chip 4 includes a regulator 4a, RF block 4b, logic block 4c, EEP-ROM 4d and a register 4e as semiconductor ICs. For example, the remote memory chip 4 thus constructed is mounted on a printed circuit board disposed inside the tape cassette 1, and a copper foil pattern formed on the printed circuit board provides an antenna 5. The remote memory chip 4 is supplied with an external power in a noncontact manner. The communications between the tape steamer drive 10 and library unit 50, which will be described in detail later, are made with a carrier of 13.56 MHz for example. The electromagnetic fields from the tape streamer drive 10 and library unit 50 are received by the antenna 5 and the regulator 4a converts the carrier of 13.56 MHz into a DC power. The DC power is used as an operating power and is supplied to the RF block 4b, logic block 4c and register 4e.

The RF block 4b has connected thereto a diode D1, resistors R1 and R2, capacitors C1 and C2 and a switching element Q1 for example as shown in FIG. 3, and received information, namely, an induced voltage V2, is supplied to the logic block 4c while information to be transmitted is modulated with a switching control voltage V4 from the logic block 4c.

The logic block 4c controls decoding of a signal received from the RF block 4b and an operation corresponding to decoded information (command) such as write to and read from the EEP-ROM 4d.

The register 4e is loaded with data stored in the EEP-ROM 4d, such as a session identifier which will be described in detail later, and the value in the register 4e is added to data to be transmitted to the remote memory interfaces 30 and 32.

Note that the logic block 4c and register 4e are shown separately in FIG. 3 for the convenience of the explanation but the register 4e should actually be incorporated in a chip as the logic block 4c.

On the other hand, in the remote memory interfaces 30 and 32, the carrier 13.56 MHz is modulated with transmitted data in a modulator 100M and transmitted to the remote memory chip 4 via an antenna 31 (33). The information transmitted from the remote memory chip 4 is demodulated by a demodulator 100D to provide data.

Next, the operation for communications between the remote memory chip 4 and remote memory interfaces 30 and 32 will be described.

The communication between the remote memory chip 4 and remote memory interfaces 30 and 32 is based on the theory of electromagnetic induction.

Figure 4:
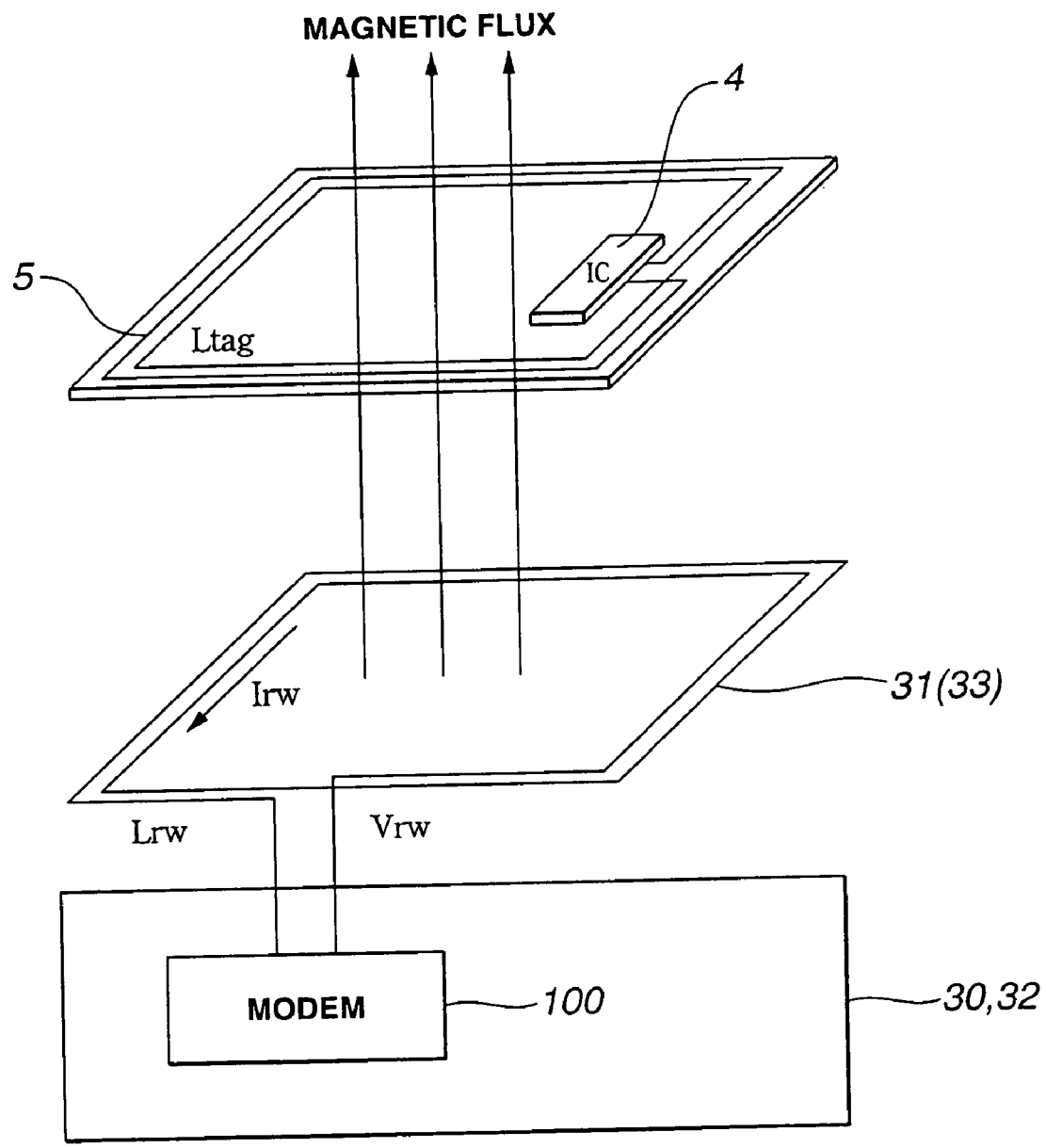
FIG. 4 is a diagram illustrating and explaining a communication theory adopted in the present invention.

As shown in FIG. 4, the antenna 31 (33) connected to the remote memory interfaces 30 and 32 is formed from a loop coil Lrw to develop a magnetic field circumferentially of the loop coil Lrw by supplying a current Irw to the antenna 31 (33). On the other hand, the antenna 5 connected to the remote memory chip 4 is also formed from a loop coil Ltag.

The magnetic field radiated from the loop coil Lrw will induce a voltage at the end of the loop coil Ltag, and the induced voltage is supplied to an IC as the remote memory chip 4.

The degree of coupling between the antenna 31 (33) and antenna 5 varies depending upon the positional relation between them. It is deemed that the loop coils forming these antenna are magnetically coupled to each other to form a transformer. Therefore, they can be modeled as shown in FIG. 3. A resonant capacitor may be connected to the antenna 31 (33) to increase the communication distance (not shown in FIG. 3). Thus, when the magnetic field by which the loop coils Lrw and Ltag are coupled to each other becomes smaller as the communication distance is longer, the magnetic field reduction can be compensated by the resonance. That is, since the resonance causes a higher voltage to be developed on the loop coil Ltag, a necessary power for the remote memory chip 4 is obtainable over a correspondingly longer distance. Also, since the impedance of the resonant circuit is increased, the variation in amplitude of the loop coil Lrw is transmitted more efficiently by the loop coil Ltag during the transmission and also the variation in impedance of the remote memory chip 4 is transmitted more efficiently during the reception. It should be noted that the impedance variation will be described in detail later.

The magnetic field radiated from the antenna 31 (33) and the induced voltage in the remote memory chip 4 vary depending upon the current flowing through the antenna 31 (33). Therefore, the remote memory interfaces 30 and 32 can transmit data to the remote memory chip 4 by causing the modulator 100M to modulate the current through the antenna 31 (33). That is, the remote memory interfaces 30 and 32 will modulate the transmitted data with the magnetic field and the remote memory chip 4 will demodulate the data from a component of the input induced voltage, passed through the diode D1 and capacitor C2, namely, from the AC component V2 developed after the rectification of the induced voltage.

When returning the data to the remote memory interfaces 30 and 32, the remote memory chip 4 operates to vary the input impedance correspondingly to the transmitted data. Therefore, the remote memory chip 4 has not provided at its own side any oscillator to transmit data. Namely, the logic block 4c supplies transmitted data V4 to the gate of the switching element Q1 to switch the switching element Q1. Thus, the influence of the resistor R2 on the input impedance is turned on and off for variation of the input impedance. When the impedance of the terminal of the antenna 5 of the remote memory chip 4 varies, the impedance of the antenna 31 (33) magnetically coupled to the antenna 5 varies also, resulting in variations of the current Irw and voltage Vrw between the terminals of the antenna 31 (33). The remote memory interfaces 30 and 32 can receive data from the remote memory chip 4 by demodulating the variation of the data by means of the demodulator 100D thereof.

The remote memory chip 4 itself has no battery and is supplied with a source voltage from the DC component of a voltage V1 resulted from the modulation, by the regulator 4a, of a voltage V0 induced by the antenna 5 as have previously been described.

Since the induced voltage V0 is varied correspondingly to the operation of the remote memory chip 4 and transmitted or received data, it should be stabilized by the regulator 4a for stable operation of the remote memory chip 4. So, to make communicating with the remote memory chip 4, the remote memory interfaces 30 and 32 outputs a carrier from the antenna 31 (33) beforehand to energize the remote memory chip 4. The energized condition is maintained until a series of communication accesses (write and read) is complete. For transmission of a write or read command, the remote memory interfaces 30 and 32 makes ASK modulation of the carrier to transmit the command data to the remote memory chip 4. When receiving, from the remote memory chip 4, an acknowledge of the command data reception, the remote memory interfaces 30 and 32 obtains received data from the carrier by making ASK demodulation of the latter.

For a period for which access to the remote memory chip 4 is repeated, the energized condition of the remote memory chip 4 is maintained until the remote memory interfaces 30 and 32 keeps outputting the carrier.

In the remote memory chip 4, a necessary data clock for the communications is generated by the logic block 4c by dividing the carrier frequency of 13.56 MHz from the remote memory interfaces 30 and 32.

A signal transmitted from the remote memory interfaces 30 and 32 to the remote memory chip 4 is resulted from ASK modulation of a carrier of 13.56 MHz with transmitted data.

FIGS. 5A and 5B show an ASK-modulated signal. A carrier A0 is modulated with a transmitted data Vs as shown in FIG. 5A to provide an ASK-modulated signal V3 as shown in FIG. 5B. The modulated wave V3 is given by V3=A0(1+k*Vs(t)).

Note that the degree of the ASK modulation is 15% for example.

FIGS. 6A to 6D show signals transmitted from and received by the remote memory chip 4.

Figure 6:
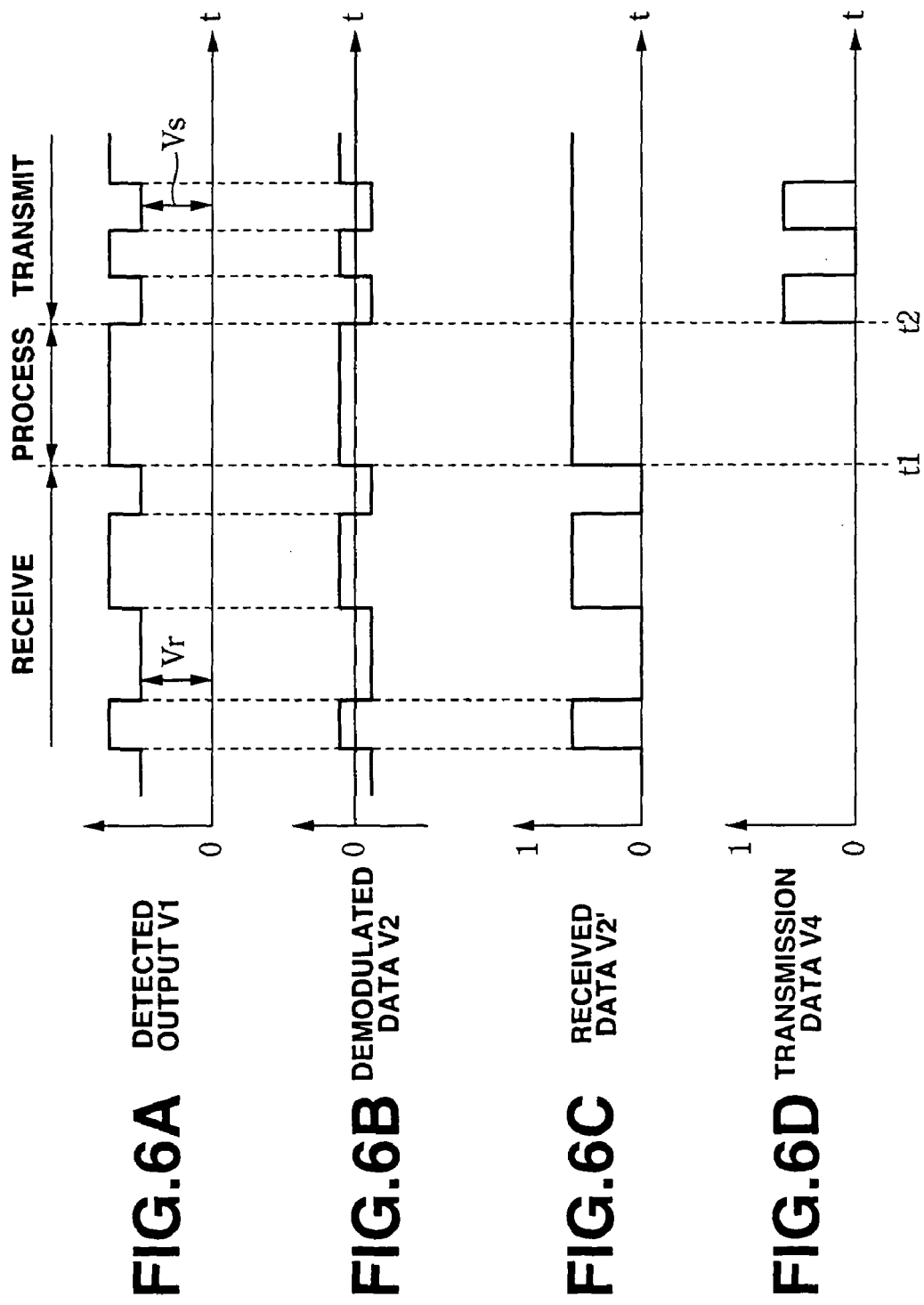
FIG. 6A shows a detection output V1 of a carrier envelop-detected by a detection circuit.
FIG. 6B is a waveform chart of demodulated data V2.
FIG. 6C is a waveform chart of a demodulated actual reception data V2'.
FIG. 6D is a waveform chart of transmitted data V4.

The aforementioned ASK-modulated wave V3 generated by the remote memory interfaces 30 and 32 appears as the induced voltage V0 on the antenna 5 of the remote memory chip 4. A carrier envelope-detected by a detection circuit (diode D1) is provided as a detection output V1 as shown in FIG. 6A. The detection output V1 includes data transmitted by the remote memory chip 4 itself in addition to the data transmitted from the remote memory interfaces 30 and 32.

The DC component is cut by the capacitor C2, and the demodulated data V2 as shown in FIG. 6B is supplied to the logic block 4c. The logic block 4c ORs with the supplied demodulated data V2 in a reception window ti to restore an actual received data V2' as shown in FIG. 6C. Thus, the remote memory chip 4 acquires the data transmitted from the remote memory interfaces 30 and 32.

The remote memory chip 4 having received the data transmits necessary data to the remote memory interfaces 30 and 32 after processing the data for periods t1 and t2. As the switching element Q1 is turned on and off by the transmitted data V4 shown in FIG. 6D for example, the impedance is varied as above, whereby the data is transmitted from the remote memory interfaces 30 and 32. In this case, the ratio of impedance variation is more than 50% for example.

In the remote memory interfaces 30 and 32, since an impedance variation in the remote memory chip 4 causes the current Irw and voltage Vrw in the antenna 31 (33) magnetically coupled to the remote memory chip 4, the variation is detected by the demodulator 100D to demodulate the received data. The modulated wave V3 is given by V3=A0*(1+m*V4(t)). Since the degree of the magnetic coupling greatly depends upon the distance between the remote memory chip 4 and remote memory interfaces 30 and 32, it is appropriate to vary the impedance of the remote memory chip 4 at a larger ratio. It should be noted that also at the remote memory interfaces 30 and 32, a detection output as in FIG. 6A is acquired and a signal shown in FIG. 6B is binarized to provide a received data as shown in FIG. 6C.

The above are the operations of data transmission and reception made between the remote memory interfaces 30 and 32 and the remote memory chip 4.

(3) MIC Data Structure

Next, the structure of data stored in the EEP-ROM 4d of the MIC (remote memory chip 4 and noncontact memory 104) will be described. It should be noted that the term "MIC" referred to herein and in the accompanying drawings stands for "memory in cassette" and it refers to the remote memory chip 4 and noncontact memory 104.

Figure 7:
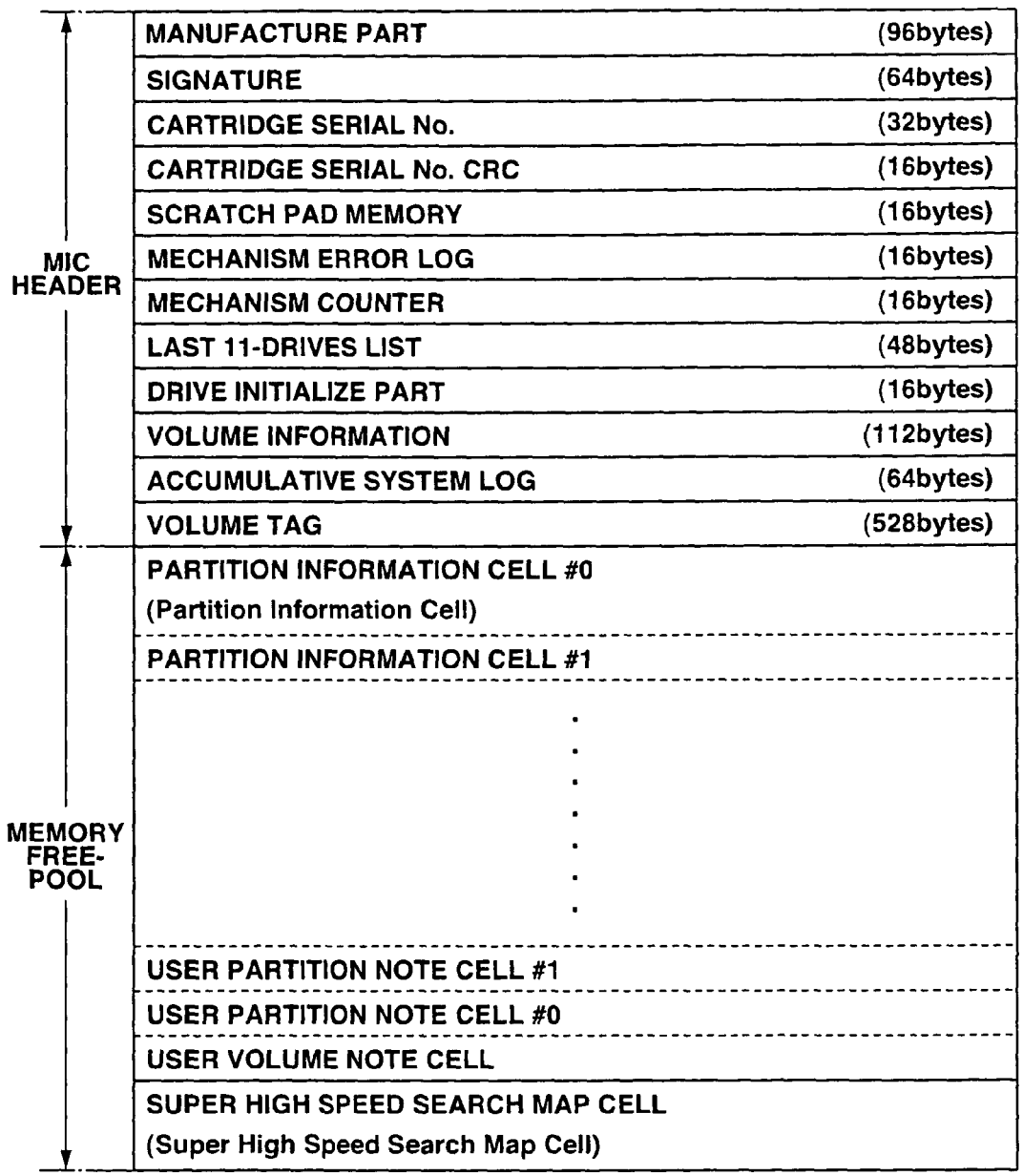
FIG. 7 explains a logical format of the remote memory chip.

FIG. 7 schematically illustrates an example of the structure of data stored in the EEP-ROM 4d. In the storage area of the EEP-ROM 4d, there are set an MIC header and memory free-pool as shown. In these MIC header and memory free-pool, there are written various kinds of management information including information on manufacture of a tape cassette, information on the tape when initialized, information on each partition defined on the tape, etc.

In the leading part of the MIC header, 96 bytes are first used as "Manufacture Part" where various kinds of information on manufacture of a tape cassette are stored.

Next, there are set an area of 64 bytes used to state "Signature", an area of 32 bytes for "Cartridge Serial Number", an area of 16 bytes for "Cartridge Serial Number CRC" and an area of 16 bytes for "Scratch Pad Memory".

Also, in the MIC header, there is set a 16-byte area for "Mechanism Error Log", 16-byte area for "Mechanism Counter" and an 48-byte area for "Last 11-Drives List".

Further, the MIC header has set therein 16-bytes for "Drive Initialize Part" where there are stored mainly information on the tape when initialized.

Moreover, in the MIC header, there is set an area where there is stored basic management information on the entire tape cassette as 112-byte "Volume Information". Also, there is set an area of 64 bytes for "Accumulative System Log" where information on a history of the tape cassette use since its manufacture is stored. The MIC header has set in the trailing end portion thereof an area of 528 bytes for "Volume Tag".

The memory free-pool is an area where there can additionally be stored management information. In the memory free-pool, various kinds of information are stored/updated correspondingly to operations of recording and reproduction and as necessary. It should be noted that one unit of data groups stored in the memory free-pool is called "cell".

First, "Partition Information Cell #1, #2 . . . " each being management information on each of magnetic partitions formed on the magnetic tape 3 are sequentially written to the memory free-pool starting at the leading end of the latter. That is, the memory free-pool has formed therein as many partition cells as the partitions formed on the magnetic tape 3.

"Super High Speed Search Map Cell" is written as high-speed search map information to the memory free-pool starting at the trailing end of the latter.

Next, "User Volume Note Cell" and "User Partition Note Cells #0 and #1" are written to the memory free-pool starting at the trailing end of the latter. The "User Volume Note Cell" is information including a comment etc. entered by the user as to the entire tape cassette, and the "User Partition Note Cells" are information including a comment etc. entered by the user as to each of the partitions on the magnetic tape 3. Therefore, these pieces of information are stored when the user designates writing of them and thus all of them are not stated. Intermediate areas where such information is not stored remains as they are as a memory free-pool for future writing.

The manufacture part in the MIC header is configured as shown in FIG. 8 for example. It should be noted that the size of each data (in bytes) is shown at the right. At the first byte of the manufacture part, checksum of data in the manufacture part is stored as a manufacture part checksum. The manufacture part checksum is given during the manufacture of the tape cassette.

In the manufacture part, data from "mic type" to "offset" are stated as actual data forming the manufacture part. It should be noted that "reserved" as in FIG. 8 indicates an auxiliary area destined for future data storage.

The data "mic type" indicates the type of MIC (remote memory chip 4 and noncontact memory 104) actually provided in the tape cassette.

In "mic manufacture date" in FIG. 8, there is stated the date (and time) on which the MIC was manufactured.

In "mic manufacture line name", there is stated the name of a line along which the MIC was manufactured.

In "mic manufacture plant name", there is stated the name of a plant in which the MIC was manufactured.

In "mic manufacturer name", there is stated the name of a manufacturer having manufactured the MIC.

In "mic name", there is stated the name of a vendor having sold the MIC.

In "cassette manufacture date", "cassette manufacture line name", "cassette manufacture plant name", "cassette manufacturer name" and "cassette name", there are stated information on the cassette itself similar to the aforementioned information as to the MIC.

In "oem customer name" in FIG. 8, there is stated the name of a company to which the OEM (original equipment manufacturer) product is directed.

in "physical tape characteristic ID", there is stated information including physical characteristics of a magnetic tape such as tape material, tape thickness, tape length, etc.

In "maximum clock frequency", there is stated a maximum clock frequency supported by the MIC.

In "block size", there is stated a data-length unit, as a characteristic of the MIC (remote memory chip 4 and noncontact memory 104) for example, indicating how many bytes of data the MIC can transfer by one communication with the remote memory interfaces 30 and 32.

In "mic capacity", there is stated the storage capacity of the EEP-ROM 4d in the MIC (remote memory chip 4 and noncontact memory 104).

In "write protect top address", there is stated the start address of a write-protected area. This information is used to protect a predetermined partial area of the MIC against data write.

In "write protected count", there is stated an number of bytes in the write-protected area. That is, an area occupied by a number of bytes indicated by the "write protected count" area is se as a write-protected area based on an address defined by the write-protected area start address.

In "application ID", there is stated an identifier of an application. In "offset", there is stated an offset.

Figure 9:
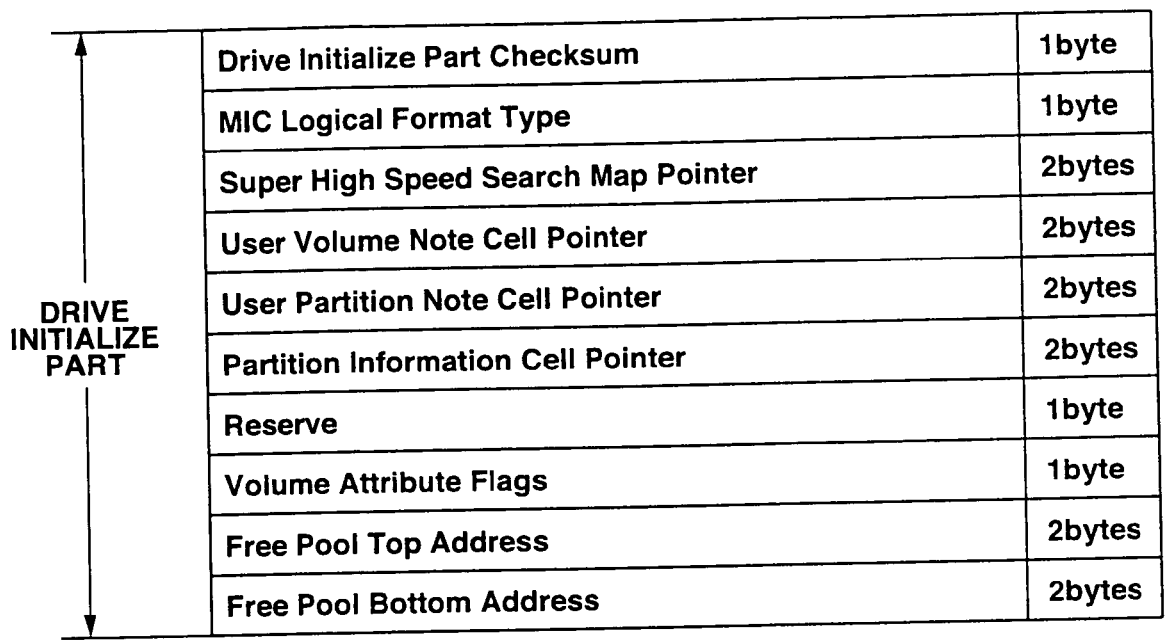
FIG. 9 explains a drive initialize part of the remove memory chip.

Next, the structure of the drive initialize part of the MIC header will be described herebelow with reference to FIG. 9. It should be noted that the size of each data (in bytes) is shown at the right.

In "Drive Initialize Part Checksum" in the drive initialized part, there is first stated a checksum form data in the drive initialize part.

In the drive initialize part, there are stated "MIC Logical Format Type" to "Free Pool Bottom Address" as actual data forming the drive initialize part.

First in "MIC Logical Format Type", there is stated an ID number of a logical format of the MIC (remote memory chip 4 and noncontact memory 104). The MIC formats include, for example, a basic MIC format as well as a firmware update tape MIC format, reference tape MIC format, cleaning cassette MIC format. The ID number corresponds to a MIC format of the tape cassette.

In "Super High Speed Search Map Pointer", there is stated a point indicating the start address of the "Super High Speed Search Map Cell" in FIG. 7.

In "User Volume Note Cell Pointer", there is stated the start address of an area from or to which the user can freely read or write data to the tape cassette via SCSI, that is, the start address of the "User Volume Note Cell" shown in FIG. 7.

In "User Partition Note Cell Pointer", there is stated the start address of an area from or to which the user can freely read or write data to each partition via SCSI, that is, the start address of the "User Partition Note Cell" shown in FIG. 7. It should be noted that a plurality of "User Partition Note Cells" in some cases but in such case the "User Partition Note Cell Pointer" indicates the start address of the leading one of the plurality of "User Partition Note Cells".

In "Partition Information Cell Pointer", there is stated the start address the "Partition Information Cell #0" shown in FIG. 7.

The partition information written into the memory free-pool is formed for each of the partitions formed on the magnetic tape 3. All the Partition Information Cells #0 to #N are coupled to each other in a linkage structure by pointers. That is, the "Partition Information Cell Pointers" provide routes indicating the address of the partition #0 and the pointers of the subsequent "Partition Information Cells" are stated in the preceding "Partition Information Cell".

The aforementioned pointers (Super High Speed Map Pointer, User Volume Note Cell pointer, User Partition Note Cell Pointer and Partition Information Cell Pointer) manage the data positions in a field FL4.

In "Volume Attribute Flags", there are stated flags each of 1 byte intended to provide a logical write protect tab for the MIC (remote memory chip 4).

In "Free Pool Top Address" and "Free Pool Bottom Address", there are stated the start and end addresses of a memory free-pool in the field FL4 at that time. Since an area as the memory free-pool varies correspondingly to write or erase of partition information, user partition note, etc., the free-pool top and bottom addresses are updated correspondingly.

The areas "Cartridge Serial Number", "Cartridge Serial Number CRC" and "Scratch Pad memory" shown in FIG. 7 will be described in detail below with reference to FIG. 10.

First, in "Cartridge Serial Number" of 32 bytes, there is stated a serial number being 32-character information based on the ASCII code for example. The "Cartridge Serial Number" is composed of upper 16-byte number (Cartridge Serial Number High) and lower 16-byte number (Cartridge Serial Number Low).

The "Cartridge Serial Number CRC" of 16 bytes is composed of "Manufacture ID" of 1 byte, "Secondary ID" of 1 byte, "Cartridge Serial Number Checksum" of 1 byte, "Cartridge Serial Number CRC" of 2 bytes, and "Reserved" of 11 bytes.

In "Manufacture ID", there is stated a code number for the manufacturer of the tape cassette 1 as the manufacturer identifier as shown in FIG. 11A for example.

In "Secondary ID", there is stated a secondary identifier corresponding to the type of the tape cassette 1 as shown in FIG. 11B, namely, tape attribute as a 1-byte code.

In "Cartridge Serial Number Checksum", there is stated checksum of the "Cartridge Serial Number", "Manufacture ID" and "Secondary ID".

In "Cartridge Serial Number CRC", there is stated CRC of the 2-byte Cartridge Serial Number.

Data of 48 bytes being an addition of "Cartridge Serial Number" of 32 bytes and "Cartridge Serial Number CRC" of 16 bytes is a number unique to each tape cassette and stated at the time of shipment of the tape cassette.

That is to say, since no tape cassettes identical in serial number of 48 bytes to each other exist, the serial number of 48 bytes is used for authentication with the remote memory chip 4 in a tape cassette. It should be noted that the 48 bytes being the addition of "Cartridge Serial Number" and "Cartridge Serial Number CRC" will also be referred to simply as "Serial number" for the convenience of the explanation. The authentication will be described in detail later. However, in the communications between the remote memory chip 4 and remote memory interfaces 30 and 32, the 48-byte serial number is divided into three blocks each of 16 bytes for such communications. The first block is the "Cartridge Serial Number High" of 16 bytes, the second block is the "Cartridge Serial Number Low" of 16 bytes, and the third block is the entire "Cartridge Serial Number CRC" of 16 bytes including the "Manufacture ID" etc.

The "Scratch Pad Memory" of 16 bytes is composed of "Scratch Pad Memory Checksum" of 1 byte, "Session ID" (will also be referred to as "SID" in the explanation and illustration) of 1 byte, and "Reserved" of 14 bytes.

In "Scratch Pad Memory Checksum", there is stated checksum of data in a scratch pad memory area.

According to the present invention, the library unit 50 and MIC (remote memory chip 4) in the tape cassette can make noncontact communications, for example, wireless communications, with each other. The session identifier is a communication identifier given to the MIC (remote memory chip 4) as a result of an authentication have been made during the wireless communication.

Also, according to the present invention, for example, the library unit 50 authenticates the remote memory chip 4 for the remote memory interfaces 30 and 32 to make a communication with the remote memory chip 4, and gives a corresponding session identification to the remote memory chip 4. For access to the remote memory chip 4, a session identifier of 1 byte is included in a command to identify a specific tape cassette, more specifically, the remote memory chip 4 provided inside the specific tape cassette for a correct communication with the remote memory chip 4.

The session identifier given by the library unit 50 or the like is stored into the scratch pad memory area in the EEP-ROM 4d.

Note that as a session identifier to be given to a tape cassette after the authentication, a value unique to each of tape cassettes in the library unit 50 for example will be selected. The session identifier is used for a communication between the library unit 50 and the remote memory chip 4 in the specific tape cassette.

The scratch pad memory area in the contact memory 104 should be saved as an undefined (reserved) area. Also when such a session identifier is used for a communication between the contact memory 104 and any system device, the scratch pad memory area should be defined for use to store the session identifier.

According to the present invention, instruction/object information is stored in the MIC as having previously been described.

In the present invention, the area in the MIC data structure where the instruction/object information is to be stored is not limited to any special place but the instruction/object information may be stored in a predetermined area in the "Volume Information" part shown in FIG. 7 for example. The "Volume Information" part is originally an area where basic management information for the entire tape cassette is to be stored. However, the "Volume Information" part is defined herein as an area where not only the management information but also basic information for the entire tape cassette are to be stored.

The size of "Volume Information" is of 112 bytes. However, if the data size of 112 bytes is not sufficient for storage of instruction/object information having a predetermined size for example, it may be extended to larger than 112 bytes.

(4) Tape Streamer Drive Construction

According to the present invention, a system using tape cassettes is composed of a tape streamer drive 10 to write or read data to or from the magnetic tape 3 in the aforementioned tape cassette 1, a library unit 50 to house many tape cassettes 1 and load a selected tape cassette 1 into the tape streamer drive 10, and a host computer 40 to control the operations of the other components, for example. Further, the system includes a data write/read unit 150 that is a portable device capable of communicating with the remote memory chip 4 in the tape cassette. In case the tape streamer drive 10 includes a remote memory interface 30 capable of communicating with the remote memory chip 4, the data write/read unit 150 can make data communicating with the tape streamer drive 10 through communicating with the remote memory interface 30.

The system according to the present invention uses the above-mentioned components appropriately based on their respective functions.

The tape streamer drive 10 is constructed as will be described below with reference to FIG. 12. The tape streamer drive 10 records or reproduces data to or from the magnetic tape 3 in the tape cassette 1 by the helical scan method.

Figure 12:
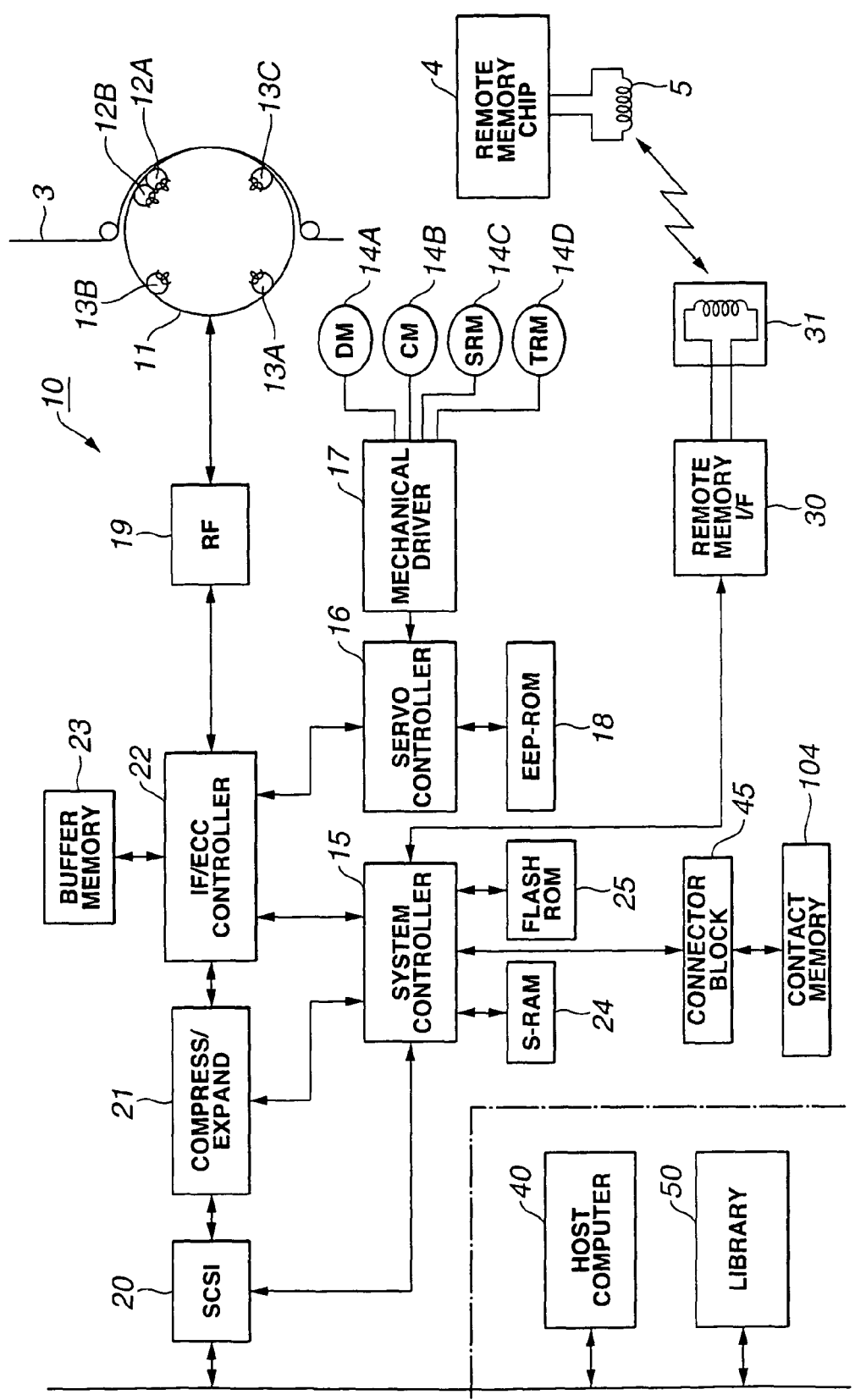
FIG. 12 is a block diagram of the tape streamer drive according to the present invention.

The tape streamer drive 10 includes a rotating drum 11 having provided thereon two record heads 12A and 12B and three playback heads 13A, 13B and 13C as shown in FIG. 12.

The record heads 12A and 12B have gaps different in azimuth angle from each other and disposed extremely near to each other. The playback heads 13 A and 13B (13C) are different in azimuth angle from each other and spaced 90 degrees, for example, from each other. It should be noted that the playback heads 13B and 13C are disposed at the same azimuth angle. The playback heads 13A, 13B and 13C are used also for the so-called read-after-write in which data just written to the magnetic tape is read.

The rotating drum 11 is rotated by a drum motor 14A and has wound thereon a magnetic tape 3 led from the tape cassette 1. The magnetic tape 3 is driven by a capstan motor 14B and pinch rollers (not shown) to run at a constant speed. The magnetic tape 3 is extended between and over the pair of reels 2A and 2B. The reels 2A and 2B in pair are rotated forward and backward, respectively, by their respective reel motors 14C ad 14D.

The drum motor 14A, capstan motor 14B, reel motors 14C and 14D are driven with a power supplied from a mechanical driver 17. The mechanical driver 17 drives each of these motors under the control of a servo controller 16. The servo controller 16 makes rotation speed control of each motor for tape drive, fast forward and rewind run during normal recording and reproduction and during fast reproduction.

Note that there is also provided an EEP-ROM 18 to store constants etc. the servo controller 16 uses for servo control of each motor.

The servo controller 16 is bidirectionally connected to a system controller 15 that controls the entire system via an interface controller/ECC formatter 22 (will be referred to as "IF/ECC controller" hereunder).

The tape streamer drive 10 uses an SCSI interface 20 for data input/output. For example, for data recording, the tape streamer driver 10 is supplied with a sequence of data in units of a fixed-length record (data transmission unit) from the host computer 40 via the SCSI interface 20. The data are supplied to a compression/expansion circuit 21. In this tape streamer drive system, there is available a mode in which data are transmitted from the host computer 40 in units of variable-length data aggregates.

The compression/expansion circuit 21 compresses input data in a predetermined manner as necessary. When an LZ-code compression method is adopted for example, a dedicated code is allocated to a character string once processed, and stored in the form of a dictionary. A subsequent input character string is compared with the content of the dictionary. When the result of comparison shows that the input character string is coincident with the code in the dictionary, the character string is replaced with the code in the dictionary. This is repeatedly done. Input character strings not coincident with the code in the dictionary will have sequential new codes allocated thereto, respectively, and they be entered into the dictionary. Data on the input character strings are thus entered into the dictionary and replaced with the codes in the dictionary, whereby the data is compressed.

The data output from the compression/expansion circuit 21 is supplied to the IF/ECC controller 22 which will control a buffer memory 23 to provisionally store (buffer) the data output from the compression/expansion circuit 21. The data stored in the buffer memory 23 is finally dealt with in units of a fixed length corresponding to a number of tracks, called "group", on the magnetic tape 40 and undergoes ECC formatting under the control of the IF/ECC controller 22.

In the ECC formatting, an error correction code is added to the recorded data and modulated for conformity with the magnetic recording. The data thus processed is supplied to an RF processor 19.

The RF processor 19 amplifies and makes recording equalization of the supplied recorded data to generate a recording signal and supply it to the record heads 12A and 12B. Thus, the record heads 12A and 12B records the data to the magnetic tape 3.

Next, the operations for data reproduction will simply be described. The data recorded on the magnetic tape 3 is read as an RF reproduction signal by the playback heads 13A and 13B, and the RF reproduction signal undergoes reproduction equalization, playback clock generation, sampling, decoding (Viterbi decoding, for example), etc. in the RF processor 19. The signal thus read is supplied to the IF/ECC controller 22 in which it will first undergo an error correction. Then, the data is stored once in the buffer memory 23, read out from the latter at a predetermined time and supplied to the compression/expansion circuit 21.

When the determination by the system controller 15 shows that the data supplied to the compression/expansion circuit 21 has been compressed by the compression/expansion circuit 21, the latter will expand the data. If the determination shows that the supplied data has not been compressed, the compression/expansion circuit 21 outputs the data as it is without expanding it.

The output data from the compression/expansion circuit 21 is supplied as a reproduced signal to the host computer 40 via the SCSI interface 20.

FIG. 12 shows the remote memory chip 4 provided inside the tape cassette 1. When the tape cassette 1 is loaded in the tape streamer drive, noncontact data transfer becomes possible between the remote memory chip 4 and system controller 15 via the remote memory interface 30 The communications are made between the remote memory chip 4 and system controller 15 via the remote memory interface 30 and antenna 31. Thus, the system controller 15 can access the remote memory chip 4 for data write or read.

Data transfer to the remote memory chip 4 is effected with a command supplied from the system controller 15 to the remote memory chip 4 and a corresponding acknowledge supplied from the remote memory chip 4 to the system controller 15. When a command issued from the system controller 15 to the remote memory chip 4, the command data is encoded into a predetermined data structure by the remote memory interface 30 and ASK-modulated for transmission to the remote memory chip 4 as above.

At the tape cassette 1, the antenna 5 thus receives the command from the system controller 15 and the logic block 4c operates correspondingly to contents of the received data (command). For example, the logic block 4c writes the transmitted data along with the write command to the EEP-ROM 4d.

Upon reception of the command from the remote memory interface 30 as above, the remote memory chip 4 will send a corresponding acknowledge to the remote memory interface 30. That is, the logic block 4c of the remote memory chip 4 modulates the data as the acknowledge by the RF block 4b and transmits the data from the antenna 5. Such an acknowledge received by the antenna 31 is demodulated by the remote memory interface 30 and supplied to the system controller 15. For example, when a read command is issued from the system controller 15 to the remote memory chip 4, the latter will send back a data as an acknowledge of the reception of the command and data read from the EEP-ROM 4d to the system controller 15. Then, the acknowledge and read data are received and demodulated by the remote memory interface 30 and supplied to the system controller 15.

As above, the tape streamer drive 10 has the remote memory interface 30 and thus can access the remote memory chip 4 in the tape cassette 1.

For the above noncontact data transfer, data is superposed on a 13-MHz carrier by the ASK modulation but original data is packetized. That is, a header, parity and other necessary information are added to a command and data as acknowledge to form a packet, and the packet is code-converted for modulation. The packet thus modulated can be transmitted and received as a stable RF signal.

There are also provided an S-RAM 24 and flash ROM 25. The S-RAM 24 and flash ROM 25 stores data the system controller 15 uses for a variety of operations. For example, the flash ROM 25 stores constants etc. used for control. The S-RAM 24 is used as a work memory. It is also used to store and compute data read from the remote memory chip 4, data to be written to the remote memory chip 4, mode data set for each tape cassette, various flag data, etc.

Note that the S-RAM 24 and flash ROM 25 may be constructed as an internal memory of a microcomputer included in the system controller 15 or a partial area of the buffer memory 23 may be constructed for use as the work memory (S-RAM) 24.

Information is transmitted between the tape streamer drive 10 and host computer 40 via the SCSI interface 20 as above. The host computer 40 makes communicating with the system controller 15 with the use of SCSI commands.

For use of the tape cassette having the contact memory 104 provided therein as shown in FIG. 1B, a connector block 45 is provided for data write or read to or from the contact memory 104 in the tape cassette 1. The connector block 45 is shaped to fit the terminal block 106 shown in FIG. 2. Connection of the connector block 45 to the terminal block 106 provides an electrical connection between the five terminals 105A to 105E of the contact memory 104 and a memory connection port of the system controller 15. Thereby, the system controller 15 can access the contact memory 104 in the loaded tape cassette 1 via the connector block 45 and terminal block 106.

In case the connection between the connector block 45 and terminal block 106 is poor, the loading mechanism is driven by a loading motor 14E for example to slightly change the seated condition of the tape cassette 1, thereby physically improving the contact between the connector block 45 and terminal block 106.

An eject key 205 is provided to appear on the control panel of the tape streamer drive 10. The eject key 205 is used by the user to eject the tape cassette 1 from inside the tape streamer drive 10. Information on the operation of the eject key 205 is supplied to the system controller 15.

(5) Host Computer Construction

Next, the host computer 40 included in the present invention will be described below with reference to FIG. 13.

Figure 13:
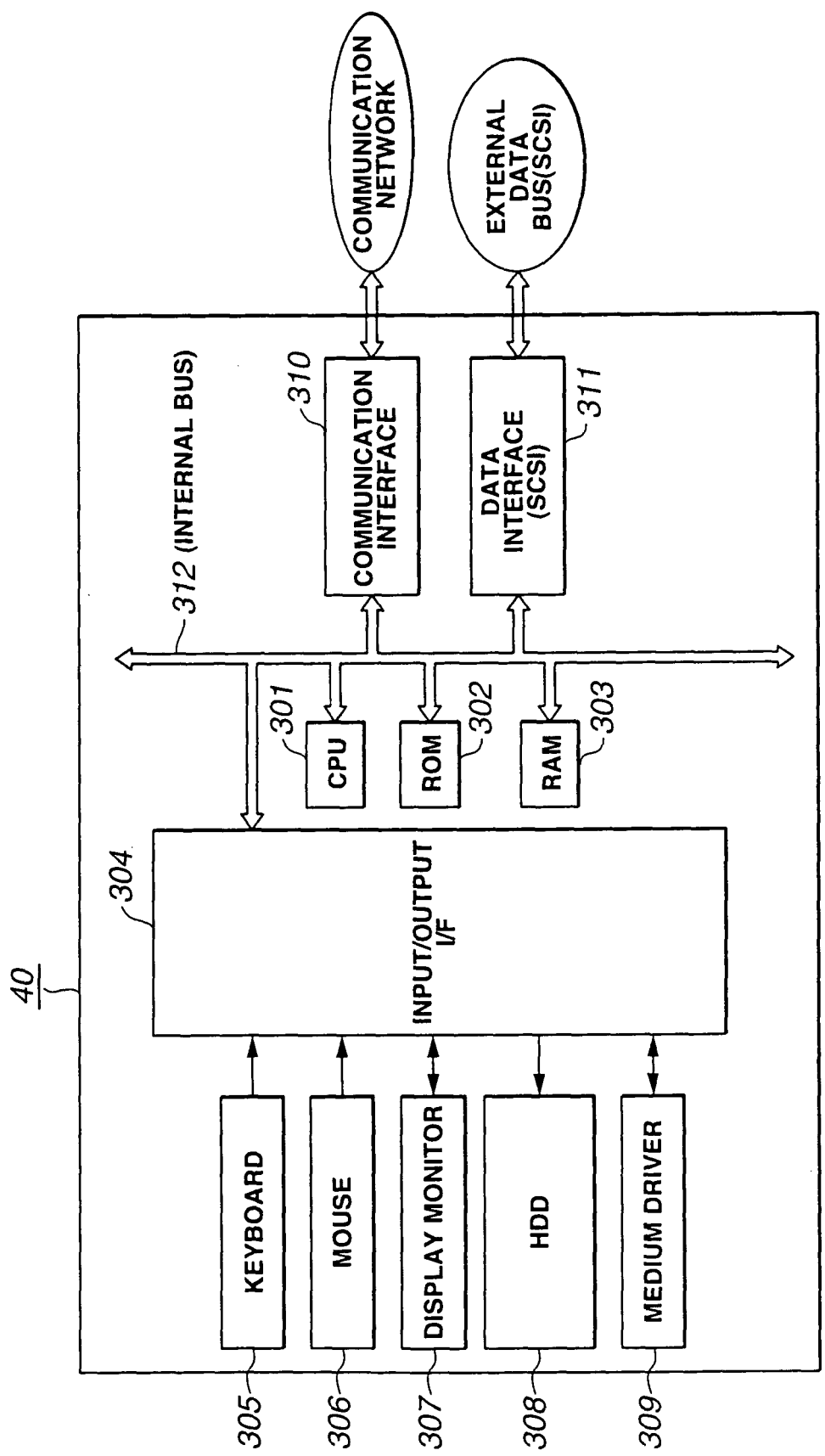
FIG. 13 is a block diagram of a host computer according to the present invention.

As shown in FIG. 13, the host computer 40 includes a CPU 301 to implement various operations according to a program held in an ROM 302 for example.

The host computer 40 includes also a RAM 303 to appropriately hold necessary data, programs, etc. for the CPU 301 to perform various processes.

The host computer 40 further includes an input/output interface 304 to which a keyboard 305 and mouse 306 are connected. The input/output interface 304 outputs a control signal supplied from the keyboard 305 or mouse 306 to the CPU 301. The input/output interface 304 has connected thereto a hard disc drive (HDD) 308 incorporating a hard disc as a storage medium. The CPU 301 can write or read data, program, etc. to or from the bard disc in the HDD 308 via the input/output interface 304. In this case, the input/output interface 304 has further connected thereto a display monitor 307 which provides a screen display.

The host computer 40 further includes a medium drive 309. This medium driver 309 is compatible with a currently available CD-ROM, DVD or the like as a specific recording medium, and can write or read data to or from such a medium loaded therein.

The host computer 40 also includes a communications interface 310 that makes communications via a communications network. In case the communications network uses a telephone line, the communications interface 310 includes a modem as a hardware. In case the communications network is formed including a network, the communications interface 310 is Ethernet or the like.

Further, the host computer 40 includes a data interface 311 such as SCSI, USB or IEEE 1394, for example, directed for communicating with an external peripheral device. Namely, the tape streamer drive 10 included in this embodiment is an external peripheral device connected to the host computer 40 by the data interface 311 such as SCSI.

Also, the host computer 40 includes an internal bus 312 formed from a PCI (peripheral component interconnect) or local bus to connect internal functional circuits to each other.

(6) Library Unit Construction

Next, the library unit 50 will be described.

Figure 14:
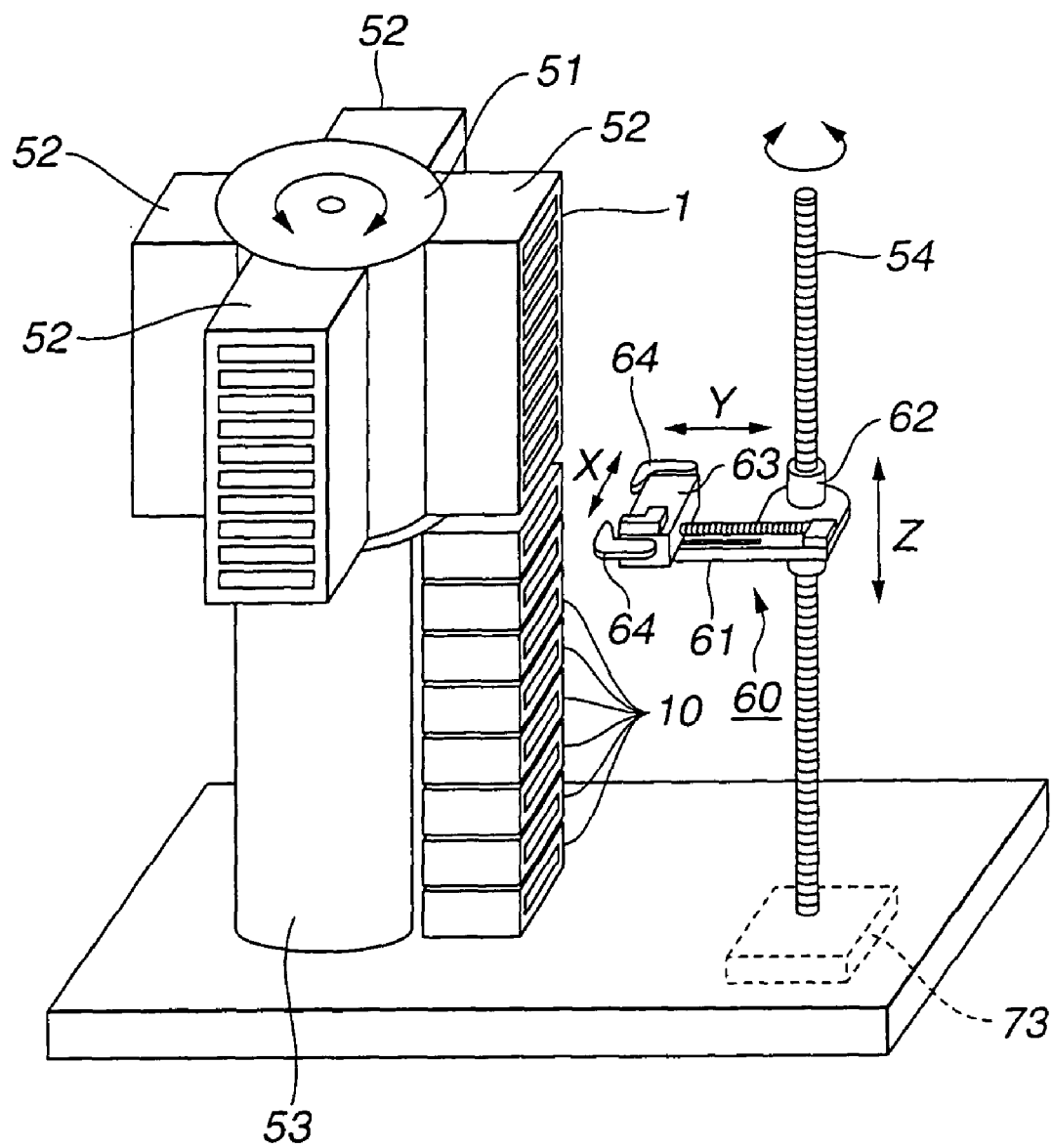
FIG. 14 is a perspective view of a library unit according to the present invention.
Figure 15:
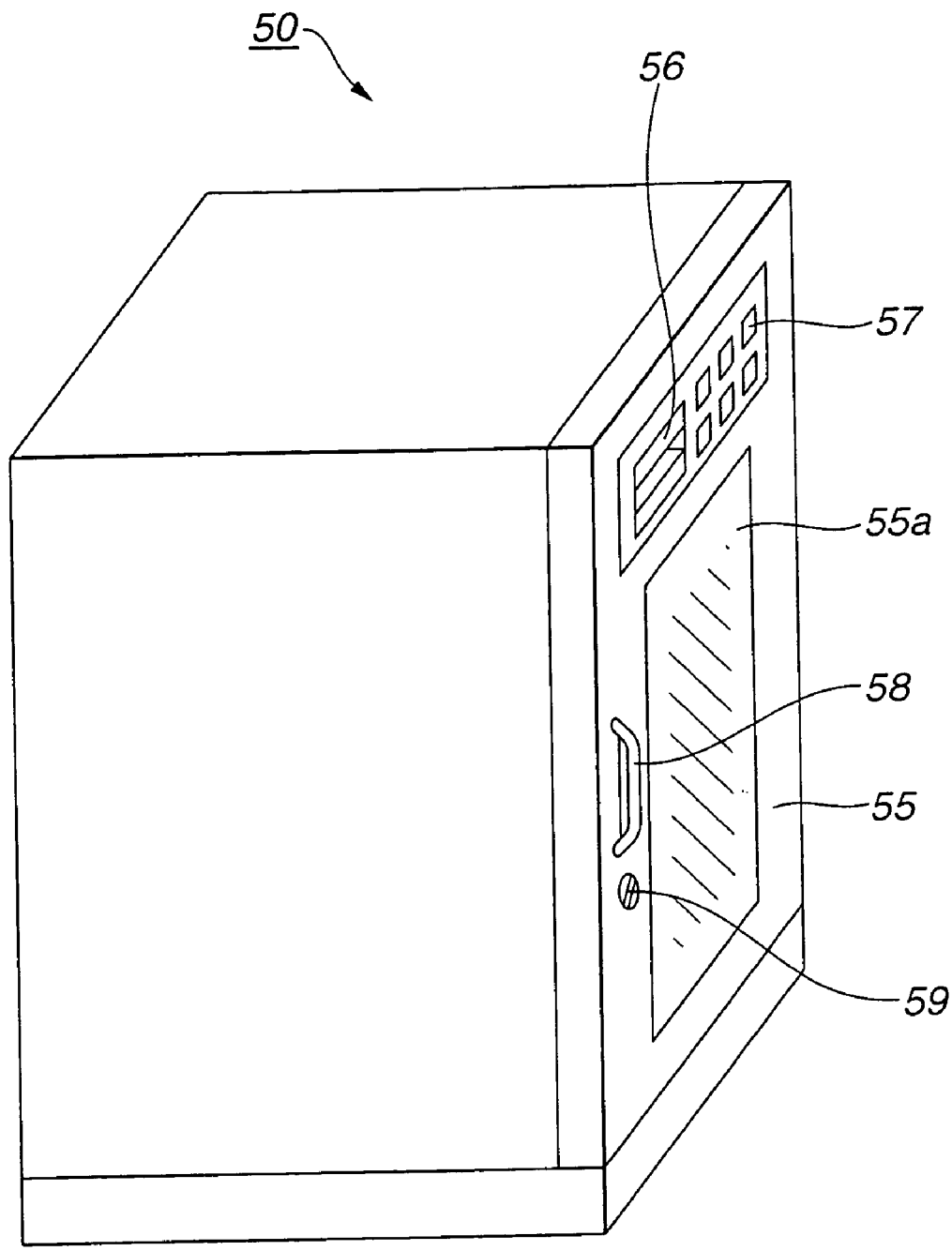
FIG. 15 is a perspective view of the library unit.

FIG. 14 shows mechanisms of the library unit 50 enclosed in a housing, and FIG. 15 shows the appearance of the housing of the library unit 50.

First, an example of the mechanisms of the library unit 50 will be described with reference to FIG. 14.

As shown in FIG. 14, the library unit 50 according to the present invention includes a carousel 51 having fixed thereto, for example, four magazines 52 each capable of accommodating about fifteen tape cassettes 1. The carousel 51 is provided rotatably on a controller box 53 also included in the library unit 50. The carousel 51 is rotated for selection of one of the magazines 52.

Also, a hand unit 60 is provided movably vertically (Z direction) on a Z-directional shaft 54 to put or take a tape cassette 1 into or out of the magazine 52. More specifically, the Z-directional shaft 54 is externally threaded and the hand unit 60 is engaged at a bearing 62 thereof on the external thread of the Z-directional shaft 54. As the Z-directional shaft 54 is rotated by a Z-directional drive motor 73, the hand unit 60 is moved vertically along the Z-directional shaft 54. The hand unit 60 includes a hand table 63 installed on a base plate 61 to be movable in a Y direction, and the hand table 63 has a pair of hands 64 formed at the free end thereof. The hands 64 in pair can be opened and closed in an X direction in relation to each other to release or catch a tape cassette 1. A plurality of tape streamer drives 10 is disposed below the carousel 51. Each of the tape streamer drives 10 is constructed as shown in FIG. 12.

Because of the above-mentioned mechanism, the hand unit 60 can take a tape cassette 1 out of a desired magazine 52 on the carousel 51 and carry and load it into a desired table streamer drive 10. The hand unit 60 can reversely work to take a tape cassette 1 out of a tape streamer drive 10 and put it into place in a desired magazine 52.

As shown in FIG. 15, the housing of the library unit 50 enclosing the aforementioned mechanisms has a front door 55 covering nearly all the front of the housing and having a handle 58 that is used to open and close the door 55. The front door 55 can be locked with a key 59. Further, the front door 55 includes a transparent panel 55a through which the inside of the housing can be viewed. The front door 55 has formed at the upper portion thereof a control panel 57 and a tape cassette slot 56 formed for inserting or ejecting a tape cassette 1 with the front door 55 kept closed. A tape cassette 1 inserted through the slot 56 can be carried by the hand unit 60 to a predetermined position inside the magazine 52 (which is not shown in FIG. 14). Also, a tape cassette 1 carried by the hand unit 60 can be ejected through the slot 56.

The control panel 57 has disposed thereon various keys to be operated by the user. Information on the operation of each of the keys on the control panel 57 is supplied to a library controller 80 which implements an operation corresponding to the supplied information. Operations of the control panel 57 by the user include commands for insertion or ejection of a tape cassette 1 through the tape cassette slot 56, adjustment of the library unit 50 and the like.

Figure 16:
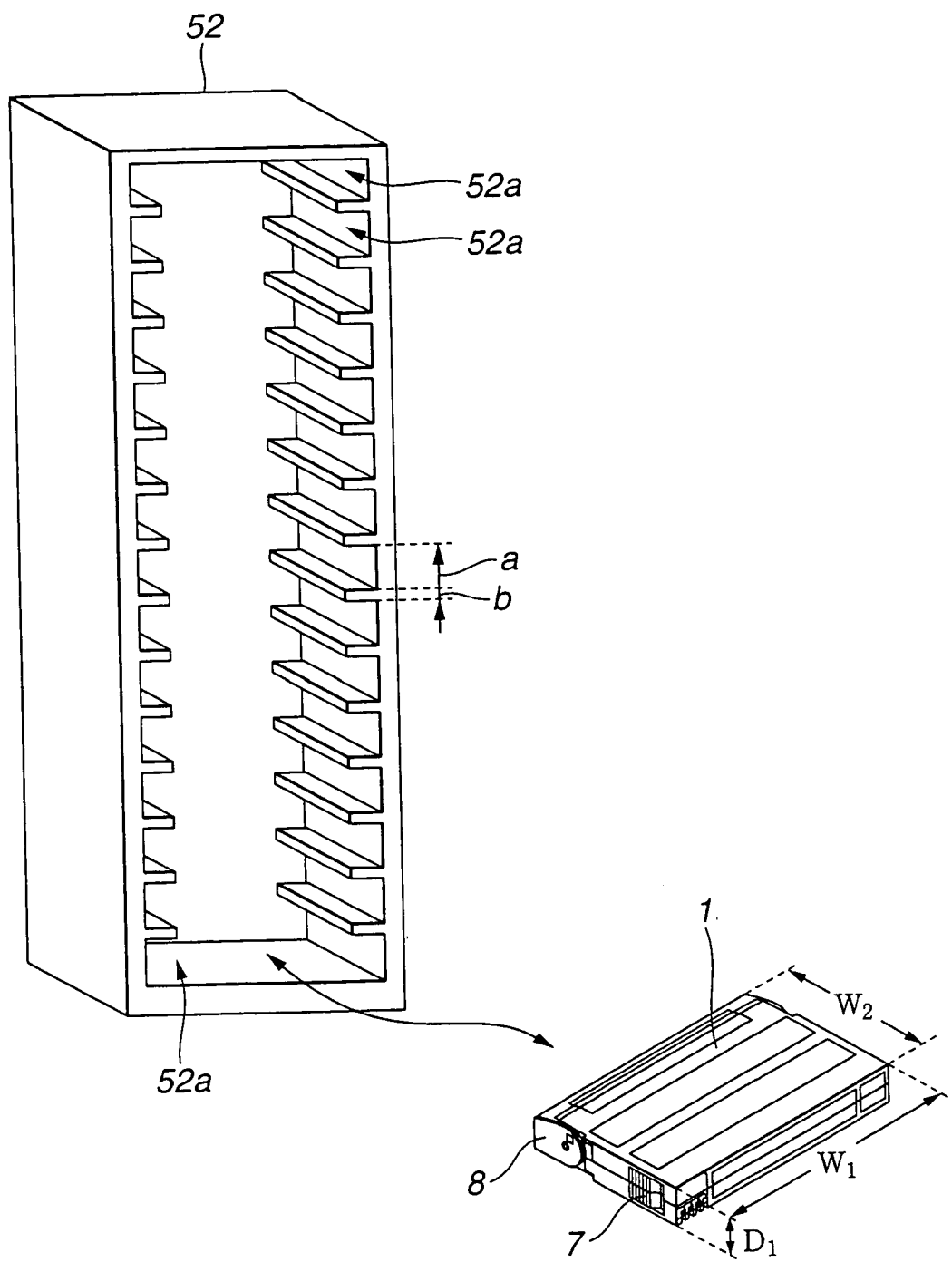
FIG. 16 is a perspective view of a magazine included in the library unit and the tape cassette.

Each of the magazines 52 is constructed as shown in FIG. 16.

Each of the magazines 52 has about fifteen cassette compartments 52a each designed to receive one tape cassette 1. The cassette compartment 52a is formed to have such a size as to easily receive a tape cassette 1 and keep it from going out when the carousel 51 is rotated. Also, the cassette compartment 52a is formed for easy removal of the tape cassette 1 by the pair of hands 64. For example, since the tape cassette 1 has a thickness $D_1$ of about 15 mm, each cassette compartment 52a is designed to have a height a of about 16 mm. Between two adjacent cassette compartments 52a, there is provided a shelving having a thickness b as small as possible for a maximum possible number of cassette compartments 52a and that can also assure a sufficient strength of the shelving. On this account, the shelving thickness b is about 3 mm.

Note that the tape cassette 1 has a length $W_1$ of about 95 mm and a depth $W_2$ of about 62 mm extending from the front to rear of the cassette body.

Figure 17:
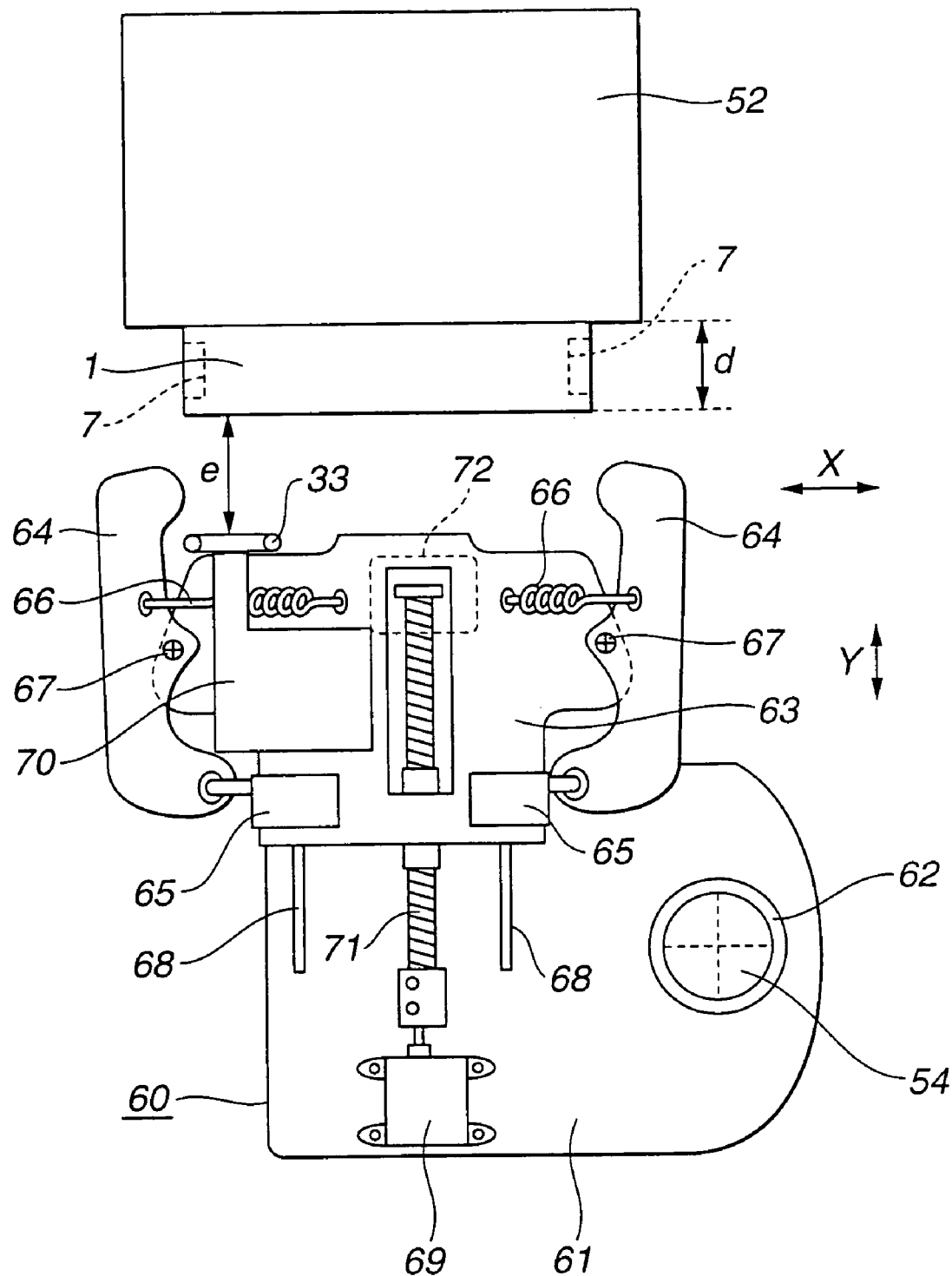
FIG. 17 is a plan view of a hand unit of the library unit.
Figure 18:
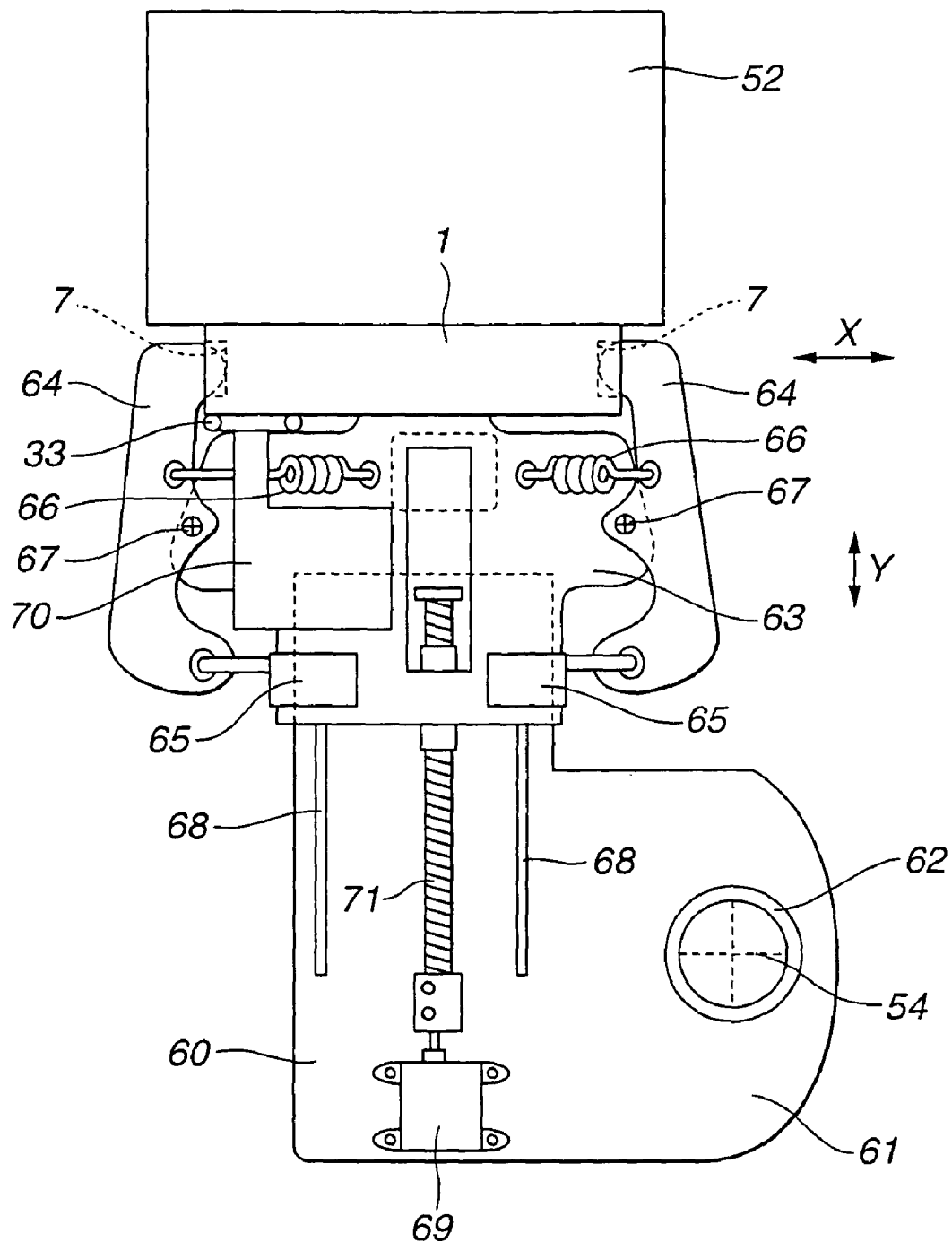
FIG. 18 is a plan view of the tape cassette caught by the hand unit of the library unit.

The magazine 52, namely, the cassette compartment 52a, is also designed to have such a depth that when a tape cassette 1 is received in the cassette compartment 52a, it will be left not received at some rear portion thereof as will best be seen from FIGS. 17 and 18. FIG. 17 is a top plan view of the tape cassette 1 received in the magazine 52. As seen, the tape cassette 1 has a rear portion d thereof left not received in the magazine 52. The dimension d is about 20 mm, for example.

The tape cassette 1 has formed on either lateral side thereof a concavity 7 in which the hand 64 can easily be engaged because of the above-mentioned structure of the magazine 52 and tape cassette 1.

The hand unit 60 is constructed and works as will be described below with reference to FIGS. 17, 18 and 19.

Figure 19:
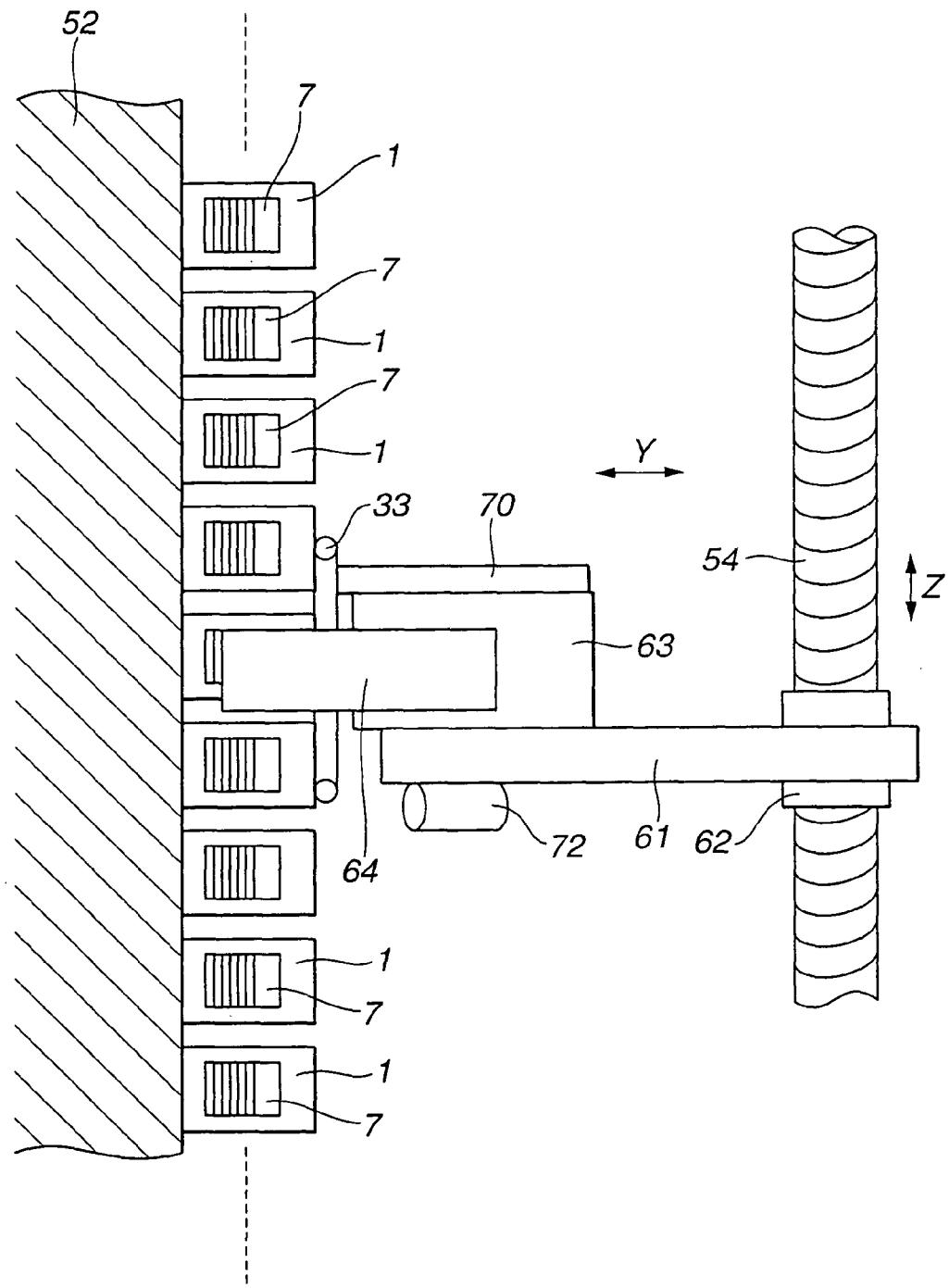
FIG. 19 is a side elevation of the library unit with the tape cassette being caught and introduced into or removed from the magazine by the hand unit.

FIG. 17 shows the hand unit 60 placed vis-a-vis and apart from the tape cassette 1, FIG. 18 shows the hand unit 60 catching the tape cassette 1 between the pair of hands 64, and FIG. 19 is a side elevation of the hand unit 60 in FIG. 18.

The hand unit 60 has the hand table 63 installed movably on the base plate 61, and the hands 64 installed to the hand table 63.

First, with a bearing 62 formed through the base plate 61 being engaged on the Z-directional shaft 54, the hand unit 60 as a whole is held on the Z-directional shaft 54. As the Z-shaft 54 is rotated, the hand unit 60 moves vertically along the Z-directional shaft 54. The hand unit 60 can be moved to a position vis-a-vis a cassette compartment 52a of the magazine 52 or a tape streamer drive 10.

Note that since the bearing 62 is formed in a position off the magazine 52, viewed from the front door 55, the Z-directional shaft 54 will not interfere with a tape cassette 1 being stored into or taken out of the magazine 52 with the front door 55 being opened.

The hand table 63 is movable along guide rails 68 on the base plate 61. More specifically, an externally-threaded Y-directional shaft 71 is engaged through the hand table 63. As the Y-directional shaft 71 is rotated forward or backward by a Y-directional drive motor 69, the hand table 63 is moved toward or away from the magazine 52.

The hand table 63 has installed thereon the pair of hands 64 each pivoted on a support shaft 67. Each of the hands 64 is toed at the rear end thereof by a plunger 65 and pulled at a portion thereof near the front end by a spring 66 from the hand table 63. Therefore, while the plunger 65 is not in action, both the hands 64 are closed under the action of the spring 66 as shown in FIG. 18. When the plunger 65 is put into action and the hand 63 is toed at the rear end thereof by the plunger 65, both the hands 64 are opened against the action of the spring 66 as shown in FIG. 17.

When taking out a tape cassette 1 from the magazine 52, the Z-directional shaft 54 is first driven to move the hand unit 60 to the height of a compartment 52a where the intended tape cassette 1 is received. Next, both the hands 64 are opened by the plunger 65 as shown in FIG. 17, while the hand table 63 is moved by the Y-directional drive motor 69 toward the magazine 52.

The moment the hand table 63 is moved with both the hands 64 being closed under the action of the spring 66 as shown in FIG. 18, the plunger 66 is deenergized, and both the hands 63 are moved by the spring 66 into the closing direction. Thus, the hands 64 are engaged into the concavities 7 formed on the opposite sides of the tape cassette 1 as shown in FIG. 18, while the hands 64 are moved by the Y-directional drive motor 69 away from the magazine 52 and thus the tape cassette 1 is taken out from the magazine 52. The tape cassette 1 thus taken out is carried by the hand unit 60 to a predetermined tape streamer drive 10, cassette slot or any other cassette compartment 52a of the magazine 52. For storing a tape cassette 1 into the magazine 52, the above operations are reversely done.

As previously mentioned, the tape cassette 1 has the remote memory chip 4 installed therein. Like the tape streamer drive 10, the library unit 50 can access the remote memory chip 4 in the tape cassette 1. On this account, the hand table 63 has disposed thereon a remote memory drive box 70 in which a circuit as the remote memory interface 32 is built, as shown in FIGS. 17, 18 and 19. The remote memory interface 32 is constructed as will be described later.

At the rear portion of the tape cassette 1, there is provided the antenna 33 in a position corresponding to the position where the remote memory chip 4 is disposed.

For example, the antenna 33 is rather near the remote memory chip 4 in the tape cassette 1 as shown in FIG. 18. In this condition, access can be made to the remote memory chip 4 by the wireless communication.

In FIG. 17, there is a distance e between the antenna 33 and remote memory chip 4. When the distance e is about several centimeters, the antenna 33 can access the remote memory chip 4.

Note that FIGS. 17, 18 and 19 show a barcode reader 72 provided on the lower side of the base plate 61.

The barcode reader 72 can read information recorded on a barcode label, if any, attached on a tape cassette 1. Even when the barcode reader 72 is thus provided, the barcode reader 72 and antenna 33 may be disposed in any place. For example, the barcode reader 72 may be disposed on the hand table 63.

Figure 20:
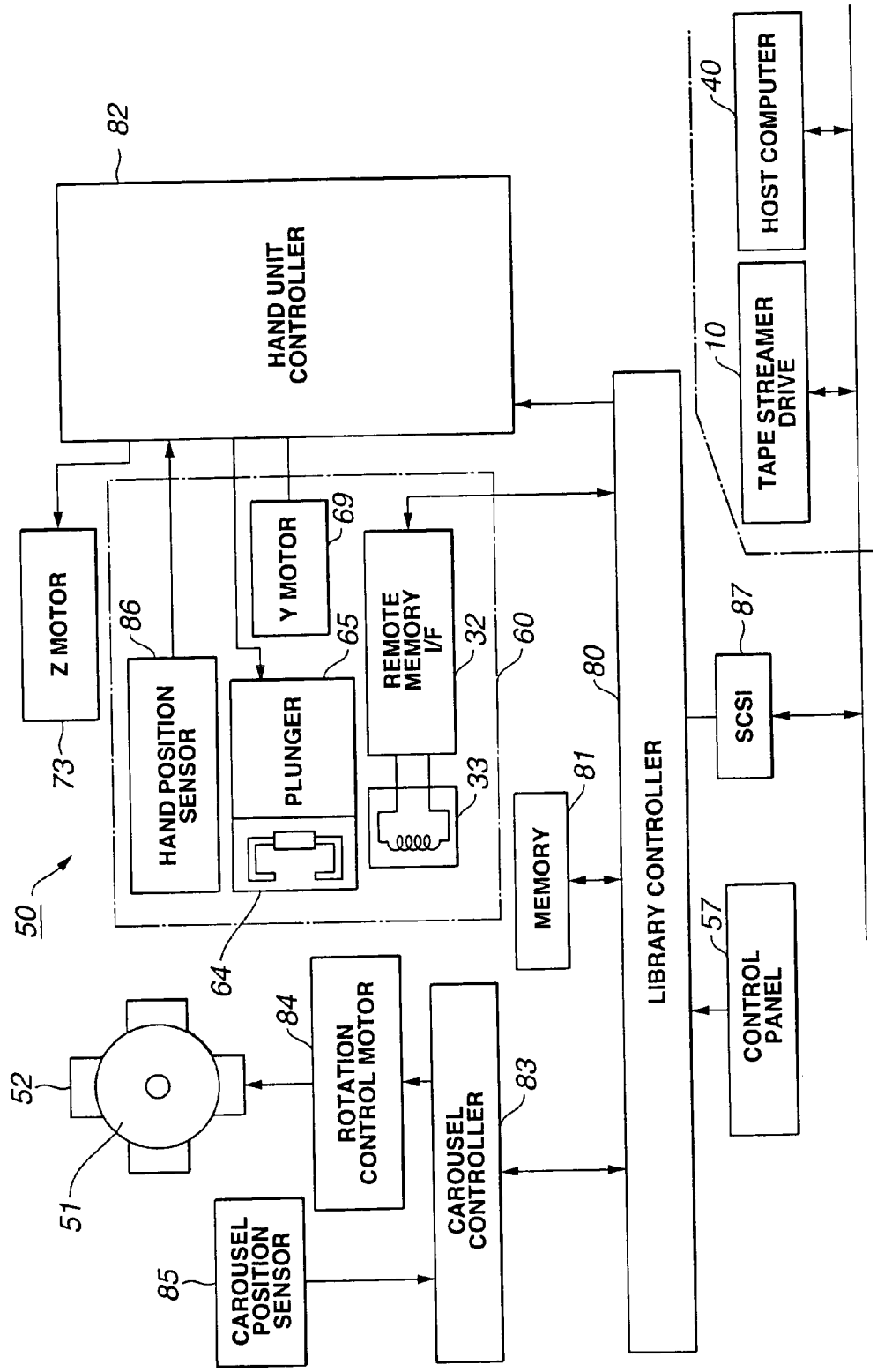
FIG. 20 is a block diagram of the library unit.

The library unit 50 with the aforementioned mechanisms is internally constructed as shown in FIG. 20.

As shown, the library unit 50 includes a library controller 80 which controls the entire library unit 50. The library controller 80 can communicate with the tape streamer driver 10 and host computer 40 via an SCSI interface 87.

Therefore, a tape cassette 1 is carried among the magazine 52, tape streamer drive 10 and cassette slot 56 and the stored tape cassettes 1 are managed, for example, access is made to the remote memory chip 4 in the tape cassette 1, according to SCSI commands from the host computer 40.

The library unit 50 also includes a memory 81 which serves as a work memory used by the library controller 80 for controlling operations of the library unit. As mentioned above, operation information from the control panel 57 is supplied to the library controller 80 which will control the operations of the library unit as necessary correspondingly to the operations done by the user at the control panel 57.

Also, a carousel controller 83 is provided to drive a rotation control motor 84 in response to a command from the library controller 80 and thus rotate the carousel 51. That is, the carousel controller 83 causes the hand unit 60 to select any one of the magazines 52. Also, there is provided a carousel position sensor 85 to detect to which one of the magazines 52 the hand unit 60 is currently opposite after the carousel 51 has been rotated. The carousel controller 83 rotates the carousel 51 while acquiring information from the carousel position sensor 85, thereby selecting an intended one of the magazines 52.

Also there is provided a hand unit controller 82 to drive the hand unit 60 according to a command from the library controller 80. Namely, the hand unit controller 82 drives the Z-directional drive motor 73 to move the hand unit in the Z-direction. Since the Z-directional position of the hand unit 60 is detected by a hand position sensor 86, the hand unit controller 82 drives the Z-directional drive motor 73 while confirming position detection information from the hand position sensor 86, whereby the hand unit 60 can be positioned at a predetermined height designated by the library controller 80. The hand unit controller 82 drives each of the Y-directional drive motor 69 and plunger 65 at a predetermined timing to cause the aforementioned pair of hands 64 to take out or put a tape cassette 1 from or into the magazine 52.

The remote memory drive box 70 provided in the hand unit 60 as mentioned above incorporates a circuit as the remote memory interface 32. The remote memory interface 32 is constructed as will be described later with reference to FIG. 21. In principle, the remote memory interface 32 is constructed as shown in FIG. 3 similarly to the remote memory interface 30 in the tape streamer drive 10 having previously been described with reference to FIG. 15. The remote memory interface 32 is connected to the library controller 80. Therefore, the library controller 80 can access the remote memory chip 4 in a tape cassette 1 in the magazine 52, near the antenna 33, or in a tape cassette 1 held by the hand unit 60 by issuing a write/read command to the remote memory chip 1 via the remote memory interface 32. Also in this case, the access to the remote memory chip 4 can be attained with a command from the library controller 80 and acknowledge from the remote memory chip 4.

Note that in case the barcode reader 72 is provided as above, a drive circuit (not shown) for the barcode reader 72 is provided and information read by the barcode reader 72 is supplied to the library controller 80.

The aforementioned remote memory interface 32 installed in the library unit 50 is constructed and functions as will be described below.

Figure 21:
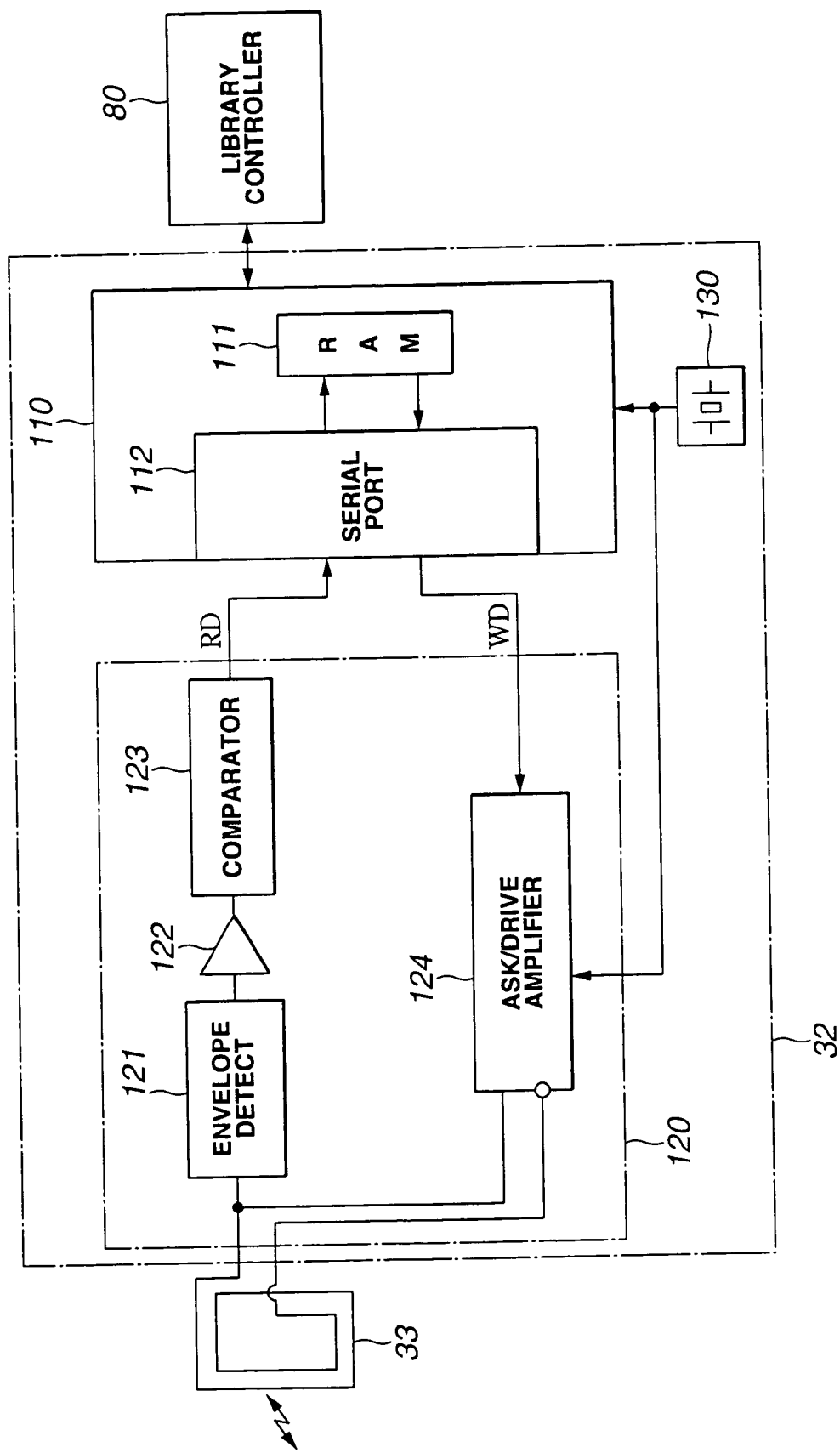
FIG. 21 is a block diagram of a remote memory interface.

FIG. 21 shows the construction of the remote memory interface 32.

As shown, the remote memory interface 32 includes a CPU 110 as a general-purpose microcomputer, RF block 120 and a clock generator 130 formed from a crystal oscillator. The RF block 120 is an analog circuit to transmit data from the antenna 33 and receive data from the remote memory chip 4. The transmitted data is encoded, and the received data is decoded, under the software control of the CPU 110.

The RF block 120 includes an ASK/drive amplifier 124 as a transmission system, and the amplifier 124 is supplied with transmission data WD from the CPU 110 at the time of data transmission. The RF block 120 also includes a reception system formed from an envelope detector 121, amplifier 122 and a comparator 123.

As shown, the CPU 110 includes a RAM 111 of 4 kilobytes for example. Namely, the RAM 111 has a capacity of a RAM normally incorporated in a general-purpose microcomputer. The CPU 110 also includes a serial port 112 as shown. It should be noted that the RAM 111 is a one incorporated in the CPU 110, by way of example, but it may be a RAM as an external memory chip connected to the CPU 110.

The CPU 110 is supplied with an instruction such as a command or the like from the library controller 80 to work for communication access to the remote memory chip 4. That is, in response to a request from the library controller 80, the CPU 110 encodes (generates) data to be transmitted to the remote memory chip 4, decodes data received from the remote memory chip 4, and transmits, to the library controller 80, data having been decoded as received data and read from the remote memory chip 4 and an acknowledge from the remote memory chip 4.

The CPU 110 is supplied with an operation clock from the clock generator 130. The clock generator 130 generates a clock of 13.56 MHz for example. Therefore, the CPU 110 operates with a clock of 13.56 MHz.

As mentioned above, the carrier frequency for communications between the remote memory chip 4 and remote memory interface 32 is 13.56 MHz. Therefore, the clock of 13.56 MHz supplied from the clock generator 130 is used directly as a carrier frequency in the ASK/drive amplifier 124.

Note that the clock of 13.56 MHz supplied from the clock generator 130 may be multiplied by n to provide an operation clock frequency of 13.56×n (MHz) for the CPU 110. In any way, the CPU 110 in this embodiment can operate with a clock frequency derived from the clock frequency supplied from the clock generator 130, that is, a clock which is basically common to the carrier frequency. In this embodiment, the clock generator 130 generates the clock of 13.56 MHz. However, the operation clock frequency of the CPU 110 may be a multiple x or 1/x of this clock frequency of 13.56 MHz. Namely, a frequency divider or multiplier may be built in the apparatus for such a purpose. The multiplication or frequency division may be done by any other value than an integer.

The data transmission and reception via the above-mentioned remote memory interface 32 will be described below.

For transmission, namely, when the CPU 110 has received command data to be transmitted to the remote memory chip 4 from the library controller 80, it will prepose a preamble and sync, and postpose CRC, to the command data. That is, the CPU 110 encodes the data in conformity to a predetermined format matching the wireless communications. It should be noted that in this embodiment, the data to be transmitted are Manchester-encoded ones, which will not be detailed herein.

As above-mentioned, the data is structured in the predetermined format. The Manchester-encoded date to be transmitted is stored in the RAM 111, and the stored data WD to be transmitted is transmitted at double 106 kbps from the serial port 112 to the RF block 120.

Figure 5:
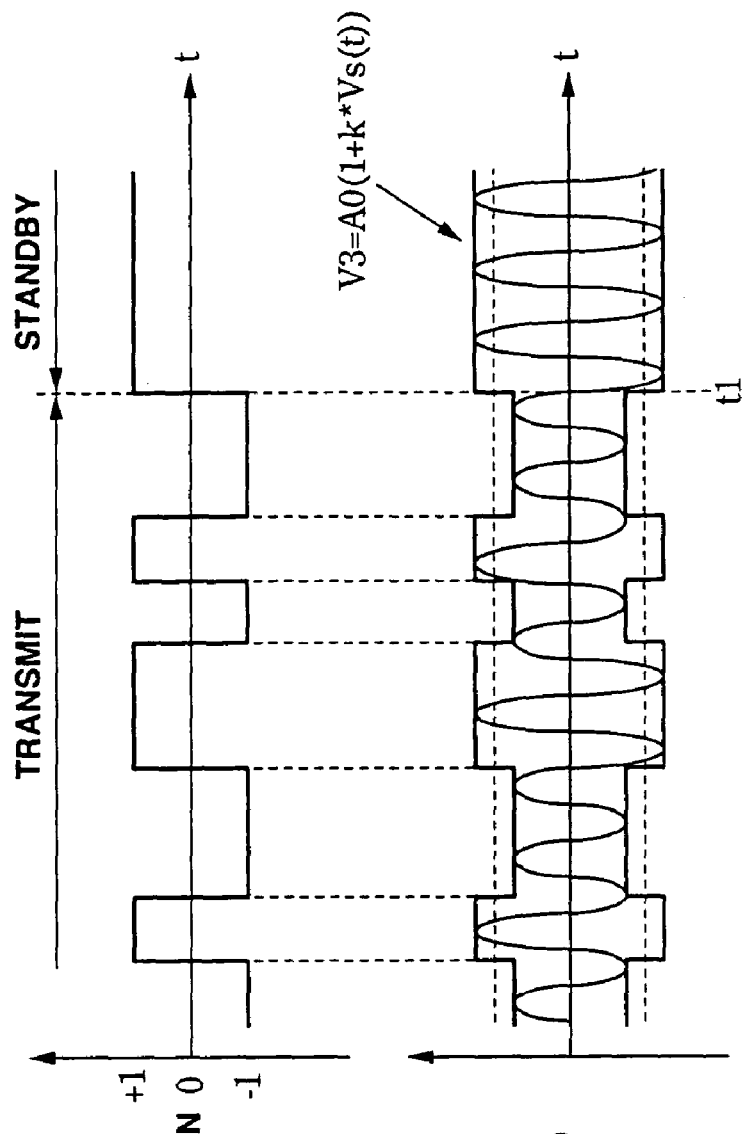
FIG. 5A is a waveform chart showing the communication data.
FIG. 5B is a waveform chart showing a modulated waveform of the communication data.

In the RF block 120, the ASK/drive amplifier 124 makes ASK modulation of the carrier of 13.56 MHz by the transmitted data WD as having previously been described with reference to FIG. 5. The modulated wave is transmitted from the antenna 33 to the remote memory chip 4.

The transmitted data from the remote memory chip 4 is detected as impedance-variation information by the RF block. In the RF block 120, the envelope detector 121 detects the envelope, as shown in FIG. 6A, of the modulated wave having previously been described with reference to FIG. 5B. Then, the comparator 123 binarizes the data shown in FIG. 6B to provide received data as shown in FIG. 6C.

Such received data RD is supplied from the serial port 112 to the CPU 110.

The CPU 110 makes eight-fold oversampling of the stream of the supplied received data for a constant period of time, and stores the data in the RAM 111. It should be noted that the "constant period of time" may be fixed to 9.67 ms for example. Therefore, the RAM 111 may be a one having a capacity of 1 kbytes. Generally, the RAM used in a CPU has a capacity of 4 kbytes.

The received data stored in the RAM 111 will undergo processes such as determination of a optimum sampling phase, detection of a preamble, detection of a sync, etc. to extract data returned from the remote memory chip 4. Also, the data will undergo CRC check.

Packet data supplied from the remote memory chip 4 and having undergone the aforementioned decoding will be transmitted to the library controller 80.

(7) Data Write/Read Unit

Next, the data write/read unit according to the present invention will be described. The data write/read unit is capable of making wireless mutual communicating with the remote memory chip 4 in the tape cassette 1, and wireless communicating with the tape streamer drive 10 as well. In the latter case, the data write/read unit will communicate with the remote memory interface 30 in the tape streamer drive 10. That is, the tape streamer drive 10 is adapted to communicate with the remote memory chip 4 of the tape cassette 1 as well as with the data write/read unit via the remote memory interface 30.

Figure 22A:
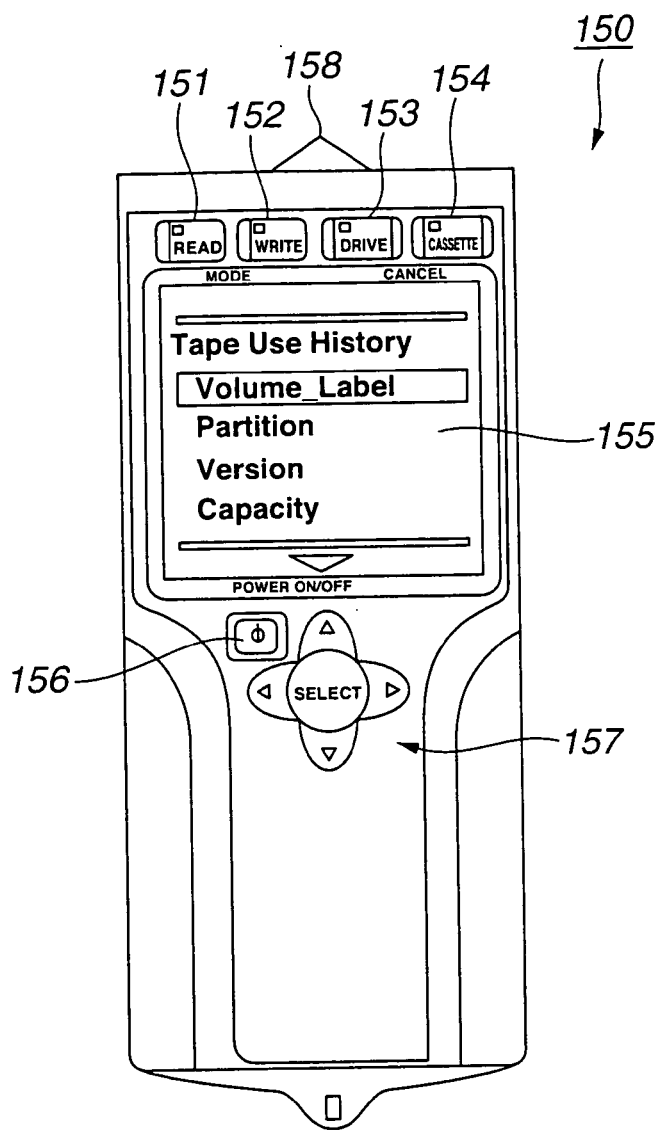
FIG. 22A is a plan view of a data write/read unit according to the present invention.
Figure 22B:
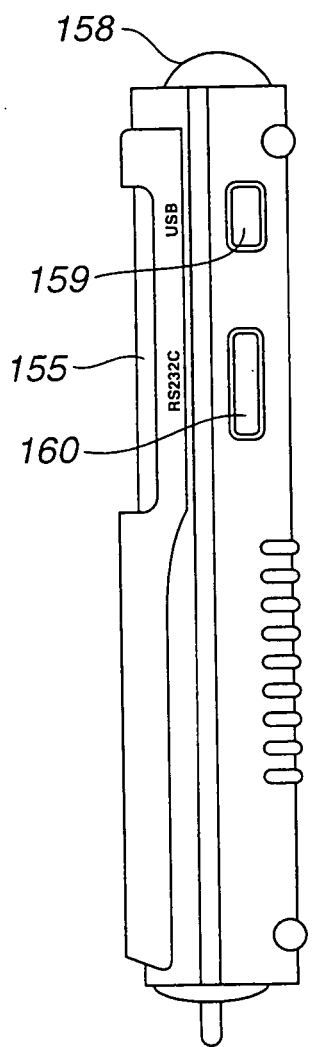
FIG. 22B is a side elevation of the data write/read unit and FIG. 22C is a plan view of the data write/read unit.
Figure 22C:
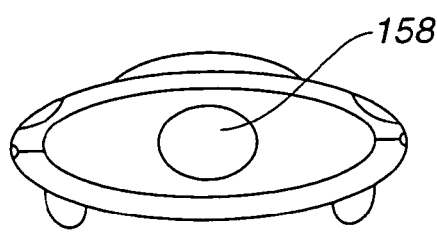

The data write/read unit according to the present invention, generally indicated with a reference 150, has an appearance as shown in FIGS. 22A to 22C. FIG. 22A is a plan view of the data write/read unit 150, FIG. 22B is a side elevation of the data write/read unit 150 and FIG. 22C is a front view of the data write/read unit 150.

The data write/read unit 150 is designed to such a size that the user can hold it in one hand for example. As shown in FIG. 22A for example, the data write/read unit 150 is provided on the body top thereof with control keys such as a read key 151, write key 152, drive select key 153 and a cassette select key 154. The read key 151 is provided to set a read mode for example. The read mode is a mode of operation in which the data write/read unit 150 reads information held by a communication counterpart, that is, the remote memory chip 4 or tape streamer drive 10.

The read mode is set when it is necessary to read status information from the tape streamer drive 10 as will be described in detail later, for example. Also, the read mode will be set for reading management information stored in the remote memory chip 4.

The write key 152 is provided to set a write mode. In the write mode, data is transferred from the data write/read unit 150 to a communication counterpart. The write mode is set when it is necessary to write required data to the remote memory chip 4 as will be described later. The write key 152 is also set for transferring up data from the data write/read unit 150 to the tape streamer drive 10 in order to update a program in the tape streamer drive 10.

The drive select key 153 is provided for use to select the tape streamer drive 10 as a communication counterpart. Use of this key 153 permits to select, as a communication counterpart, a desired one of a plurality of tape streamer drives 10, if applied for example. The data write/read unit 150 does a suitable communication operation for a selected one of the tape streamer drives 10 so that the communication with this counterpart can normally be done.

The cassette select key 154 is provided for use to select, as a communication counterpart, a desired one of a plurality of tape cassettes 1, if applied for example. For example, in case there exists a plurality of tape cassettes 1 and the remote memory chips 4 of them are near to each other because the tape cassettes 1 are laid as a stack for example, it will be highly possible that when the data write/read unit 150 communicates with a remote memory chip 4, it has a crosstalk with any other remote memory chip 4, not the intended one. Even if the tape cassettes 1 are laid as a stack, use of the cassette select key 154 allows the data write/read unit 150 to establish a positive communication with the remote memory chip 4 of a tape cassette 1 selected as a counterpart.

Below the location of the above keys, there is provided a display monitor 155 formed from an LCD (liquid crystal display) for example and which shows a necessary appropriate indication in response to each operation done on the data write/read unit 150.

Below the display monitor 155, there are provided a power on/off key 156 and select/set key 157. The power key 156 switches on and off the data write/read unit 150. The select/set key 157 selects items displayed on the display monitor 155 and sets a selected item. The select/set key 157 includes a central set key and upward, downward, leftward and rightward directions move keys provided around the central key. Each of these directional move keys is pressed to move a cursor or highlight on the display monitor 155 in a corresponding direction to an intended item, and then the central set key is pressed to set an item currently pointed by the cursor or highlighted.

As shown in FIGS. 22A to 22C, an antenna block 158 is provided on the front side of the data write/read unit 150. The antenna block 158 has provided therein an antenna 170 to transmit and receive data by the magnetic coupling.

As best seen in FIG. 22B, the data write/read unit 150 has two data interface terminals 159 and 160 for example provided on the lateral side thereof. One of the two data interface terminals, 159, is of the USB (universal serial bus) type, while the other, 160, is of the RS232C type. These data interface terminals 159 and 160 are used for connection of the data write/read unit 150 to a personal computer for taking information from the data write/read unit 150 into the personal computer as a host computer or from the personal computer into the data write/read unit 150, for example.

Figure 23:
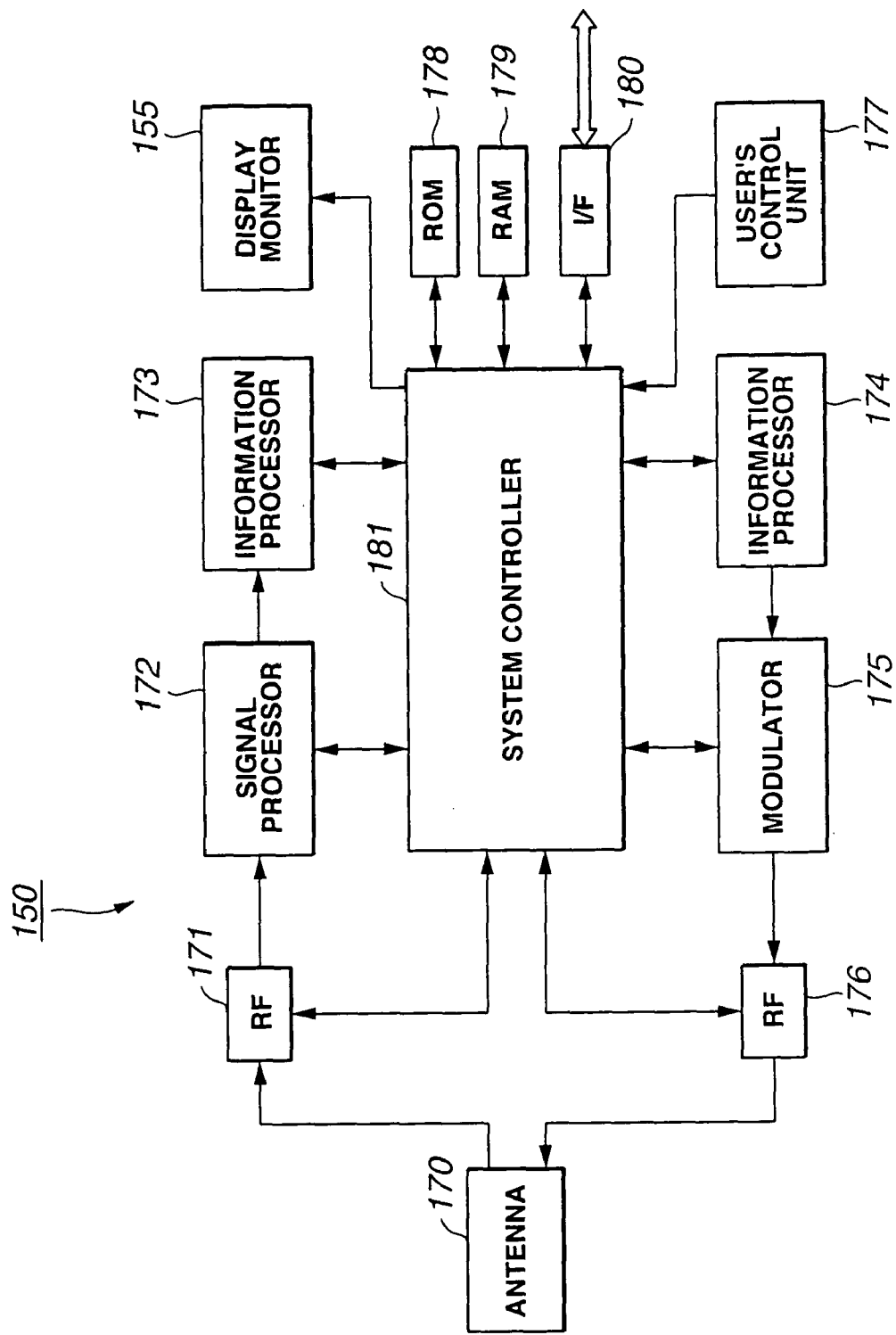
FIG. 23 is a block diagram of an example of the data write/read unit construction according to the present invention.

FIG. 23 is a block diagram of the internal construction of the data write/read unit 150. As shown, the antenna 170 is formed from an inductor or the like to receive data through detection of a carrier wave sent from a communication counterpart and transmit data by sending a carrier wave. Both these communications, reception and transmission, are based on the same theory as that of magnetic-coupling communication having previously been described with reference to FIG. 4.

A signal acquired through the reception by the antenna 170 is supplied to an RF amplifier 171. In the RF amplifier 171, the input received signal as the RF signal for example is amplified and the amplified signal is supplied to a signal processor 172. In the signal processor 172, the input signal is processed in a predetermined manner. For example, a carrier wave component is removed from the input signal, the processed signal is demodulated correspondingly to the modulation by amplification to provide signal components as data. The data is supplied to an information processor 173.

The information processor 173 extracts data from an input signal, for example, a packet, makes error correction of the signal and processes the signal otherwise to provide data having such a form that the data can be processed by a system controller 181. The system controller 181 acquires the data provided by the information processor 173 to recognize transmitted data and make a predetermined controlled processing of the data correspondingly to the content of the data.

For data transmission, the system controller 181 generates data to be sent or reads transmitted data stored in a ROM 178 for example, and transfers the data thus acquired to a data processor 174. The information processor 174 adds an error correction code to the transferred data as necessary, and finally generates a packetized data to be transmitted and supplies it to a modulator 175. The modulator 175 modulates, by amplification, the carrier wave with the input data to produce a transmission signal and supply it to an RF antenna 176. The RF antenna 176 converts the input data into an RF signal and supplies the data to the antenna 170. Thus, the data is transmitted from the data write/read unit 150.

There is also provided a ROM 178 which stores necessary information including programs to be executed by the data write/read unit 150. According to this embodiment, the data write/read unit 150 is adapted to receive data by the wireless communication function or the data interface terminals 159 and 160 and download the data, and store the downloaded data into the ROM 178. On this account, the ROM 178 is formed from a rewritable memory element such as an EEPROM. Also, a RAM 179 is included in the data write/read unit 150. The RAM 179 is used as a work area for temporary storage of data when the system controller 181 makes each control.

There is also provided an interface circuit 180 as a cable data interface. It is shown as a single function circuit for the simplicity of illustration and explanation. To support the data write/read unit 150 whose appearance is shown in FIG. 22, however, interface circuits supporting USB and RS232C, respectively, will be provided.

The reception circuit system including the antenna 170 and RF amplifier 171 and the transmission circuit system including the RF amplifier 176 and antenna 170 have their mode of operation switched depending upon which the communication counterpart is, the remote memory chip 4 of the tape cassette 1 or the tape streamer drive 10.

The above will be explained below with reference to FIG. 24.

Figure 24:
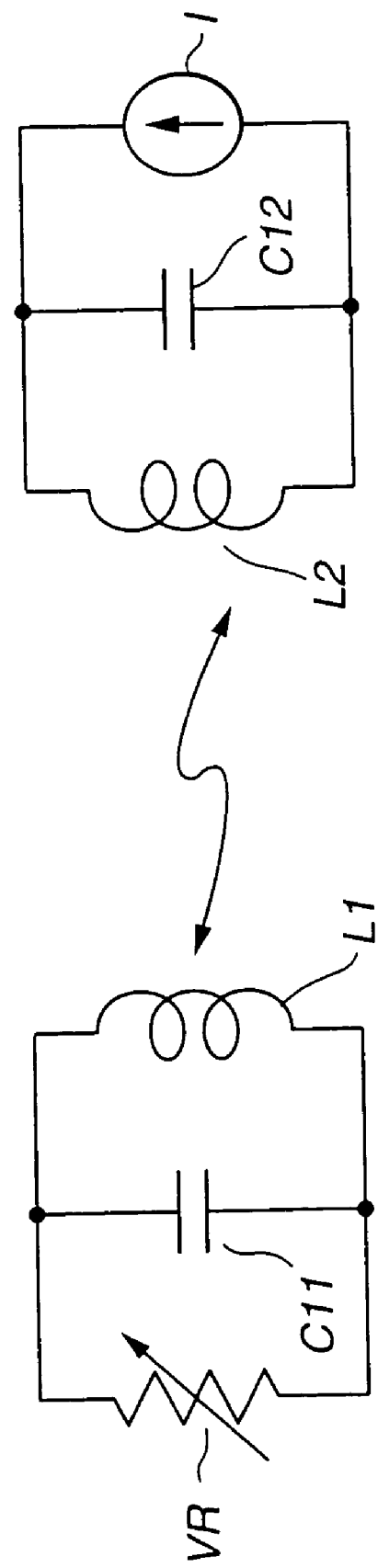
FIG. 24 is an equivalent circuit diagram intended for explanation of the operation for communications between the remote memory chip and remote memory interface of the tape streamer drive.

FIG. 24 shows a passive communication circuit and an active communication circuit, each as an equivalent circuit, intended for explanation of the operation for communications between the remote memory chip 4 and the remote memory interface 30 of the tape streamer drive 10. The "passive communication circuit" is an equivalent circuit for the operation of the remote memory chip 4 and "active communication circuit" is an equivalent circuit for the operation of the remote memory interface 30 of the tape streamer drive 10.

In the passive communication circuit, an inductor L1 and capacitor C1 are connected in parallel to each other to form a resonant circuit, and a variable resistor VR is connected to the resonant circuit.

In the active communication circuit, an inductor L2 and capacitor C2 are connected in parallel to each other to form a resonant circuit, and a signal source I is connected to the resonant circuit.

The passive and active communication circuits are magnetically coupled to each other by their respective inductors L1 and L2. A carrier wave emitted from the signal source I of the active communication circuit is transmitted from the inductor L2 to the inductor L1 via the magnetic coupling. An alternating output as the transmitted carrier wave is charged into the capacitor C2 across which a voltage will develop. The voltage across the capacitor C2 provides a power for driving the passive communication circuit. Namely, the power is transmitted to the passive communication circuit via the transmitted carrier wave.

For transmission of data from the active communication circuit to the passive communication circuit, the signal source I will generate a signal including the carrier wave on which the data is superposed by a 10% amplitude modulation (ASK) for example. The signal thus generated is transmitted to the passive communications circuit via the magnetic coupling as above to attain data transmission.

Data is transmitted from the passive communication circuit to the active communication circuit as follows.

It is assumed here that even when the active communication circuit is waiting for data reception, not transmitting any data, it is steadily outputting a carrier wave which will not be modulated. Therefore, as long as a carrier wave is being outputted, the passive communication circuit is on, namely, it is being supplied with a power as above. So, the resonant circuit (L1/C11) can also resonate. In this condition, the passive communication circuit modulates a carrier wave by data to be transmitted to change the resistance of the variable resistor VR. Thus, the impedance of the resonant circuit (L1/C11) varies and also the level of the output from the inductor L1 varies.

The output variation of the inductor L1 will be transmitted to the inductor L2 of the active communication circuit via the magnetic coupling, whereby the current level of the carrier wave, which should be constant, will be caused to vary. On this account, in the active communication circuit, the current level variation is detected and binarized to provide the same data as that produced by modulation, by variation, of the resistance of the variable resistor VR in the passive communication circuit. With the above operations, data can be transmitted from the passive communication circuit to the active communication circuit. That is, an apparent data transmission can be attained.

As above, data transmission and reception can be done by the noncontact interface. With such operations, the passive communication circuit can transmit and receive data to and from the active communication circuit even if it has no power source to drive itself. Thus, the remote memory chip 4 in this embodiment can be constructed including no power source such as a battery.

In the data write/read unit 150 according to the present invention, the reception circuit system including the antenna 170 and RF amplifier 171, and the transmission circuit system including the RF amplifier 176 and antenna 170, have their mode of operation switched as follows based on the theories of the passive communication and active communication, having been described above with reference to FIG. 24.

In case the data write/read unit 150 communicates with the remote memory chip 4 being a passive communication circuit, its transmission/reception circuit system will operate as an active communication circuit. In contrast, in case the data write/read unit 150 communicates with the tape streamer drive 10 with the remote memory interface 30 which works as an active communication circuit, its transmission/reception circuit system will operate as a passive communication circuit. Such switching between the modes of operation of the data write/read unit 150 is controlled by the system controller 181. That is, when any of the drive select key 53 and cassette select key 54 provided on a user's control unit 177 is operated, the system controller 181 will control the switching between the modes of operation depending upon which is currently selected as the communication counterpart, the remote memory chip 4 or remote memory interface 10.

The user's control unit 177 of the data write/read unit 150 is provided the control keys as shown in FIG. 22. A command issued by operating the control unit 177 is supplied to the system controller 181. The system controller 181 will make an appropriate necessary control corresponding to the content of the supplied command.

The display monitor 155 is composed of an image display provided on the housing surface, a drive circuit to drive the image display, etc. as shown in FIG. 22. The display monitor 155 is driven under the display control of the system controller 181 to display a predetermined content appropriately.

The data write/read unit 150 constructed as shown in FIG. 23 will communicate with the tape streamer drive 10 or remote memory chip 4 of the tape cassette 1 as will be described next.

Figure 25:
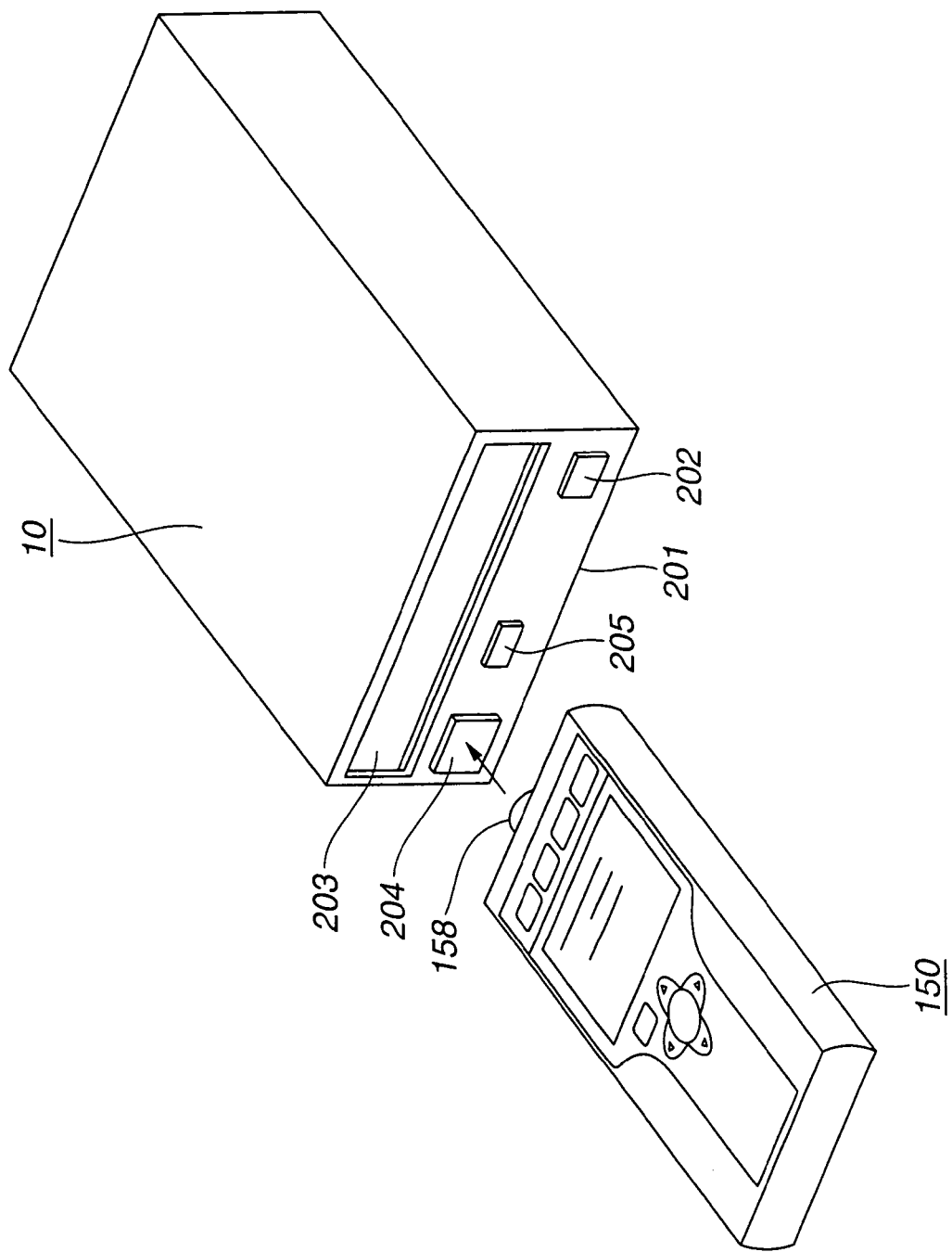
FIG. 25 is a perspective view of the data write/read unit and tape streamer drive, showing the positional relation between them for communicating with each other.

FIG. 25 shows the positional relation between the data write/read unit 150 and tape streamer drive 10 when they communicates with each other.

Note that the antenna 33 of the remote memory interface 30 is assumed herein to be located at the back of a guide 204 provided on a front panel 201 of the housing of the tape streamer drive 10. The guide 204 is provided to mark a visually recognizable position on the front panel 201 to which the user brings the antenna block 158 of the data write/read unit 150 near.

When the user wants communication between the data write/read unit 150 and tape streamer drive 10, he brings the antenna block 158 of the data write/read unit 150 close to the guide 204 formed on the front panel 201 of the tape streamer drive 10 as shown in FIG. 25.

Once the antenna block 158 of the data write/read unit 150 is brought near to the predetermined position on the front panel of the tape streamer drive 10, the antenna 33 of the tape streamer drive 10 and antenna 170 of the data write/read unit 150 are magnetically coupled with each other to allow mutual communications between them.

As shown in FIG. 25, the front panel 201 of the tape streamer drive 10 has provided thereon a power on/off key 202, cassette slot 203 and an eject key 205. The power key 202 is used to turn on and off the main power source. The cassette slot 203 is provided to insert the tape cassette 1 into the tape streamer drive 10 and eject the tape cassette 1 from inside the tape streamer drive 10. The eject key 205 is to be operated directly by the user to eject the tape cassette 1 from inside the tape streamer drive 10 through the cassette slot 203.

Figure 26:
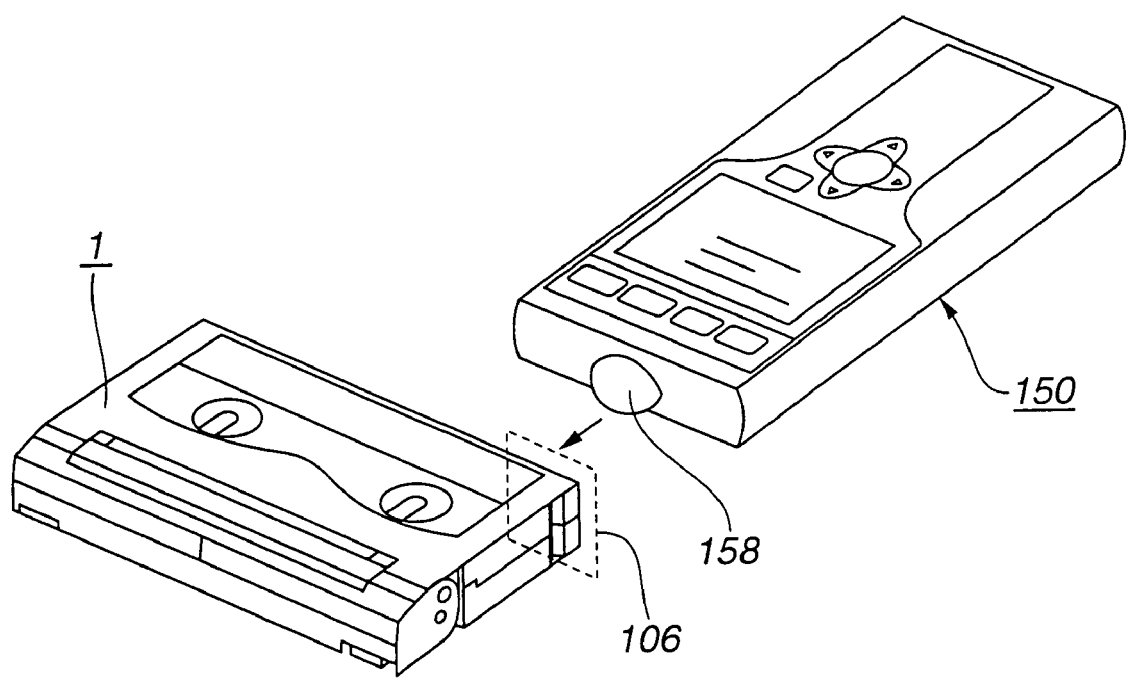
FIG. 26 is a perspective view of the data write/read unit and remote memory chip in the tape cassette, showing the positional relation between them for communicating with each other.

FIG. 26 shows the positional relation between the remote memory chip 4 in the tape cassette 1 and the data write/read unit 150 for communications between them.

The antenna 5 of the remote memory chip 4 is located near the terminal block 106 inside the housing of the tape cassette 1.

Also in this case, for communications between the data write/read unit 150 and the remote memory chip 4 in the tape cassette 1, the antenna 158 of the data write/read unit 150 is brought near to the terminal block 106 on the label-attached surface of the tape cassette 1 as shown. Mutual communications are possible between the remote memory chip 4 and data write/read unit 150 when the antenna 5 of the remote memory chip 4 and the antenna 170 of the data write/read unit 150 are placed in relation to each other at such a distance that magnetic coupling between them can be assured.

(8) Example Application of Instruction/Object Information (First Example)

8.1 Operation Overview

As having previously been described, it is possible to store, in the MIC (remote memory chip 4 and contact memory 104) in the tape cassette 1 used in the present invention, "instruction/object information" in which there is stated an instruction to be carried out by a predetermined system device. In this case, the instruction/object information read from the MIC of the tape cassette 1 is interpreted and the system device provides a predetermined control according to the content of the instruction stated in the instruction/object information, whereby there is available a system operation any conventional system cannot ever have enabled. Many kinds of system operations based on such instruction/object information are possible, some of which will be described herebelow by way of example. It should be noted that for explanation of the example of the system operations using the instruction/object information, it is assumed for the simplicity of the illustration and explanation that the MIC to or from which the instruction/object information is written or read is the remote chip memory 4. Namely, the remote memory chip 4 is provided to support the noncontact communications.

The first one of the example of the system operations using the instruction/object information concerns backup and restoration of data stored in the HDD 308 in the host computer 40.

Figure 27A:
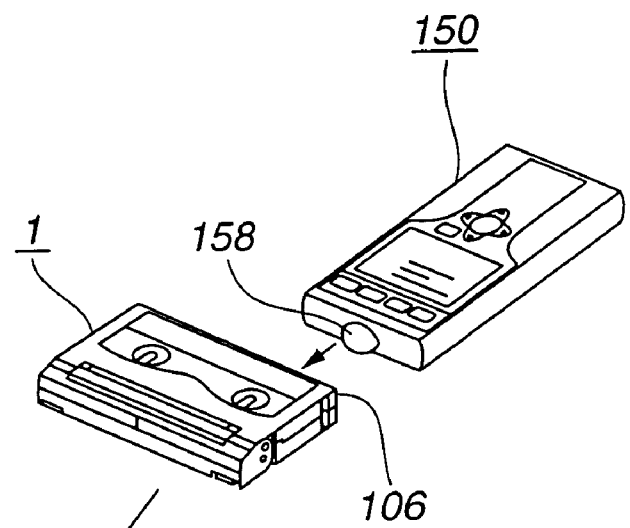
FIGS. 27A and 27B are perspective views showing the mode of using an instruction/object information in a first example of the system operation.
Figure 27B:
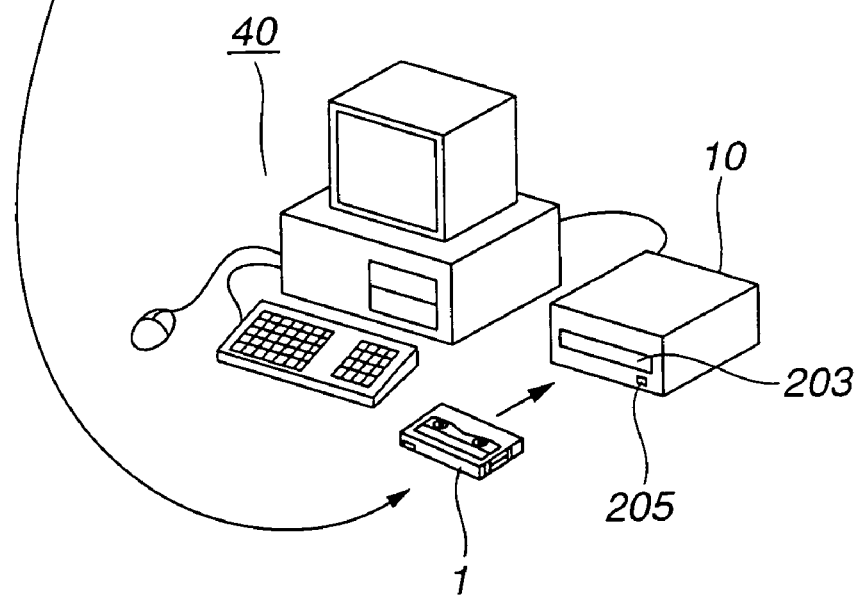

FIGS. 27A and 27B show an example mode of using a backup/restore system in the form of a user's operating procedure.

Instruction/object information on the data backup/restore is stored in the ROM 178 or RAM 179 of the data write/read unit 150 shown in FIG. 27A. The tape cassette 1 shown in FIG. 27A is used by the user for backup of the data.

For the purpose of data backup/restore, the data write/read unit 150 is connected to a personal computer for example using a data interface of RS232C or USB type so that instruction/object information prepared or acquired and held at the personal computer will be transferred to the data write/read unit 150. Alternatively, such instruction/object information may be prepared by the user operating the data write/read unit 150.

Further, instruction/object information may be written to the MIC using a system in which the tape streamer drive 10, not the data write/read unit 150, is connected to the personal computer. In this case, instruction/object information is prepared or externally acquired at the personal computer and held in the HDD or the like. With tape cassette 1 loaded in the tape streamer drive 10, the instruction/object information is transmitted from the personal computer to the tape streamer drive 10 and written by the tape streamer drive 10 to the MIC in the loaded tape cassette 1.

The above will be described in detail later. It is assumed that the instruction/object information includes information that "If the tape cassette is loaded without operating the eject key, data to be put in a specific directory will be backed up. When the tape cassette is loaded with operating the eject key, data to be put in the same directory will be restored." It should be noted that the "backup" referred to herein is to copy, for saving, data stored at the host computer to the magnetic tape in the tape cassette. The "restore" is to update the content of data currently stored at the host computer by writing data saved in the magnetic tape in the tape cassette over the data in the host computer.

As shown in FIG. 27A, the data write/read unit 150 is brought near to the terminal block 106 of the tape cassette 1 to communicate with the remote memory chip 4 in the tape cassette 1 for writing backup/restore instruction/object information from the data write/read unit 150 to the remote memory chip 4. At this time, the user operates the write key 152 on the data write/read unit 150 to set the write mode, selects, as transmission data, backup/restore instruction/object information held in the ROM 178 or RAM 179, and do predetermined operations for transmission of the instruction/object information. Thus, the transmission circuit system of the data write/read unit 150 works as the active communication circuit to communicate with the remote memory chip 4 as the passive communication circuit for transmission of the above-mentioned backup/restore instruction/object information. The backup/restore instruction/object information thus transmitted is received by the remote memory chip 4 and written into a predetermined area, for example, a volume information of the MIC header.

FIG. 27B shows a data storage system in which the tape streamer drive 10 and host computer 40 are connected to each other by a predetermined data interface.

After writing the backup/restore instruction/object information to the remote memory chip 4 in the tape cassette 1 as shown in FIG. 27A, the user loads the tape cassette 1 having the backup/restore instruction/object information written therein into the tape streamer drive 10 as shown in FIG. 27B at any time when the data is to be backed up or restored. At this time, for a normal backup of the data, the user inserts the tape cassette 1 into the cassette slot 203 simply without operating the eject key 205. On the contrary, for restoration of the data, the user inserts the tape cassette 1 into the cassette slot 203 with operating the eject key 205.

When the tape cassette 1 is loaded in place as above, the taper streamer drive 10 will read the instruction/object information stored in the remote memory chip 4 while loading the magnetic tape 3. The instruction/object information thus read can be acquired by the host computer 40 by accessing the tape streamer drive 10.

The system composed of the host computer 40 and tape streamer drive 10 does a predetermined operation according to an instruction stated in the instruction/object information acquired as above. Namely, when the tape cassette 1 is loaded without operating the eject key 205, the system will make a predetermined control and process for backup, into the tape cassette 1, of data stored in an instruction/object information-defined directory in the HDD 308 in the host computer 40. At this time, the host computer 40 transfers data in the designated directory in the HDD 308 to the tape streamer drive 10. The tape streamer drive 10 writes the transferred data to the magnetic tape 3 in the tape cassette 1 under the control of the host computer 40 for example.

On the other hand, when the tape cassette 1 is loaded into the tape streamer drive 10 with operating the eject key 205, the system will make a predetermined control and processes for writing (restore) data stored in the loaded tape cassette 1 over the data stored in the designated directory in the HDD 308 in the host computer 40. That is to say, the host computer 40 controls the tape streamer drive 10 to read, from the tape cassette 1, the data backed up in the directory specified by the instruction/object information. The data in the designated directory in the HDD 308 of the host computer 40 is updated by writing the backed-up data read and transferred from the tape streamer drive 10 over the data in the directory. The restoration is thus effected.

8.2 Host Interface Format

Next, operations for implementing the aforementioned backup/restoration included in the present invention will be described.

For the aforementioned backup/restoration, instruction/object information has to be transferred between the tape streamer drive 10 and host computer 40, which means that it is necessary to transfer information stored in the MIC between them.

As a host interface format for transfer of information in the MIC between the tape streamer driver 10 and host computer 40, there is available an SCSI host interface command conforming to the AM Specification of the ANSI. Conventionally, the SCSI host interface conforming to the ANSI-SM Specification is used to transfer management information stored in the MIC. In this example, instruction/object information in the MIC can be supported by the SCSI host interface conforming to the ANSI-AM Specification.

First, the SCSI host interface format conforming to the ANSI-AM Specification will be explained.

For the SCSI host interface conforming to the ANSI-AM Specification, WRITE ATTRIBUTE command is defined as a write command for data write to the MIC and READ ATTRIBUTE command is defined as a read command for data read from the MIC.

FIG. 35 shows the data structure of the WRITE ATTRIBUTE command.

As shown, it is defined that the WRITE ATTRIBUTE command is of 15 bytes and OPCODE=8Dh. The WRITE ATTRIBUTE command includes VOLUME NUMBER, PARTITION NUMBER, PARAMETER LIST LENGTH, CONTROL, etc. each having a predetermined number of bytes and disposed in predetermined byte positions, respectively.

VOLUME NUMBER identifies a volume in the MIC, and PARTITION NUMBER identifies a partition in the volume in the MIC.

PARAMETER LIST LENGTH indicates the data length of a parameters list stored as data to be transmitted with the WRITE ATTRIBUTE command in a data output buffer.

FIG. 36 shows the data structure of a READ ATTRIBUTE command.

As shown, it is defined that the READ ATTRIBUTE command is of 15 bytes in total and OPCODE=8Ch. The READ ATTRIBUTE command includes VOLUME NUMBER, PARTITION NUMBER, FIRST ATTRIBUTE ID, ALLOCATION LENGTH, CONTROL, etc. each having a predetermined number of bytes and disposed in predetermined byte positions, respectively.

VOLUME NUMBER and PARTITION NUMBER are defined similarly to the aforementioned VOLUME NUMBER and PARTITION NUMBER in the WRITE ATTRIBUTE command.

In FIRST ATTRIBUTE ID, there is stored an ID (identifier) for identification of the first ATTRIBUTE which will be returned with the READ ATTRIBUTE command.

ALLOCATION LENGTH indicates an area size allocated to a parameters list to be returned.

FIG. 37 shows the structure of an ATTRIBUTE data. The ATTRIBUTE data is transmitted along with the WRITE ATTRIBUTE command shown in FIG. 35, and also returned as a response to the WRITE ATTRIBUTE command along with the READ ATTRIBUTE command.

As shown in FIG. 37, the ATTRIBUTE data includes ATTRIBUTE ID (2 bytes), READ ONLY(1 bit), FORMAT(2 bits), ATTRIBUTE LENGTH(2 bytes) and ATTRIBUTE VALUE disposed in predetermined byte positions, respectively.

ATTRIBUTE ID identifies the type of ATTRIBUTE data (command) and will have a value allocated thereto as shown in FIG. 38 for example correspondingly to an information source to be altered or updated.

That is, 0000h to 03FFh are allocated to the ATTRIBUTE data as "Device Common Attributes". Also, 0400h to 07FFh will be allocated to the ATTRIBUTE data as "Medium Common Attributes", 0800h to 0BFFh be allocated to the ATTRIBUTE as "Host Common Attributes", 0C00h to 0FFFh be allocated to the ATTRIBUTE data as "Device Vendor Unique Attributes", 1000h to 13FFh be allocated to ATTRIBUTE data as "Medium Vendor Unique Attributes", and 1400h to 17FFh be allocated to the ATTRIBUTE data as "Host Vendor Unique Attributes". 1800h to FFFFh are undefined (Reserved).

Note that Medium Common Attributes to which values ATTRIBUTE ID=0400h to 07FFh are allocated are parts of information to be written to the MIC for example that are written to the MIC during manufacture once and cannot be rewritten thereafter. The values ATTRIBUTE ID=0400h to 07FFh are defined and allocated as shown in FIG. 39.

More specifically, ATTRIBUTE ID=0400h is allocated to MEDIUM MANUFACTURER (8 bytes, ASCII), and ATTRIBUTE ID=0401h is allocated to MEDIUM SERIAL NUMBER (32 bytes, ASCII).

ATTRIBUTE ID=0402h to 0405h are undefined (Reserved) since they are SCC.

ATTRIBUTE ID=0406h is allocated to MEDIUM MANUFACTURE DATA (8 bytes, ASCII), ATTRIBUTE ID=0407h is allocated to MAM (MIC) CAPACITY (8 bytes, binary), ATTRIBUTE ID=0408h is allocated to MEDIUM TYPE (1 byte, binary), and ATTRIBUTE ID=0409h is allocated to MEDIUM TYPE INFORMATION (2 bytes, binary).

ATTRIBUTE ID=040Ah to 07FFh are undefined (Reserved).

In Medium Common Attributes defined as above, MEDIUM TYPE (1 byte, binary) having ATTRIBUTE ID=0408h allocated thereto indicates the type of a tape cassette. Also, MEDIUM TYPE INFORMATION (2 bytes, binary) has stored therein predetermined information content corresponding to each tape cassette type defined by MEDIUM TYPE.

These MEDIUM TYPE and MEDIUM TYPE INFORMATION are currently defined as shown in FIG. 40A. As shown, MEDIUM TYPE=00h defines a "Data medium" indicating a tape cassette from and to which normal data is recorded and reproduced. MEDIUM TYPE INFORMATION corresponding to this DATA TYPE is undefined (Reserved).

MEDIUM TYPE=01h defines a "Cleaning medium" indicating a cleaning cassette. MEDIUM TYPE INFORMATION corresponding to this MEDIUM TYPE defines a "Maximum number of cleaning cycles permitted". That is, MEDIUM TYPE INFORMATION indicates a maximum number of cleaning cycles for which the cleaning cassette is allowed to be used.

MEDIUM TYPE=80h defines a "Write-once medium" indicating a tape cassette which should be used as a so-called unrewritable recordable tape cassette. MEDIUM TYPE INFORMATION corresponding to this MEDIUM TYPE is undefined (Reserved).

MEDIUM TYPE=02h to 7Fh and MEDIUM TYPE=81h to FFh are undefined (Reserved).

Especially, MEDIUM TYPE=91h and 92h included in MEDIUM TYPE=81h to FFh having been undefined are newly defined as shown in FIG. 40B correspondingly to the fact that instruction/object information can be stored into the MIC.

Namely, MEDIUM TYPE=91h defines that "there is stored instruction/object information for Data medium is stored" and indicates that the tape cassette in consideration is a one to and from which data can be recorded and reproduced and also that instruction/object information is stored in the MIC in the tape cassette.

MEDIUM TYPE=92h defines that "there is stored instruction/object information for Cleaning medium" and indicates that the tape cassette in consideration is a cleaning cassette having instruction/object information stored in its internal MIC.

MEDIUM TYPE INFORMATION corresponding to each of MEDIUM TYPE=91h and 92h defines a full byte length of the instruction/object information.

Host Common Attributes to which values ATTRIBUTE ID=0800h to 0BFFh are allocated are information on applications installed in the host computer 40 to deal with the tape cassette in some way, such as a backup application or the like.

ATTRIBUTE ID=0800h to 0BFFh allocated to Host Common Attributes are currently defined and allocated as shown in FIG. 41(*a*). That is, ATTRIBUTE ID=0800h identifies APPLICATION VENDOR (8 bytes, ASCII).

ATTRIBUTE ID=0801h identifies APPLICATION NAME (32 bytes, ASCII), and ATTRIBUTE ID=0802h identifies APPLICATION VERSION (8 bytes, ASCII). ATTRIBUTE ID=0803h identifies USER MEDIUM TEXT LABEL(160 bytes, text), ATTRIBUTE ID=0804h identifies DATE & TIME LAST WRITTEN (12 bytes, ASCII), ATTRIBUTE ID=0805h identifies TEXT LOCALIZATION IDENTIFIER (1 byte, binary), ATTRIBUTE ID=0806h identifies BARCODE (32 bytes, ASCII), and ATTRIBUTE ID=0807h identifies OWNING HOST TEXTUAL NAME (80 bytes, text).

Further, ATTRIBUTE ID=0808h identifies MEDIA POOL (160 bytes, Text), ATTRIBUTE ID=0809h identifies PARTITION USER TEXT LABEL (16 bytes, ASCII), and ATTRIBUTE ID=080Ah identifies LOAD/UNLOAD AT PARTITION (1 byte, binary).

The remaining ATTRIBUTE ID=080Bh to BFFh are undefined (Reserved).

In this example, correspondingly to the implementation of a system operation according to instruction/object information read from the MIC, ATTRIBUTE ID=080Bh and 080Ch of ATTRIBUTE ID=080Bh to BFFh of the Host Common Attributes are defined as shown in FIG. 41B.

ATTRIBUTE ID=080Bh defines an "Instruction for the cartridge (2048 bytes, binary)" indicating that the ATTRIBUTE data is instruction/object information.

ATTRIBUTE ID=080Ch defines a "Request for the host (2048 bytes, binary)". The Request for the host is issued by an application in the host computer and used when a message generated at the drive (tape streamer drive) based on the instruction/object information has to be read from the drive.

FIG. 42 shows an example structure of the ATTRIBUTE data as the Instruction for the cartridge. It should be noted that the ATTRIBUTE data structure itself shown in FIG. 42 is similar to the structure of instruction/object information stored in the MIC.

An area of 2 bytes, first and second, in total is defined as "Size of valid data out of 2048 bytes" indicating a data size which is valid in an area of the "Instruction for the cartridge" of 2048 bytes in total. When "0" (zero) is set in this area, no data exists.

An area of 1 byte as a third byte is an area of "Responsibility" specifying a device which has to execute the instruction. It is defined in this area that when "0" is set in this area, the host side shall execute the instruction/object information (Instruction/Object), while when "1" is set in the area, the drive side shall execute the instruction/object information.

An area of 1 byte as a fourth byte is an area of "Data Type Number" designating a data type of instruction/object information itself stored at a sixth byte or subsequent bytes as will be described later.

It is assumed herein that Data Type Number=0 defines a "Vendor Unique" indicating instruction/object information unique to the vendor (manufacturer).

Data Type Number=1 defines a "Standard Instructions that are defined in this document" indicating that the instruction/object information itself is a standard instruction (an instruction conforming to the standard).

Date Type Number=2 defines "XML Object." indicating that the instruction/object information itself is data on an object forming the content of XML.

In this format, the types of instruction/object information itself in this example include a statement of an instruction and object data. It should be noted that according to the present invention, object data as instruction/object information is not limited to any one conforming to the XML standard.

An area of 1 byte as a fifth byte is an area of "Data Type Format" indicating the format of instruction/object information itself.

Data Type Format=0 defines "Vendor Unique" indicating that the format is a one the vendor defined uniquely.

Data Type Format=1 defines "ASCII Text". Date Type Format=2 defines that "By the Standard Instructions Compiler rules that are defined in this document" designating standard instructions conforming to the compiler rule.

Remaining areas of 2043 bytes from a sixth byte to 2048th byte store stated contents of instruction/object information itself as Instruction or Object.

The instruction/object information is variable in size (length) depending upon its content. In this case, however, it has a maximum size of 2048 bytes. The instruction/object information will be stored at the sixth byte and subsequent bytes for example.

According to the present invention, the standard Instructions are defined as follows. It should be noted that the linefeed delimiter for storing standard instructions in the ASCII text form is an LF (line Feed) normally used in the UNIX environment.

Instructions for designating timing at the drive side:
NOW_LOADING, AFTER_LOADING and BEFORE_EJECT
Instructions for designating operations at the drive side:
REWIND, EJECT
CHANGE_PARTITION, SPACE_EOD, SPACE_FILE_MARK,
SPACE_SET_MARK, GET_DRIVE_SERIAL_NUMBER,
GET_CARTRIDGE_SERIAL_NUMBER,
GET_DRIVE_TYPE,
GENERATE_CHECK_CONDITION,
SENSE_EJECT_BUTTON
Designations for controlling instructions:
SWITCH, CASE, IF, THEN, ELSE
Message transmission to host:
PUT_MESSAGE, GENERATE_CHECK_CONDITION Note that when the drive returns CHECK_CONDITION (99), the host has to read it by issuing a parameter ID=080Ch "Request for the host" as in the ANSI-AM specification, and know what has occurred at the drive side.

8.3 Processing Operations

With the aforementioned host interface format taken in consideration, the processing operations for implementation of the backup/restore according to the instruction/object information described with reference to FIGS. 27A and 27B will be described below with reference to FIGS. 30, 31 and 32.

Figure 30:
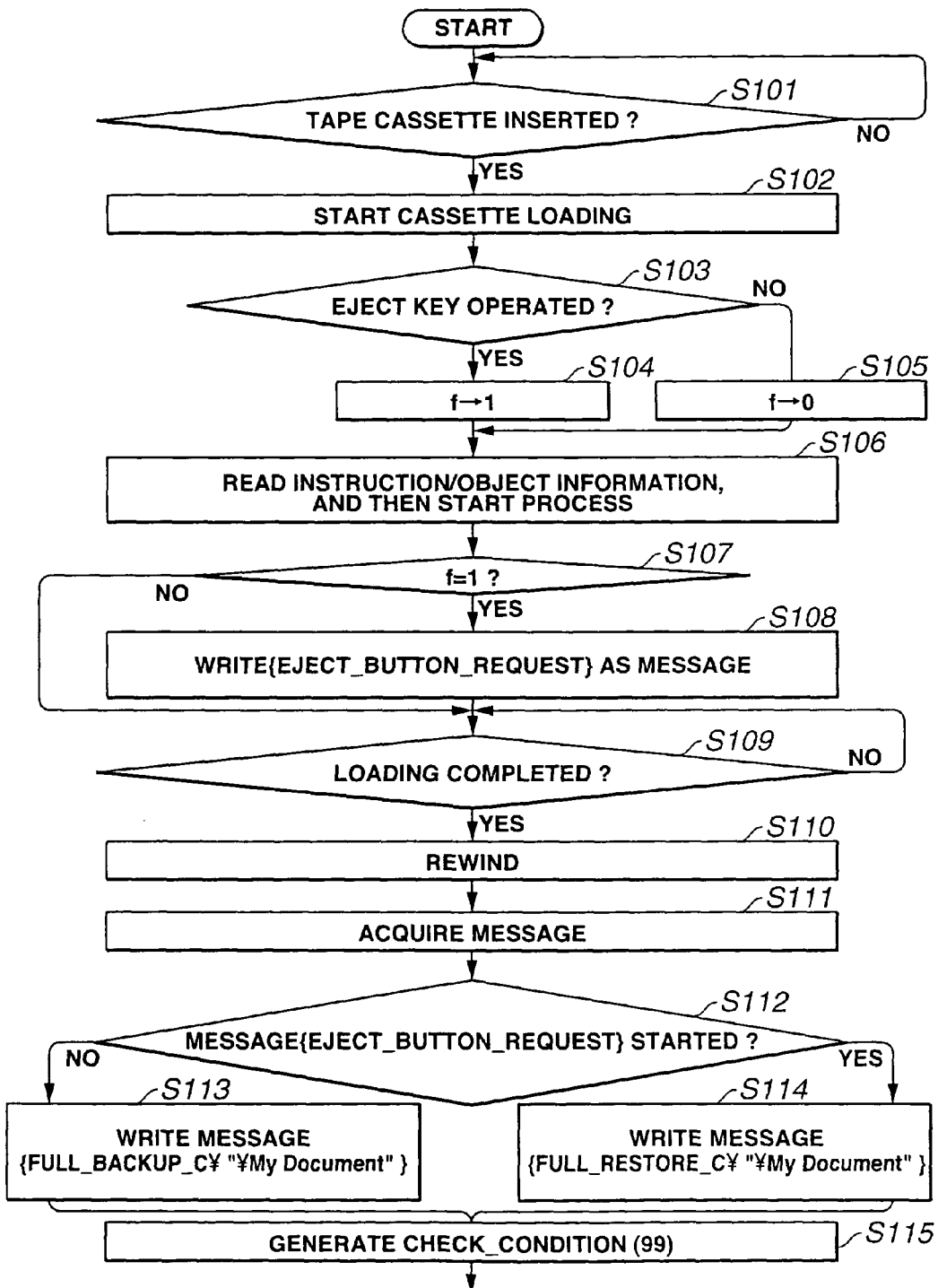
FIG. 30 shows a flow of operations of the drive for implementing the first example of the system operation with the instruction/object information.

FIG. 30 is a flow chart showing the processing operations of the tape streamer drive 10 for example. In this case, the system controller 15 of the tape streamer drive 10 implements the backup/restore operation. FIG. 31 shows a flow of processing operations of the host computer 40 for example. In this case, the CPU 301 of the host computer 40 implements the backup/restore operation.

Note that to perform processes which will be described below, the flash ROM 25 in the tape streamer drive 10 has held therein program data under which the instruction/object information can be processed and the system controller 15 will perform the processes according to the program. The host computer 40 has installed in the HDD 308 thereof a program under which the instruction/object information can be processed. The program is moved to the RAM 303 for example and the CPU 301 makes a control according to the program. The tape streamer drive 10 and host computer 40 have an SCSI interface function to mutually transmit and receive a command to and from each other via the SCSI host interface of the aforementioned ANSI-AM Specification.

The processing operations which will be described below are also applicable when the MIC is the contact memory 104. However, it is assumed for the convenience of the illustration and explanation that the MIC in the tape cassette 1 is the remote memory chip 4.

First at the tape streamer drive 10, the system controller 15 will wait for the tape cassette 1 to be inserted into the cassette slot 203 in step S101 in FIG. 30. When the system controller 15 detects that the tape cassette 1 has been inserted through the cassette slot 203 of the tape streamer drive 10, it goes to step S102.

In step S102, loading of the tape cassette 1 inserted into the cassette slot 203 will start. More specifically, the system controller 15 controls the internal loading mechanism to convey the tape cassette 1 into place for recording or playback while starting the cassette loading by leading out the magnetic tape 3.

In this case, in step S103 next to step S102, the system controller 15 will judge whether the eject key 205 has been operated at the time of inserting the tape cassette 1. When the system controller 15 has decided that the eject key 205 has been so operated, it goes to step S104 where it will set "1" for a flag f and then goes to step S106. If the system controller 15 has decided that the eject key 205 has not been so operated, it will got to step S105 where it will set "0" for the flag f and then goes to step S106. It should be noted that the flag f is held in the S-RAM 24 or an internal register of the system controller 15 for example.

The tape cassette 1 is being loaded into the tape streamer drive 10 during the above procedure. However, even while the magnetic tape 3 is being loaded, communications can be started between the antenna 5 in the tape cassette 1 and antenna 31 at the tape streamer drive 10 when these antennas 5 and 31 are at such a distance from each other that communications can be established by the magnetic coupling. Thus, after the tape cassette 1 is inserted, the system controller 15 will start control the remote memory interface 30 to start access to the remote memory chip 4, for example (not shown as any step in FIG. 30). When the communication with the remote memory chip 4 is established, the system controller 15 will read the instruction/object information in step S106. Namely, the system controller 15 accesses the remote memory chip 4 to read the instruction/object information from each remote memory chip 4 and write the information to the S-RAM 24 or flash memory 25 where the information will be held. Then, the system controller 15 starts processing the read instruction/object information.

In this case, the above instruction/object information is an instruction for backup/restore that "If the tape cassette is loaded without operating the eject key, data to be put in a specific directory will be backed up. When the tape cassette is loaded with operating the eject key, data to be put in the same directory will be restored" as having previously been described with reference to FIGS. 27A and 27B.

Processes in step S107 and subsequent steps will be performed according to the above-mentioned instruction under which the instruction has been started in step S106. When the instruction/object information with which the process has been started in step S106 has another content, a process will be performed based on that instruction/object information.

Prior to explaining processes in step S107 and subsequent steps, an example statement included in instruction/object information as an instruction for backup/restore, which has been stored in the remote memory chip 4 and read into the tape streamer drive 10, will be described in detail with reference to FIG. 32.

The instruction/object information shown in FIG. 32 has a similar structure to that of the ATTRIBUTE data defining the Instruction for the cartridge shown in FIG. 42.

In this case, "0" is set for "Responsibility", indicating that the drive to execute the instruction is the host computer.

"1" is set for "Data Type Number" and "1" is set for "Data Type Format", indicating that the instruction/object information itself is an ASCII text based on the standard instruction.

The subsequent content starting with SWITCH is the standard instruction being the instruction/object information itself, and it is stated based on the ASCII text.

The system controller 15 of the tape streamer drive 10 will perform a process corresponding a following part of the stated content of the instruction shown in FIG. 32:

```
CASE; NOW_LOADING {
    IF SENSE_EJECT_BUTTON_THEN PUT_MESSAGE
    {EJECT_BUTTON_REQUESTED}
}
```

That is, in step S107, the system controller 15 judges first whether "1" is set for the current flag f. Namely, it judges whether the eject key has been operated during cassette loading. When the system controller 15 has decided that the flag f=1 and namely the eject key has been operated, it goes to step S108 where it will write a message "EJECT_BUTTON_REQUESTED" to the MIC.

In an area of the MIC where instruction/object information is stored, there is defined an area to be used as a PUT_MESSAGE work memory where a message is to be written. Namely, the message "EJECT_BUTTON_REQUESTED" is written to the PUT_MESSAGE work area of the MIC in step S108.

On the other hand, when the system controller has decided in step S107 that the flag f=0 and the eject key has not been operated, it will skip over step S108 and go to step S109.

In step S109, the system controller 15 waits for completion of cassette loading being currently done. When the system controller 15 has decided that the tape cassette has completely been loaded, it goes to step S110.

After completion of the cassette loading, the system controller 15 perform a process corresponding to a following stated content:

```
CASE: AFTER_LOADING {
    REWIND
        IF GET_MESSAGE = "EJECT_BUTTON_REQUESTED"
        THEN{
            PUT_MESSAGE {FULL_RESTORE"C:¥MyDocument"}
            GENERATE_CHECK_CONDITION (99)
        } ELSE
            PUT_MESAGE {FULL_BACKUP "C:¥My Document"}
            GENERATE_CHECK_CONDITION (99)
```

That is, the system controller 15 will perform a process to rewind the magnetic tape 3 to the tape start position in step S110.

In next step Sill, the system controller 15 makes reference to the current PUT_MESSAGE work memory. As a result, the system controller 15 will judge in step S112 whether a message "EJECT_BUTTON_REQUESTED" has been acquired.

If the system controller 15 has decided in step S112 that the message "EJECT_BUTTON_REQUESTED" has not been acquired, it goes to step S113.

In step S113, the system controller 15 will write a message "FULL_BACKUP "C:¥My Document"" to the PUT_MESSAGE work area. Then the system controller 15 goes to step S115 where it will generate CHECK_CONDITION (99) and send it to the host computer 40.

On the other hand, if the system controller 15 has decided in step S112 that the message "EJECT_BUTTON_REQUESTED" has been acquired, it goes to step S114. Instep S114, the system controller 15 will write a message "FULL_RESTORE"C:¥My Document"" to the PUT_MESSAGE work area. After that, the system controller 15 goes to step S115 where it will generate CHECK_CONDITION (99) and send it to the host computer 40.

With the aforementioned process performed by the system controller according to the instruction stated in the instruction/object information, the message "FULL_BACKUP "C:¥My Document"" will be written to the PUT_MESSAGE work memory if the tape cassette 1 has been loaded without operation of the eject key. If the tape cassette 1 has been loaded with the eject key being operated, the message "FULL_RESTORE"C:¥My Document"" will be written to the PUT_MESSAGE work memory. The CHECK_CONDITION (99) is generated to case the host computer to read the message.

The host computer 40 having thus received the supplied CHECK_CONDITION (99) will operate as will be described below with reference to FIG. 31.

Figure 31:
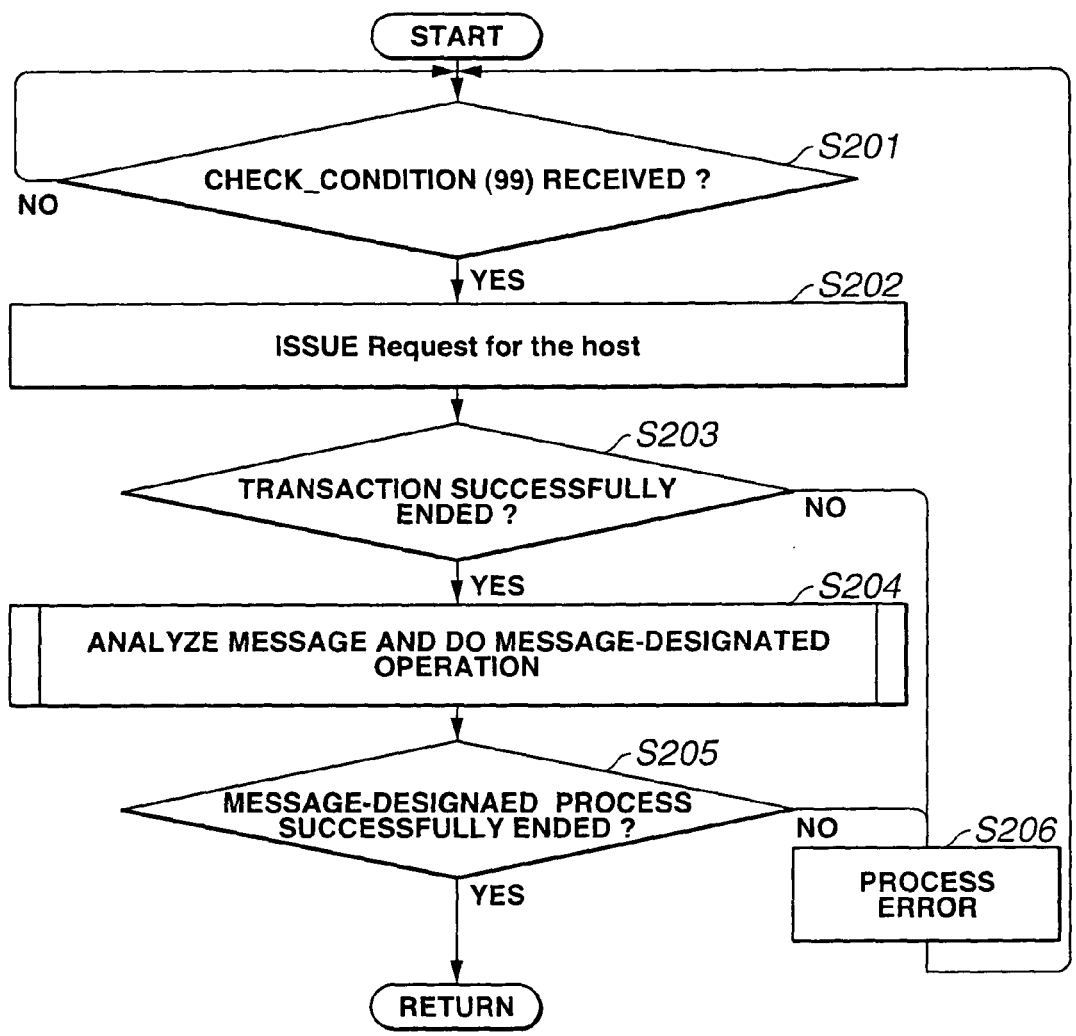
FIG. 31 shows a flow of operations of the host for implementing the first example of the system operation with the instruction/object information.

In step S201 in FIG. 31, the CPU 301 of the host computer 40 waits for arrival of the CHECK_CONDITION (99) transmitted from the drive via the SCSI interface. When the CPU 301 has decided that the CHECK_CONDITION (99) has arrived, it will got to step S202.

In step S202, in response to the reception of the CHECK_CONDITION (99), the CPU 301 will issue a READ ATTRIBUTE command as defined in FIG. 41B as the "Request for the host" to the tape streamer drive 10.

As a transaction corresponding to the issuance of the "Request for the host", the tape streamer drive 10 having received the "Request for the host" will return a message written, if any, in the PUT_MESSAGE work memory of the MIC as a response to the CPU 301 (the process is not illustrated).

In step S203, the CPU 301 of the host computer 40 judges whether the transaction effected in response to the issuance of the "Request for the host" has been successful.

For example, when no message exists or if the transaction has unsuccessfully be ended for any trouble, the CPU 301 will got to step S206 where it will perform a required process against the error, and goes to step S201.

On the other hand, when some message is returned because the transaction has been successful, the CPU 301 goes to step S204.

In step S204, the CPU 301 analyzes the acquired message and make a message-designated operation. Therefore, the process in step S204 appropriately varies depending upon the content of a message.

For example, in case the system controller 15 has processed the message "FULL_BACKUP "C:¥My Document"" because the process shown in FIG. 31 has passed through the process in step S113, the CPU 301 performs, depending upon the process in step S204, a control to back up data in the "C: ¥My Document" directory in the HDD 308.

That is to say, the CPU 301 of the host computer 40 reads data from the "C: ¥My Document" directory in the HDD 308, and transfers it to the tape streamer drive 10 via the SCSI. Also, the CPU 301 controls the recording operation of the tape streamer drive 10 via the SCSI so that the data transferred data is recorded to the magnetic tape 3 in the tape cassette 1 at the tape streamer drive 10.

If it has processed the message "FULL_RESTORE "C:¥My Document"" because the process shown in FIG. 31 has passed through the process in step S114, the CPU 301 will provide a control to restore the data in the the "C: ¥My Document" directory in the HDD 308 depending upon the process in step S204. In this case, the CPU 301 controls the playback operation of the tape streamer drive 10 to read restoration-use data from the magnetic tape 3 in the tape cassette 1, and transfers the read restoration-use data to the host computer 40 via the SCSI. Then, the host computer 40 will write the restoration-use data thus received to the HDD 308 so as to overwrite it as "C:¥My Document" data.

Note that a command to be used for backup or restoration may be "tar" command for example. When it is assumed that the "tar" command is used, "tar xf/dev/st0" is executed correspondingly to the "FULL_RESTOREC:¥My Document".

The process in step S204 is performed as above. Actually, however, the CPU 301 judges as in step S205 whether the process in step S204 has successfully be ended.

When the CPU 301 has decided that the process in step S204 has successfully been performed, it will exit the processing routine without doting otherwise and go back to step S201 for example. On the other hand, the CPU 301 has decided the process in step S204 has unsuccessfully been ended for any trouble for example, the CPU 301 will perform an error handling process in step S206 and the return to the process in step S201.

As having so far been described, the backup/restore operation is done based on an instruction in instruction/object information written to the MIC so that what the user should do is to load a backup-use tape cassette 1 into the tape streamer drive 10 in which the instruction/object information has been written to the MIC and thereafter data in a desired directory will automatically be backed up without any operation by the user. To restore the data, the user has only to press the eject key when loading the backup-use tape cassette 1 into the tape streamer drive 10 and thereafter the data will automatically be restored.

To implement the aforementioned system operation, a program with following functions is to be installed in the host computer 40:
 (1) CHECK_CONDITION (99) transmitted from the SCSI bus is detected.
 (2) When CHECK_CONDITION (99) is detected, "Request for the host (2048 bytes, binary) is read by ATTRIBUTE ID=080Ch of the ANSI-AM expanded specification.
 (3) A character string as the read instruction/object information is analyzed and FULL_BACKUP AND FULL_RESTORE are performed. It should be noted that in performing FULL_BACKUP and FULL_RESTORE, the "tar" command should be invoked on the assumption that the "tar" command shall be used.

This program is simpler than any ordinary backup software for example and may be of a small data size.

9. Example Application of Instruction/Object Information (Second Example)

9.1 Operation Overview

Next, the second example of the system operation using instruction/object information will be described.

For example, in a digital cinema system used in picture houses where a cinema is played, any film conventionally used is not distributed to each designated picture house but a predetermined recording medium having the content of a cinema digitally recorded therein is distributed to the designated picture house. The cinema is screened by playing back the recording medium distributed via the digital cinema system owned by the picture house. The playback system using a tape-like recording medium according to the present invention is applicable to such a digital cinema system to provide a variety of functions. An example of the applications will be described herebelow.

The tape cassette 1A shown in FIG. 28A is only used in a digital cinema system, and has recorded therein the content of a cinema to be screened. The tape cassette 1A is distributed to a cinema house having a predetermined digital cinema system.

In the MIC of the tape cassette 1A, an ID indicating that the tape cassette 1A is a one usable in a specific digital cinema system is stated in "Application ID" in the Manufacture Part of the MIC header, for example. In this embodiment, Application ID=e-cinema.

A value indicating that the tape cassette is an original one as a tape cassette having the content of a cinema (namely, the tape cassette is not any copy) is stored in the Cartridge Serial Number of 32 bytes in the MIC.

The MIC of the tape cassette 1A has written therein a statement of instruction/object information that the tape cassette 1A can be played back only in a predetermined specific digital cinema system, which can prevent the cinema data in the tape cassette 1A from being played in any other digital cinema system than predetermined. It should be noted that an example content of the instruction/object information will be described in detail later.

In this example, the instruction/object information is written to the MIC as in FIG. 28A and also as in the first example shown in FIGS. 27A and 27B. That is, the information may be written to the MIC by the data write/read unit 150. Alternatively, instruction/object information transferred from the personal computer may be received by the tape streamer drive 10 and written to the MIC of the tape cassette 1A currently loaded in the tape streamer drive 10.

FIG. 28B shows an ordinary system consisting of a host computer 40 as an ordinary personal computer and a general-purpose tape streamer drive 10. It is assumed here that a tape cassette 1A compatible with the digital cinema system is loaded in the tape streamer drive 10 in such an ordinary system. In this case, when the tape cassette 1A is inserted in the cassette slot 203 of the tape streamer drive 10, the firmware of the tape streamer drive 10 reads data stored in the MIC to acquire an application ID in the manufacture part of the MIC header.

In this case, the application ID is "e-cinema" as above, indicating that the loaded tape cassette is a one compatible with the specific digital cinema system. So, the general-purpose tape streamer drive 10 may be set not to record or reproduce data to or from the magnetic tape in the tape cassette 1A. Thus, the tape cassette 1A compatible with the specific digital cinema system can be prevented from being played by any illegal digital cinema system.

FIG. 28C shows a digital cinema system with which the tape cassette 1A is compatible. This digital cinema system includes a host computer 40A having installed therein an application having a function of digital cinema system for example, and a tape streamer drive 10A specially designed for use with the digital cinema system. According to the present invention, the tape streamer drive 10A has a firmware designed to effect an operation corresponding to a case that the application ID of the MIC is "e-cinema". Correspondingly, the firmware holds information such as DRIVE_TYPE=E-CINEMA for example. Write of such information to the firmware is effected using an update program, for example, regularly supplied from the cinema distributor.

Note that the tape streamer drive 10A is not different in any other respects from the general-purpose tape streamer driver 10.

The tape cassette 1A is loaded into the tape streamer drive 10A of the digital cinema system shown in FIG. 28C. Then, the tape streamer drive 10A reads information from the MIC of the tape cassette 1A, and first refers to the Application ID for example. When the Application ID is "e-cinema", the tape streamer drive 10A makes operations addressed to the digital cinema system.

As an operation addressed to the digital cinema system, the tape streamer drive 10A reads instruction/object information from the MIC, and processes it. The processes according to the instruction/object information will be described in detail later. Only when the Cartridge Serial Number of the loaded tape cassette indicates that the loaded tape cassette is an original one having the content of a cinema recorded therein and the tape cassette itself holds the information DRIVE_TYPE=E-CINEMA, it is allowed to read data from the loaded tape cassette, for example, the content of a cinema. That is, only when the loaded tape cassette is a regular original one, not any illicit one and the tape streamer drive 10 going to play back the tape cassette is also a regular one having a firmware appropriately built according to the update program supplied from the cinema distributor, the digital cinema system can play the cinema content.

With the above system operation, a simple job to write instruction/object information to the tape cassette will make it possible to easily inhibit any illicit cinema system from being operated. In this case, the above operation can almost be completed by the tape streamer drive 10A. Namely, it is possible to appropriately process the tape cassette by a low-order device in the system, not by any upper-order device.

9.2 Processing Operations

Next, the processing operations conducted by the tape streamer drive 10A in the digital cinema system shown in FIG. 28C will be illustrated and described.

The processing operations of the tape streamer drive 10A will be based on instruction/object information addressed to a digital cinema system. So, an example content of concrete statement of the instruction/object information will first be described with reference to FIG. 34.

The instruction/object information shown in FIG. 34 has a similar structure to that of the ATTRIBUTE data as the Instruction for the cartridge shown in FIG. 42.

In this case, "1" is set for the Responsibility, indicating that the device to execute the instruction is the drive.

"1" is set for "Data Type Number" and "1" is set for "Data Type Format", indicating that the instruction/object information itself is an ASCII text based on the Standard Instructions.

The subsequent content starting with SWITCH is the standard instruction being the instruction/object information itself, and also in this case, it is stated based on the ASCII text.

Figure 33:
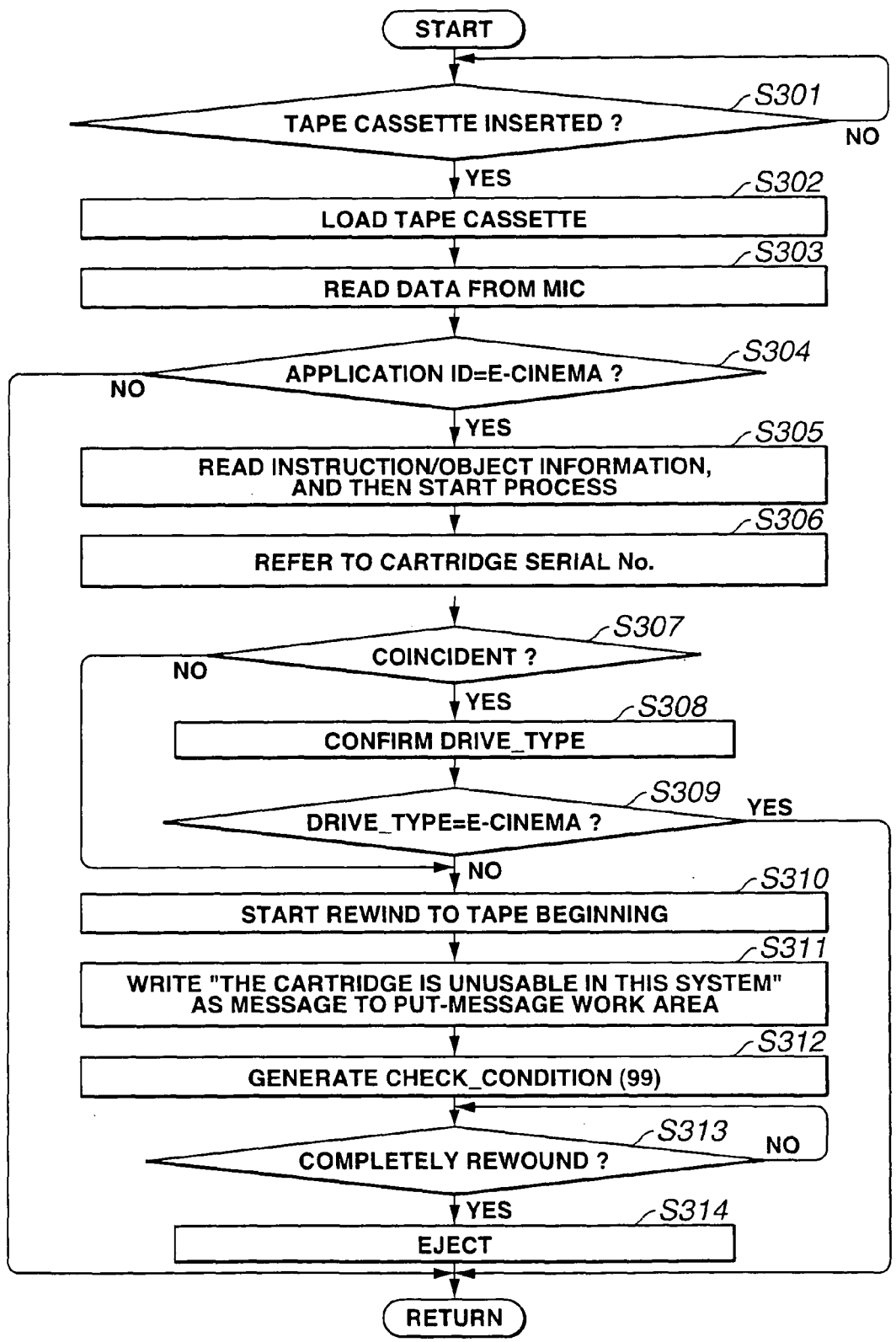
FIG. 33 shows a flow of operations of the host for implementing the second example of the system operation using the instruction/object information.

FIG. 33 shows the processing operations done by the tape streamer driver 10 of the digital cinema system when loading a tape cassette into the tape streamer drive. The processes shown are performed by the system controller 15 in the tape streamer drive 10.

The system controller 15 of the tape streamer drive 10 first waits in step S301 until the tape cassette is inserted into the cassette slot 203. When it has decided that the tape cassette is inserted in the cassette slot 203, it goes to step S302.

In step S302, the system controller 15 controls the loading of the inserted tape cassette. In this case, when the loading is complete for example, the system controller 15 reads data from the MIC provided in the loaded tape cassette in step S303. The data thus read from the MIC is held in the S-RAM 24 or flash ROM 25 for example.

Next in step S304, the system controller 15 will refer to the application ID in the manufacture part of the MIC header in the data read from the MIC, and judges whether the application ID is stated as "e-cinema".

In case the result of the judgment is negative, namely, when the application ID is not "e-cinema", the loaded tape cassette is likely to be a tape cassette destined for normal data recording or a cleaning cassette for example. In such a case, the system controller 15 exits the process shown in FIG. 33 and performs a process corresponding to an actually stated application ID. On the other hand, when the result of the judgment is affirmative, namely, when the application ID is "e-cinema", the system controller 15 goes to a process addressed to the digital cinema system, in step S305 and to subsequent steps.

In step S305, the system controller 15 reads instruction/object information and starts a process. It should be noted that the instruction/object information may be read from the MIC but since the data having been read from the MIC is held in the S-RAM 24 (or flash ROM 25), the MIC-stored data held in the memory may be read for performing a process according to the instruction/object information thus read.

In the instruction in the instruction/object information shown in FIG. 34, there is first stated:

```
IF GET_CARTRIDGE_SERIAL_NUM-
    BER=20000000000000000000000000034621
    THEN{
```

In response to this instruction, the system controller 15 will refer, in step S306, to the cartridge serial number of the MIC from which the instruction/object information has been read. Then, in next step S307, the system controller 15 judges whether the cartridge serial number of the MIC and the cartridge serial number (20000000000000000000000000034621) stated in the instruction are coincident with each other.

When the result of the judgment made in step S307 is affirmative, the loaded tape cassette is considered as a regular original one addressed to the digital cinema system. In this case, the system controller 15 goes to step S308.

On the other hand, the system controller 15 has decided in step S307 that the cartridge serial number of the MIC is not coincident with the one stated in the instruction, the loaded tape cassette will be considered as a copy. In this case, the system controller 15 goes to step S310.

The process in step S308 corresponds to the content of a following statement in the instruction:

```
IF GET_DRIVE_TYPE=E-CINEMA THEN
```

That is, the system controller 15 will refer to DRIVE_TYPE which should have been written in the firmware of the tape streamer drive 10A. In next step S309, the system controller 15 judges whether the "DRIVE_TYPE=E-CINEMA" referred to is stated in the firmware.

When the system controller 15 has decided in step S309 that the DRIVE_TYPE=E-CINEMA is stated in the firmware, the system controller 15 exits the process routine according to the instruction because "IF GET_DRIVE_TYPE=E-CINEMA THEN EXIT" is stated in the instruction. The affirmative result of the judgment in step S309 means that both the requirements that the loaded tape cassette should be a regular original product addressed to the digital cinema system and also the tape streamer drive 10 be a regular one are satisfied. The affirmative result of the judgment in step S309, allowing the system controller 15 to exit directly the routine, means that the tape cassette is not inhibited from being played. Thus, the loaded tape cassette can subsequently be played for screening.

The instruction includes a following partial statement:

```
IF GET_DRIVE TYPE=E-CINEMA THEN EXIT?
}ELSE {
REWIND
EJECT
EXIT
```

In case the result of the judgment in step S309 is negative when the judgment is made based on this instruction, the system controller 15 goes to step S310 where it will make a control to rewind the magnetic tape 3 to the beginning.

The instruction will cause the tape cassette 1 to be ejected after completion of the rewinding in step S310. The instruction includes a following statement:

```
CASE:BEFORE_EJECT{
    PUT_MESSAGE{
    THE CARTRIDGE IS UNUSABLE IN THIS SYSTEM.
    }
    GENERATE_CHECK_CONDITION (99)
}
```

This statement indicates an instruction is to be executed before the tape cassette 1 is ejected.

After the magnetic tape 3 in the tape cassette 1 is rewound in step S310, the system controller 15 goes to step S311 where it will write a message "THE CARTRIDGE IS UNUSABLE IN THIS SYSTEM" to the PUT_MESSAGE work memory of the MIC. Next in step S312, the system controller 15 generates CHECK_CONDITION (99).

Then in step S313, the system controller 15 waits until the magnetic tape 3 is completely rewound. After the rewinding of the magnetic tape 3 is complete, the system controller 15 goes to step S314 where the system controller 15 controls the tape streamer drive 10 to eject the loaded tape cassette and unload it through the cassette slot 203.

The CHECK_CONDITION (99) generated in step S312 is transmitted to the host computer 40. Upon reception of the CHECK_CONDITION (99), the host computer 40 issues "Request for the host" by performing the process as shown in FIG. 31, and acquires a message from the PUT-MESSAGE work area of the MIC. In this case, since the message "THE CARTRIDGE IS UNUSABLE IN THIS SYSTEM" is acquired as above, the tape cassette is inhibited from being played back. In this case, the process corresponding to "CHECK_CONDITION (99) generated in step S312 may be performed by the firmware in the tape streamer drive 10A. That is, when the firmware of the tape streamer drive 10A detects "CHECK_CONDITION (99)", it will acquire the message "THE CARTRIDGE IS UNUSABLE IN THIS SYSTEM" from the PUT_MESSAGE work memory in the MIC to set a play inhibit mode for example.

10. Example of Instruction/Object Information Use (Third Example)

Next, the third example of the system operation using instruction/object information will be described.

FIG. 29 shows a third example of instruction/object information use. In the third example, the tape cassette 1 is stored in the library unit 50.

Figure 29A:
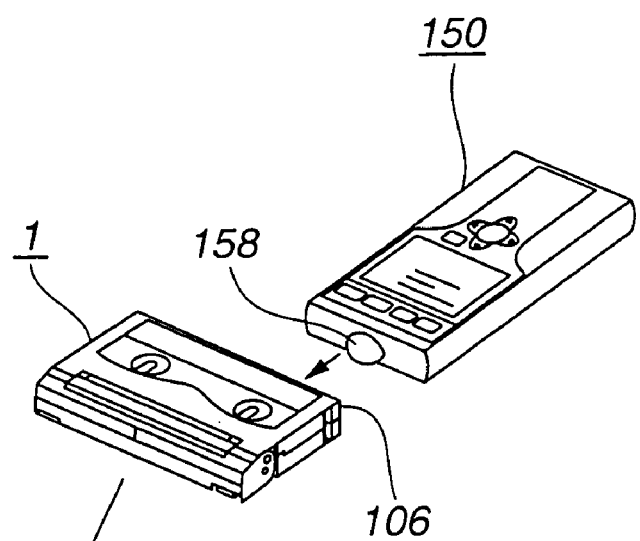
FIGS. 29A and 29B are perspective views showing the mode of using an instruction/object information in a third example of the system operation.

As having previously been described, the library unit 50 includes a plurality of magazines 52 each having a predetermined number of cassette compartments 52a for receiving of a plurality of tape cassettes 1. In the third example, an instruction for putting a tape cassette 1 into a designated cassette compartment 52a is stated as instruction/object information to be written to the MIC as shown in FIG. 29A. On this account, at the library unit 50, the cassette compartments 52a are managed by numbering each of them and an instruction to put the tape cassette 1 into a cassette compartment 52a having a designated number is stated in some of the instruction/object information, for example.

Figure 29B:
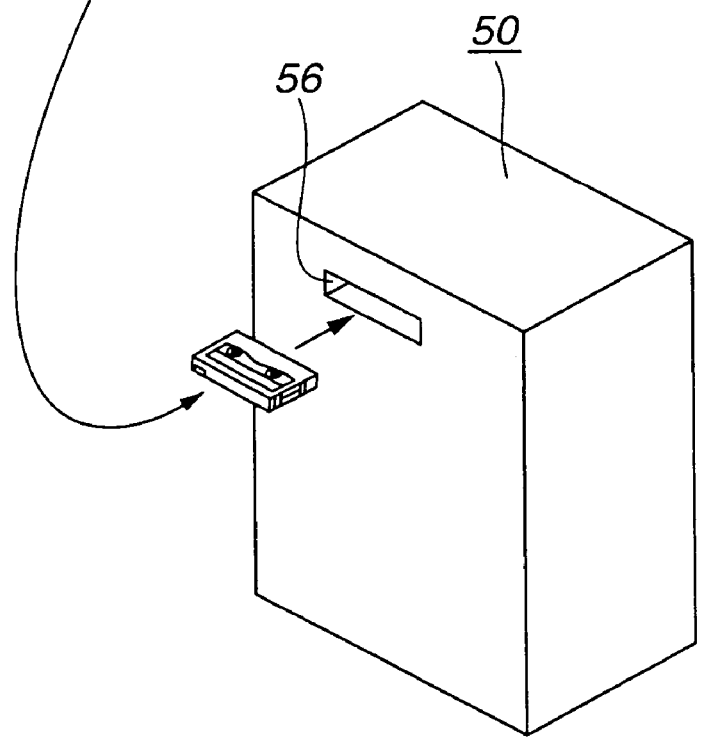

When a tape cassette 1 having such instruction/object information written to the MIC thereof is inserted into a post 56 as shown in FIG. 29B, the library controller 80 of the library unit 50 controls the hand unit 60 to catch the inserted tap cassette 1. In this condition, the library controller 80 reads the instruction/object information from the MIC and analyzes the information. Performing a process according to the result of the analysis, the library controller 80 controls the hand unit 60 to put the tape cassette it is currently catching into the cassette compartment 52a having a number designated based on the instruction/object information.

Note that as the control processes performed by the library controller 80 have been described above, the processing operations of the library controller 80 will not be explained based on any flow chart.

Since the library unit 50 is designed for communication with the remote memory chip 4 as MIC, it may not only be designed for reading data such as instruction/object information, management information, etc. from the remote memory chip 4 but also for writing instruction/object information to the remove memory chip 4. For example, by recording to a tape cassette 1 an instruction to designate a number for the cassette compartment 52a and putting a tape cassette 1 into that cassette compartment 52a as well as instruction/object information having a predetermined content necessary for the library unit 50 to manage the tape cassette, it is possible to automatically do an operation for management of a user-desired tape cassette.

11. Other Examples of Instruction/Object Information Use

As will be evident from the aforementioned examples of instruction/object information use, the instruction/object information in the present invention are intended for making some request to another system device. So, a variety of functions can be implemented depending upon the content of the instruction/object information.

Some other examples of instruction/object information use will be described below.

In the first example, each time the tape cassette 1 is loaded in the tape streamer drive 10, the backup/restore operation is made. Similarly to this example, the backup operation may be done as will be described below.

An instruction to "back up data at each designated time every day" is written as instruction/object information to the MIC of the tape cassette 1. The system composed of the tape streamer driver 10 and host computer 40 and having read the instruction does a backup operation when a time designated with the instruction is reached as long as the tape cassette 1 is loaded in the tape streamer drive 10. That is, data can automatically be backed up at a designated time every day.

As an application of such a backup operation, such a system addressed to the tape cassette 1A is assumed to be used like a VTR in future, for example. Instruction/object information having an instruction for programmed recording stated therein is stored into the MIC of the tape cassette 1 and the tape cassette 1 is loaded in the system. Thus, the recording programming as with the conventional VTR can be implemented by the system according to the present invention.

In the digital cinema system shown in FIGS. 28A to 28C, it is assumed that a content recorded to a distributed original tape cassette 1A has to be copied to another recording medium in some cases for the convenience of the distribution. In such cases, the content distributor has to allow the content to be copied within such a range as will not infringe the copyright. In this case, an instruction "to rewind the magnetic tape to the beginning once the content has been reproduced, and erase the data starting with the tape beginning" is written to the MIC of the original tape cassette 1A having the content recorded therein. The tape cassette 1A having the instruction recorded in the MIC is acquired and played for copying the data to another recording medium. Once the playback of the cassette tape 1A for the copying is complete, the system will rewind the magnetic tape to the tape beginning and then erase the data in the magnetic tape. Thus, the data can substantially be copied only once. In this case, a data management standard that copying of the content is allowed only once is set up in the instruction/object information in the present invention and data copying is limited based on the data management standard.

Further, in case a moving image file stored in a file server in the Internet is downloaded and recorded to a tape cassette 1 used in the present invention, a file to be recorded is designed as instruction/object information and an instruction to record the file is stated in the instruction/object information, whereby it is made possible to record a desired file just by inserting a tape cassette, for example.

For example, the data write/read unit 150 has previously been described concerning only the data write with instruction/object information. However, the data write/read unit 150 can also access the MIC (remote memory chip 4) to read data.

A specific function can be performed the data write/read unit 150 which reads instruction/object information from the MIC and does a predetermined operation according to the content of a statement in the instruction/object information. Thus, a function which cannot be performed unless the user makes complicated operations on the data write/read unit 150 can be performed just by reading the instruction/object information from the remote memory chip 4 of the tape cassette 1.

In addition to the modes of using instruction/object information in the present invention, many other modes can be proposed. Also, the systems each including the host computer, tape streamer drive, data write/read unit and library unit in combination have been described by way of example. However, the present invention is not limited to such embodiments.

Also, the tape-shaped recording medium with a memory to which instruction/object information can be written has been explained by way of example. However, the recording medium provided with such a memory according to the present invention is not limited to the tape-shaped one.

The data structure and type of instruction/object information are not limited to those in the aforementioned embodiments, and the inter-device data interface for transmission and reception of instruction/object information may be any other one such as IEEE 1394 type in addition to the aforementioned SCSI interface.

INDUSTRIAL APPLICABILITY

As having been described in the foregoing, since the memory provided in the recording medium has formed therein, according to the present invention, a storage area in which instruction/object information having stated therein an instruction executed by a required device in addition to a storage area where management information for management of the recording to or playback of the recording medium is stored, so instruction/object information can be written to the memory by a communication device, recording medium drive unit or recording medium storage unit, each provided with a communication means capable of communicating with the memory, for example.

The recording medium having the instruction/object information written in the memory thereof has information with which it is possible to positively control the operation of a specific system device which makes some action on the recording medium.

The tape streamer drive, library unit or host computer, each being an information processing device, acquires instruction/object information from the memory by reading it directly from the memory or acquires data read by a tape streamer drive or library unit, which can read information from the memory, and processes the information to provide a control corresponding to the instruction/object information. Thus, a predetermined system operation which should be done correspondingly to an application of the recording medium can automatically be done only by loading the tape cassette.

Since instruction/object information is stored in the recording medium, an operation which has to be controlled by the host system such as a personal computer with current condition taken in account can be completely done by a sub system such as a recording medium drive which can read data directly from the recording medium. Thus, the upward compatibility in a system will be more flexible, for example.

According to the present invention, a device or system which makes some action on a recording medium can have a higher operability and extensibility, and can be highly value-added.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claim is:

1. An information processing apparatus comprising:
    a memory information reading means capable of communicating with a memory means provided in a recording medium and having at least a management information storage area where management information used to manage recording to and reproduction from the recording medium is stored and an instruction/object information storage area where instruction/object information in which there is stated an instruction to be carried out and an area of responsibility specifying a device, or devices, which has to execute the instruction is stored, and thus reading information from at least the memory means,
    wherein the management information manages reproduction from the recording medium upon user-operation of a predetermined key and recording without operation of said key;
    a communication means for communicating information;
    an information acquisition means for acquiring, via the communication means, the instruction/object information read by the memory information reading means from the memory means and in which there is stated the instruction to be carried out and the area of responsibility specifying a device, or devices, which has to execute the instruction; and
    a control means capable of making a predetermined control of the system device, or devices, which has to execute the instruction according to the instruction stated in the instruction/object information acquired by the information acquisition means.

2. The apparatus as set forth in claim 1, wherein the recording medium is a magnetic-tape cassette.

3. The apparatus as set forth in claim 2, being a tape drive unit.

4. The apparatus as set forth in claim 2, being a tape library.

5. A recording medium comprising:
    a memory means having at least a management information storage area where management information used to mange recording to, and reproduction from, the recording medium is stored and an instruction/object information storage area where instruction/object information in which there is stated an instruction to be carried out and the area of responsibility specifying a device, or devices, which has to execute the instruction is stored,
    wherein the management information manages reproduction from the recording medium upon user-operation of a predetermined key and recording without operation of said key.

6. The medium as set forth in claim 5, being a magnetic-tape cassette.

* * * * *

UNITED STATES PATENT AND TRADEMARK OFFICE
CERTIFICATE OF CORRECTION

| | |
|---|---|
| PATENT NO. | : 7,209,308 B2 |
| APPLICATION NO. | : 10/415308 |
| DATED | : April 24, 2007 |
| INVENTOR(S) | : Yoshihisa Takayama et al. |

It is certified that error appears in the above-identified patent and that said Letters Patent is hereby corrected as shown below:

On the title page add:
    (30) Foreign Application Priority Data

August 30, 2001   (JP)................2001-261358

Signed and Sealed this

Third Day of July, 2007

JON W. DUDAS
*Director of the United States Patent and Trademark Office*